(12) United States Patent
Kim

(10) Patent No.: US 12,219,148 B2
(45) Date of Patent: Feb. 4, 2025

(54) IMAGE ENCODING/DECODING METHOD AND DEVICE

(71) Applicant: B1 INSTITUTE OF IMAGE TECHNOLOGY, INC., Seoul (KR)

(72) Inventor: Ki Baek Kim, Daejeon (KR)

(73) Assignee: B1 INSTITUTE OF IMAGE TECHNOLOGY, INC., Seoul (KR)

( * ) Notice: Subject to any disclaimer, the term of this patent is extended or adjusted under 35 U.S.C. 154(b) by 0 days.

(21) Appl. No.: 18/627,969

(22) Filed: Apr. 5, 2024

(65) Prior Publication Data

US 2024/0275981 A1    Aug. 15, 2024

Related U.S. Application Data

(60) Continuation of application No. 18/472,766, filed on Sep. 22, 2023, now Pat. No. 12,075,062, which is a
(Continued)

(30) Foreign Application Priority Data

Sep. 24, 2018  (KR) .................. 10-2018-0114536
Sep. 24, 2018  (KR) .................. 10-2018-0114539
Sep. 24, 2018  (KR) .................. 10-2018-0114540

(51) Int. Cl.
*H04N 7/12*       (2006.01)
*G06T 9/00*       (2006.01)
(Continued)

(52) U.S. Cl.
CPC .......... *H04N 19/137* (2014.11); *G06T 9/004* (2013.01); *H04N 19/159* (2014.11);
(Continued)

(58) Field of Classification Search
CPC ................................. H04N 19/507
See application file for complete search history.

(56) References Cited

U.S. PATENT DOCUMENTS

2018/0084260 A1   3/2018   Chien et al.
2018/0098085 A1   4/2018   Panusopone et al.
(Continued)

FOREIGN PATENT DOCUMENTS

CN    103370940 A    10/2013
EP    3 435 673 A2    1/2019
(Continued)

OTHER PUBLICATIONS

Kim, Kyungyong, et al. "EE2-related: Template matching using extended MVP candidate list" Document: JVET-Z0066-v1, Joint Video Experts Team (JVET) of ITU-T SG 16 WP 3 and ISO/IEC JTC 1/SC 29, 26th Meeting, by teleconference, Apr. 20-29, 2022, (4 pages).

(Continued)

*Primary Examiner* — Y Lee
(74) *Attorney, Agent, or Firm* — NSIP Law

(57) ABSTRACT

An image encoding/decoding method and device, according to the present invention, comprises the steps of: configuring a motion information candidate list of a target block; selecting a candidate index from the motion information candidate
(Continued)

list; deriving an offset for adjusting a motion vector; and recovering a motion vector of the target block through a predicted motion vector recovered on the basis of the offset.

5 Claims, 19 Drawing Sheets

Related U.S. Application Data division of application No. 17/276,344, filed as application No. PCT/KR2019/012404 on Sep. 24, 2019, now abandoned.

(51) Int. Cl.
| | | |
|---|---|---|
| *H04N 19/137* | (2014.01) | |
| *H04N 19/159* | (2014.01) | |
| *H04N 19/176* | (2014.01) | |
| *H04N 19/189* | (2014.01) | |
| *H04N 19/46* | (2014.01) | |
| *H04N 19/507* | (2014.01) | |

(52) U.S. Cl.
CPC ......... *H04N 19/176* (2014.11); *H04N 19/189* (2014.11); *H04N 19/46* (2014.11); *H04N 19/507* (2014.11)

(56) References Cited

U.S. PATENT DOCUMENTS

| | | |
|---|---|---|
| 2018/0241998 A1 | 8/2018 | Chen et al. |
| 2019/0089961 A1 | 3/2019 | Ahn et al. |

FOREIGN PATENT DOCUMENTS

| | | | |
|---|---|---|---|
| JP | 2013-223049 A | | 10/2013 |
| KR | 10-1626690 B1 | | 6/2016 |
| WO | WO 2017/164645 A2 | | 9/2017 |
| WO | WO 2018/052986 A1 | | 3/2018 |
| WO | WO 2019/009504 A1 | | 1/2019 |

OTHER PUBLICATIONS

Jeong, Seungsoo, et al. "CE4 Ultimate motion vector expression in J0024 (Test 4.2.9)" Document: JVET-K0115-v4, Joint Video Experts Team (JVET) of ITU-T SG 16 WP 3 and ISO/IEC JTC 1/SC 29/WG 11, 11th Meeting: Ljubljana, SI, Jul. 10-18, 2018 (7 pages).
International Search Report issued on Jan. 2, 2020 in counterpart International Patent Application No. PCT/KR2019/012404 (2 pages in English and 2 pages in Korean).

Curr_Pic

Col_Pic

IMAGE ENCODING/DECODING METHOD AND DEVICE

CROSS-REFERENCE TO RELATED APPLICATIONS

This application is a continuation of application Ser. No. 18/472,766 filed on Sep. 22, 2023, which is a division of application Ser. No. 17/276,344 filed on Mar. 15, 2021, which is a U.S. National Stage Application of International Application No. PCT/KR2019/012404, filed on Sep. 24, 2019 which claims the benefit under 35 USC 119(a) and 365(b) of Korean Patent Application Number 10-2018-0114536, filed Sep. 24, 2018, Korean Patent Application Number 10-2018-0114539, filed Sep. 24, 2018 and Korean Patent Application Number 10-2018-0114540, filed on Sep. 24, 2018 in the Korean Intellectual Property Office, the entire disclosures of which are incorporated by reference for all purposes.

TECHNICAL FIELD

The present invention relates to an image encoding/decoding method and apparatus.

BACKGROUND ART

Along with the widespread use of the Internet and portable terminals and the development of information and communication technology, multimedia data is increasingly being used. Accordingly, in order to provide various services or perform various tasks through image prediction in various systems, there is a pressing need for improving the performance and efficiency of an image processing system. However, research and development achievements are yet to catch up with the trend.

As such, an existing method and apparatus for encoding/decoding an image needs performance improvement in image processing, particularly in image encoding or image decoding.

DISCLOSURE

Technical Problem

An object of the present invention for solving the above problems is to provide an image encoding/decoding apparatus that modifies a motion vector predictor using an adjustment offset.

Technical Solution

A method of decoding an image according to an embodiment of the present invention for achieving the above object comprises, constructing a motion information prediction candidate list of a target block, selecting a prediction candidate index, deriving a prediction motion vector adjustment offset, and reconstructing motion information of the target block.

Here, the constructing the motion information prediction candidate list may further comprise, including a new candidate in the candidate group when a candidate already included, a candidate obtained based on offset information, the new candidate and a candidate obtained based on the offset information do not overlap.

Here, the deriving the prediction motion vector adjustment offset may further comprise, deriving the prediction motion vector adjustment offset based on the offset application flag and/or offset selection information.

Advantageous Effects

In the case of using the inter prediction according to the present invention as described above, it is possible to improve coding performance by efficiently obtaining a prediction motion vector.

BEST MODE FOR INVENTION

Figure 1:
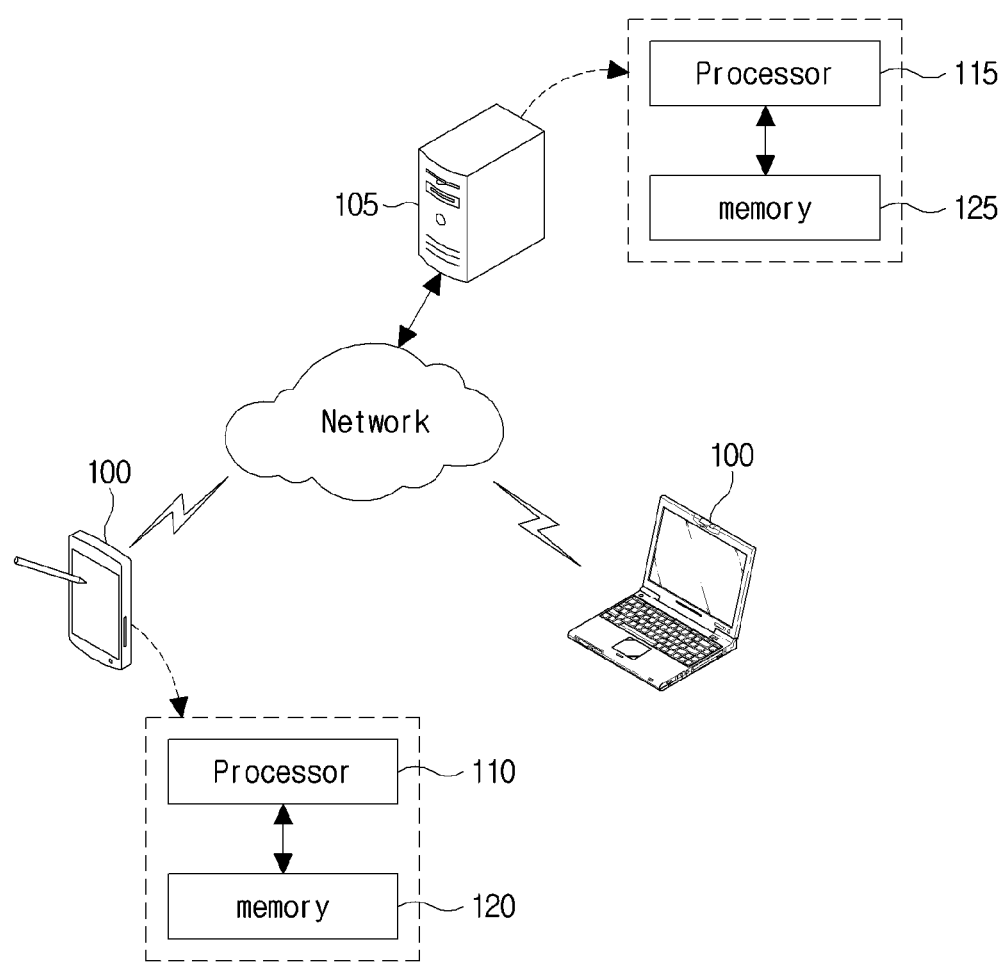
FIG. 1 is a block diagram illustrating an image encoding apparatus according to an embodiment of the present invention.

An image encoding/decoding method and apparatus of the present invention may construct a prediction motion candidate list of a target block, derive a prediction motion vector from the motion candidate list based on a prediction candidate index, reconstruct prediction motion vector adjustment offset information, and reconstruct a motion vector of the target block based on the prediction motion vector and the prediction motion vector adjustment offset information, In an image encoding/decoding method and apparatus of the present invention, the motion candidate list may include at least one of a spatial candidate, a temporal candidate, a statistical candidate, or a combined candidate.

In an image encoding/decoding method and apparatus of the present invention, the prediction motion vector adjustment offset may be determined based on at least one of an offset application flag or offset selection information.

In an image encoding/decoding method and apparatus of the present invention, information on whether the prediction motion vector adjustment offset information is supported may be included in at least one of a sequence, a picture, a sub-picture, a slice, a tile, or a brick.

In an image encoding/decoding method and apparatus of the present invention, when the target block is encoded in a merge mode, the motion vector of the target block may be reconstructed by using a zero vector, and when the target block is encoded in a competition mode, the motion vector of the target block may be reconstructed by using a motion vector difference.

MODE FOR INVENTION

The present disclosure may be subject to various modifications and have various embodiments. Specific embodiments of the present disclosure will be described with reference to the accompanying drawings. However, the embodiments are not intended to limit the technical scope of the present disclosure, and it is to be understood that the present disclosure covers various modifications, equivalents, and alternatives within the scope and idea of the present disclosure.

The terms as used in the disclosure, first, second, A, and B may be used to describe various components, not limiting the components. These expressions are used only to distinguish one component from another component. For example, a first component may be referred to as a second component and vice versa without departing from the scope of the present disclosure. The term and/or covers a combination of a plurality of related items or any one of the plurality of related items.

When it is said that a component is "connected to" or "coupled with/to" another component, it should be understood that the one component is connected to the other component directly or through any other component. On the other hand, when it is said that a component is "directly connected to" or "directly coupled to" another component, it should be understood that there is no other component between the components.

The terms as used in the present disclosure are provided to describe merely specific embodiments, not intended to limit the present disclosure. Singular forms include plural referents unless the context clearly dictates otherwise. In the present disclosure, the term "include" or "have" signifies the presence of a feature, a number, a step, an operation, a component, a part, or a combination thereof, not excluding the presence or addition of one or more other features, numbers, steps, operations, components, parts, or a combination thereof.

Unless otherwise defined, the terms including technical or scientific terms used in the disclosure may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings.

Typically, an image may include one or more color spaces according to its color format. The image may include one or more pictures of the same size or different sizes. For example, the YCbCr color configuration may support color formats such as 4:4:4, 4:2:2, 4:2:0, and monochrome (composed of only Y). For example, YCbCr 4:2:0 may be composed of one luma component (Y in this example) and two chroma components (Cb and Cr in this example). In this case, the configuration ratio of the chroma component and the luma component may have 1:2 width-height. For example, in case of 4:4:4, it may have the same configuration ratio in width and height. When a picture includes one or more color spaces as in the above example, the picture may be divided into the color spaces.

Images may be classified into I, P, and B according to their image types (e.g., picture type, sub-picture type, slice type, tile type, brick type, etc.). The I-picture may be an image which is coded without a reference picture. The P-picture may be an image which is coded using a reference picture, allowing only forward prediction. The B-picture may be an image which is coded using a reference picture, allowing bi-directional prediction. However, some (P and B) of the types may be combined or an image type of a different composition may be supported, according to a coding setting.

Various pieces of encoding/decoding information generated in the present disclosure may be processed explicitly or implicitly. Explicit processing may be understood as a process of generating encoding/decoding information in a sequence, a picture, a sub-picture, a slice, a tile, a brick, a block, or a sub-block, and including the selection information in a bitstream by an encoder, and reconstructing related information as decoded information by parsing the related information at the same unit level as in the encoder by a decoder. Implicit processing may be understood as processing encoded/decoded information in the same process, rule, etc. at both the encoder and the decoder.

FIG. 1 is a conceptual diagram illustrating an image encoding and decoding system according to an embodiment of the present disclosure.

Referring to FIG. 1, each of an image encoding apparatus 105 and an image decoding apparatus 100 may be a user terminal such as a personal computer (PC), a laptop computer, a personal digital assistant (PDA), a portable multimedia player (PMP), a playstation portable (PSP), a wireless communication terminal, a smartphone, or a television (TV), or a server terminal such as an application server or a service server. Each of the image encoding apparatus 105 and the image decoding apparatus 100 may be any of various devices each including a communication device such as a communication modem, which communicates with various devices or a wired/wireless communication network, a memory 120 or 125 which stores various programs and data for inter-prediction or intra-prediction to encode or decode an image, or a processor 110 or 115 which performs computations and control operations by executing programs.

Further, the image encoding apparatus 105 may transmit an image encoded to a bitstream to the image decoding apparatus 100 in real time or non-real time through a wired/wireless communication network such as the Internet, a short-range wireless communication network, a wireless local area network (WLAN), a wireless broadband (Wi-Bro) network, or a mobile communication network or via various communication interfaces such as a cable or a universal serial bus (USB), and the image decoding apparatus 100 may reconstruct the received bitstream to an image by decoding the bitstream, and reproduce the image. Further, the image encoding apparatus 105 may transmit the image encoded to the bitstream to the image decoding apparatus 100 through a computer-readable recording medium.

While the above-described image encoding apparatus and image decoding apparatus may be separate apparatuses, they may be incorporated into a single image encoding/decoding apparatus depending on implementation. In this case, some components of the image encoding apparatus may be substantially identical to their counterparts of the image decoding apparatus. Therefore, these components may be configured to include the same structures or execute at least the same functions.

Therefore a redundant description of corresponding technical component will be avoided in the following detailed description of the technical component and their operational principles. Further, since the image decoding apparatus is a computing device that applies an image encoding method performed in the image encoding apparatus to decoding, the following description will focus on the image encoding apparatus.

The computing device may include a memory storing a program or software module that performs an image encoding method and/or an image decoding method, and a processor connected to the memory and executing the program. The image encoding apparatus may be referred to as an encoder, and the image decoding apparatus may be referred to as a decoder.

Figure 2:
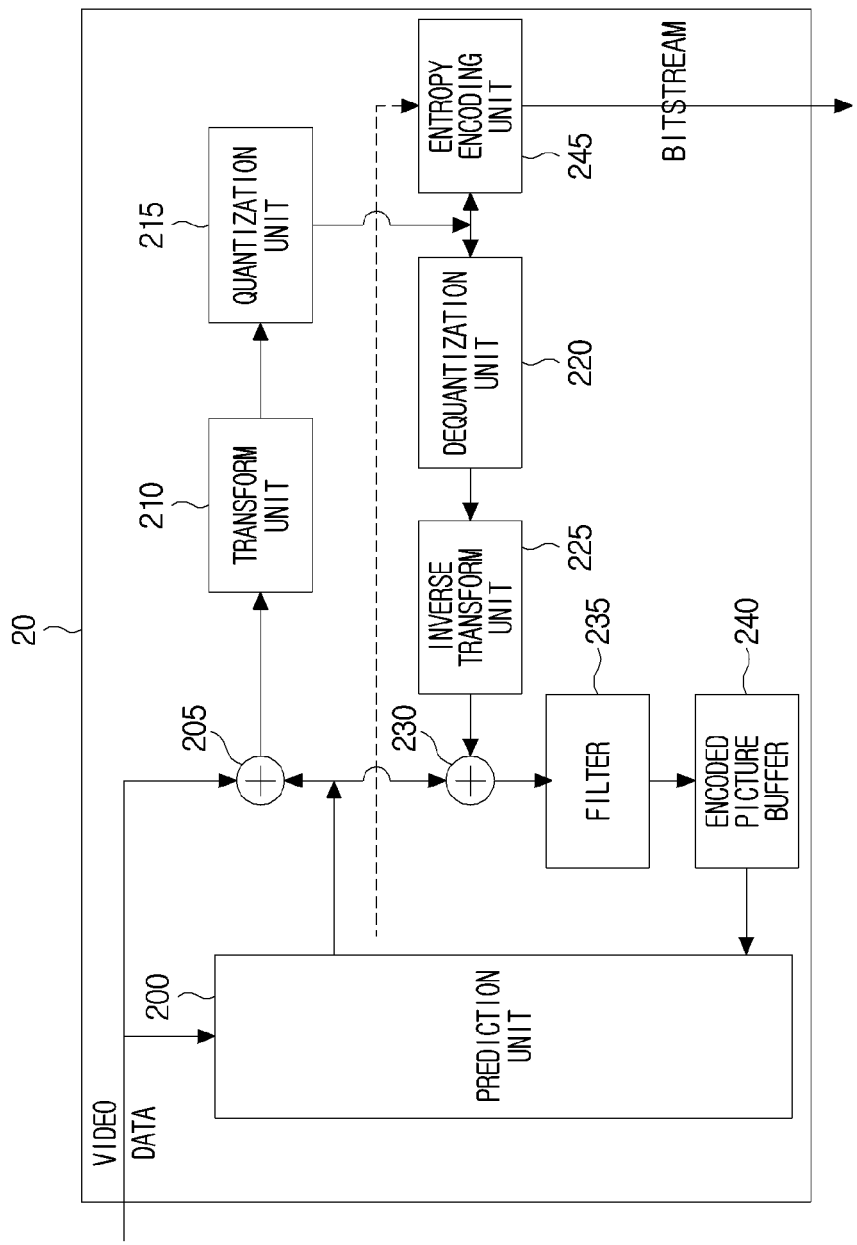
FIG. 2 is a block diagram illustrating an image decoding apparatus according an exemplary embodiment of the present invention.

FIG. 2 is a block diagram illustrating an image encoding apparatus according to an embodiment of the present disclosure.

Referring to FIG. 2, an image encoding apparatus 20 may include a prediction unit 200, a subtraction unit 205, a transform unit 210, a quantization unit 215, a dequantization unit 220, an inverse transform unit 225, an add unit 230, a filter unit 235, an encoded picture buffer 240, and an entropy encoding unit 245.

The prediction unit 200 may be implemented using a prediction module which is a software module, and generate a prediction block for a block to be encoded by intra-prediction or inter-prediction. The prediction unit 200 may generate a prediction block by predicting a target block to be encoded in an image. In other words, the prediction unit 200 may generate a prediction block having a predicted pixel value of each pixel by predicting the pixel value of the pixel in the target block according to inter-prediction or intra-prediction. Further, the prediction unit 200 may provide information required for generating the prediction block, such as information about a prediction mode like an intra-prediction mode or an inter-prediction mode to an encoding unit so that the encoding unit may encode the information about the prediction mode. A processing unit subjected to prediction, a prediction method, and specific details about the processing unit may be determined according to an encoding setting. For example, the prediction method and the prediction mode may be determined on a prediction unit basis, and prediction may be performed on a transform unit basis. In addition, when a specific encoding mode is used, it may be possible to encode an original block as it is and transmit it to a decoder without generating a prediction block through the prediction unit.

The intra prediction unit may have a directional prediction mode such as a horizontal mode, a vertical mode or etc., used according to a prediction direction, and a non-directional prediction mode such as DC, Planar or etc., using a method such as averaging and interpolation of reference pixels. Intra prediction mode candidate group may be constructed through the directional and non-directional modes, and one of various candidates such as 35 prediction modes (33 directional+2 non-directional), 67 prediction modes (65 directional+2 non-directional), 131 prediction mode (129 directional+2 non-directional) may be used as the candidate group.

The intra prediction unit may include a reference pixel construction unit, a reference pixel filter unit, a reference pixel interpolation unit, a prediction mode determination unit, a prediction block generation unit, and a prediction mode encoding unit. The reference pixel construction unit may construct a pixel belonging to a block adjacent to the target block and adjacent to the target block as a reference pixel for intra prediction. Depending on the encoding setting, one adjacent reference pixel line may be constructed as a reference pixel, or another adjacent reference pixel line may be constructed as a reference pixel, or a plurality of reference pixel lines may be constructed as reference pixels. When some of reference pixels are not available, the reference pixel may be generated using an available reference pixel. When all of the reference pixels are not available, a predetermined value (e.g., a median value of a pixel value range expressed by a bit depth, etc.) may be used to generate a reference pixel.

The reference pixel filter unit of the intra prediction unit may perform filtering on the reference pixel for the purpose of reducing deterioration remaining through an encoding process. In this case, the filter that is used may be a low-pass filter such as a 3-tap filter [$\frac{1}{4}$, $\frac{1}{2}$, $\frac{1}{4}$], a 5-tap filter [$\frac{2}{16}$, $\frac{3}{16}$, $\frac{6}{16}$, $\frac{3}{16}$, $\frac{2}{16}$], etc. Whether to apply filtering and a filtering type may be determined according to encoding information (e.g., a block size, shape, prediction mode, etc.).

The reference pixel interpolation unit of the intra prediction unit may generate a pixel of a fractional unit through a linear interpolation process of the reference pixel according to the prediction mode, and an interpolation filter applied according to the encoding information may be determined. In this case, the interpolation filter used may include a 4-tap Cubic filter, a 4-tap Gaussian filter, a 6-tap Wiener filter, an 8-tap Kalman filter or etc. In general, interpolation is performed separately from the process of performing the low-pass filter, but the filtering process may be performed by integrating the filters applied to the two processes into one.

The prediction mode determination unit of the intra prediction unit may select at least one optimal prediction mode from among the prediction mode candidates in consideration of encoding cost, and the prediction block generation unit may generate a prediction block using the corresponding prediction mode. The prediction mode encoding unit may encode the optimal prediction mode based on a prediction value. In this case, the prediction information may be adaptively encoded according to the case where the predicted value is correct or not.

In the intra prediction unit, the predicted value is called a Most Probable Mode (MPM), and some of the modes belonging to the prediction mode candidate group may constructed as an MPM candidate group. The MPM candidate group may include a predetermined prediction mode (e.g., DC, planar, vertical, horizontal, diagonal mode, etc.) or a prediction mode of spatially adjacent blocks (e.g., left, top, top-left, top-right, bottom-left block, etc.). In addition, a mode derived from a mode previously included in the MPM candidate group (a difference between +1 and −1 in the case of a directional mode) may be constructed as an MPM candidate group.

There may be a priority of a prediction mode for constructing an MPM candidate group. An order of being included in the MPM candidate group may be determined according to the priority, and when the number of MPM candidate groups (determined according to the number of prediction mode candidate groups) is filled according to the priority, the MPM candidate group construction may be completed. In this case, the priority may be determined in the order of a prediction mode of a spatially adjacent block, a predetermined prediction mode, and a mode derived from a prediction mode previously included in the MPM candidate group, but other modifications are possible.

For example, spatially adjacent blocks may be included in the candidate group in the order of left, top, bottom-left, top-right, top-left block, etc., and predetermined prediction mode may be included in the candidate group in the order of DC, planar, vertical, horizontal mode. A total of six modes may be constructed as a candidate group by including a mode obtained by adding +1, −1, or etc. from the already included mode to the candidate group. Alternatively, a total of 7 modes may be constructed as a candidate group by including one priority such as left, top, DC, planar, bottom-left, top-right, top-left, (left+1), (left−1), (top+1).

The subtraction unit 205 may generate a residual block by subtracting the prediction block from the target block. In other words, the subtraction unit 205 may calculate the difference between the pixel value of each pixel in the target block to be encoded and the predicted pixel value of a corresponding pixel in the prediction block generated by the prediction unit to generate a residual signal in the form of a block, that is, the residual block. Further, the subtraction unit 205 may generate a residual block in a unit other than a block obtained through the later-described block division unit.

The transform unit 210 may transform a spatial signal to a frequency signal. The signal obtained by the transform process is referred to as transform coefficients. For example, the residual block with the residual signal received from the subtraction unit may be transformed to a transform block with transform coefficients, and the input signal is determined according to an encoding configuration, not limited to the residual signal.

The transform unit may transform the residual block by, but not limited to, a transform scheme such as Hadamard transform, discrete sine transform (DST)-based transform, or DCT-based transform. These transform schemes may be changed and modified in various manners.

At least one of the transform schemes may be supported, and at least one sub-transform scheme of each transform scheme may be supported. The sub-transform scheme may be obtained by modifying a part of a base vector in the transform scheme.

For example, in the case of DCT, one or more of sub-transform schemes DCT-1 to DCT-8 may be supported, and in the case of DST, one or more of sub-transform schemes DST-1 to DST-8 may be supported. A transform scheme candidate group may be configured with a part of the sub-transform schemes. For example, DCT-2, DCT-8, and DST-7 may be grouped into a candidate group, for transformation.

Transformation may be performed in a horizontal/vertical direction. For example, one-dimensional transformation may be performed in the horizontal direction by DCT-2, and one-dimensional transformation may be performed in the vertical direction by DST-7. With the two-dimensional transformation, pixel values may be transformed from the spatial domain to the frequency domain.

One fixed transform scheme may be adopted or a transform scheme may be selected adaptively according to a coding configuration. In the latter case, a transform scheme may be selected explicitly or implicitly. When a transform scheme is selected explicitly, information about a transform scheme or transform scheme set applied in each of the horizontal direction and the vertical direction may be generated, for example, at the block level. When a transform scheme is selected implicitly, an encoding configuration may be defined according to an image type (I/P/B), a color component, a block size, a block shape, a block position, an intra-prediction mode, and so on, and a predetermined transform scheme may be selected according to the encoding setting.

Further, some transformation may be skipped according to the encoding setting. That is, one or more of the horizontal and vertical units may be omitted explicitly or implicitly.

Further, the transform unit may transmit information required for generating a transform block to the encoding unit so that the encoding unit encodes the information, includes the encoded information in a bitstream, and transmits the bitstream to the decoder. Thus, a decoding unit of the decoder may parse the information from the bitstream, for use in inverse transformation.

The quantization unit 215 may quantize an input signal. A signal obtained from the quantization are referred to as quantized coefficients. For example, the quantization unit 215 may obtain a quantized block with quantized coefficients by quantizing the residual block with residual transform coefficients received from the transform unit, and the input signal may be determined according to the encoding setting, not limited to the residual transform coefficients.

The quantization unit may quantize the transformed residual block by, not limited to, a quantization scheme such as dead zone uniform boundary value quantization, a quantization weighted matrix, or the like. The above quantization schemes may be changed and modified in various manners.

The quantization may be skipped according to the encoding setting. For example, the quantization (and dequantization) may be skipped according to the encoding setting (e.g., a quantization parameter of 0, that is, a lossless compression environment). In another example, when quantization-based compression performance is not exerted in view of the characteristics of an image, the quantization process may be omitted. The quantization may be skipped in the whole or partial region (M/2×N/2, M×N/2, or M/2×N) of the quantization block (M×N), and quantization skip selection information may be set explicitly or implicitly.

The quantization unit may transmit information required for generating a quantized block to the encoding unit so that the encoding unit encodes the information, includes the encoded information on a bitstream, and transmits the bitstream to the decoder. Thus, the decoding unit of the decoder may parse the information from the bitstream, for use in dequantization.

While the above example has been described on the assumption that a residual block is transformed and quantized by the transform unit and the quantization unit, a residual block with transform coefficients may be generated by transforming a residual signal and may not be quantized. The residual block may be subjected only to quantization without transformation. Further, the residual block may be subjected to both transformation and quantization. These operations may be determined depending on the encoding setting.

The dequantization unit 220 dequantizes the residual block quantized by the quantization unit 215. That is, the dequantization unit 220 generates a residual block with frequency coefficients by dequantizing a quantization frequency coefficient sequence.

The inverse transform unit 225 inversely transforms the residual block dequantized by the dequantization unit 220. That is, the inverse transform unit 225 inversely transforms the frequency coefficients of the dequantized residual block to generate a residual block with pixel values, that is, a reconstructed residual block. The inverse transform unit 225 may perform inverse transform by inversely performing the transform scheme used by the transform unit 210.

The add unit 230 reconstructs the target block by adding the prediction block predicted by the prediction unit 200 and the residual block recovered by the inverse transform unit 225. The reconstructed target block is stored as a reference picture (or reference block) in the coded picture buffer 240, for use as a reference picture when the next block to the target block, another block, or another picture are encoded later.

The filter unit 235 may include one or more post-processing filters such as a deblocking filter, a sample adaptive offset (SAO), and an adaptive loop filter (ALF). The deblocking filter may remove block distortion occurring at the boundary between blocks in a reconstructed picture. The ALF may perform filtering based on a value obtained by comparing the reconstructed image and the original image after the block is filtered through the deblocking filter. The SAO may reconstruct an offset difference at the pixel level between the original image and the residual block to which the deblocking filter is applied. These post-processing filters may be applied to a reconstructed picture or block.

The coded picture buffer 240 may store the block or picture reconstructed by the filter unit 235. The reconstructed block or picture stored in the coded picture buffer 240 may be provided to the prediction unit 200 that performs intra-prediction or inter-prediction.

The entropy encoding unit 245 may generate a quantization coefficient sequence, a transform coefficient sequence, or a signal sequence by scanning quantization coefficients, transform coefficients, or residual signals of the generated residual block according to at least one scan order (e.g., zigzag scan, vertical scan, horizontal scan, etc.). The entropy encoding unit 245 may encode the quantization coefficient sequence, the transform coefficient sequence, or the signal sequence by using at least one entropy coding technique. In this case, information on the scan order may be determined according to encoding settings (e.g., image type, encoding mode, prediction mode, transformation type, etc.), and related information may be implicitly determined or explicitly generated.

In addition, encoded data including encoding information transmitted from each component may be generated and output as a bitstream, which may be implemented by a multiplexer (MUX). In this case, the encoding may be performed by using methods such as xponential Golomb, ContextAdaptive Variable Length Coding (CAVLC), and ContextAdaptive Binary Arithmetic Coding (CABAC) as coding techniques, but not limited thereto, and various coding techniques refined and modified therefrom may be used.

When performing entropy encoding (assuming CABAC in this example) for syntax elements such as the residual block data and information generated in the encoding/decoding process, the entropy encoding apparatus may include a binarization unit (binarizer), a context modeler, a binary arithmetic coding unit (binary arithmetic coder). In this case, the binary arithmetic coding unit may include a regular coding engine and a bypass coding engine.

Since the syntax element input to the entropy encoding apparatus may not be a binary value, if the syntax elements are not binary values, the binarization unit may binarize the syntax elements and output a bin string composed of 0 or 1. In this case, the bin may represent a bit composed of 0 or 1, and may be encoded through the binary arithmetic encoding unit. In this case, one of a regular coding unit or a bypass coding unit may be selected based on a probability of occurrence of 0 and 1, and this may be determined according to a coding/decoding setting. If the syntax element is data having the same frequency of 0 and 1, the bypass coding unit may be used, otherwise, the regular coding unit may be used.

Various methods may be used when performing binarization on a syntax element. For example, fixed length binarization, unary binarization, truncated tice binarization, K-th exp-Golomb binarization, etc. may be used. In addition, signed binarization or unsigned binarization may be performed according to a range of values of the syntax element. The binarization process for the syntax element occurring in the present invention may be performed including not only the binarization mentioned in the above example, but also other additional binarization methods.

Figure 3:
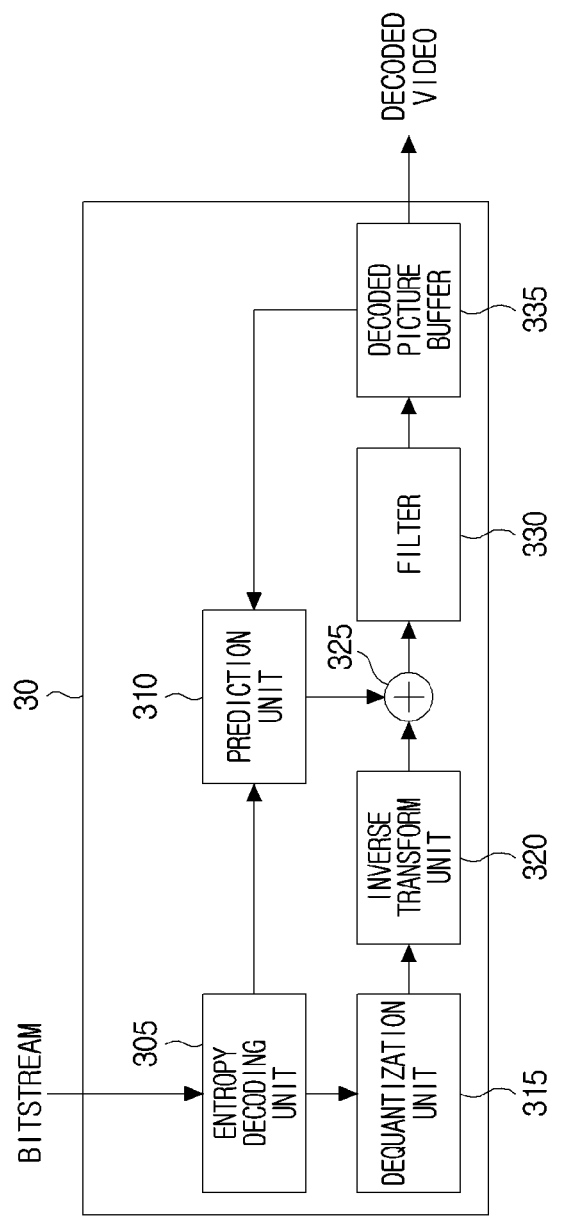
FIG. 3 illustrates a block division type according to an embodiment to which the present invention is applied.

FIG. 3 is a block diagram illustrating an image decoding apparatus according to an embodiment of the present disclosure.

Referring to FIG. 3, an image decoding apparatus 30 may be configured to include an entropy decoder 305, a prediction unit 310, a dequantization unit 315, an inverse transform unit 320, an add unit/subtraction unit 325, a filter 330, and a decoded picture buffer 335.

Further, the prediction unit 310 may be configured to include an intra-prediction module and an inter-prediction module.

When an image bitstream is received from the image encoding apparatus 20, the image bitstream may be transmitted to the entropy decoder 305.

The entropy decoder 305 may decode the bitstream to decoded data including quantized coefficients and decoding information to be transmitted to each component.

The prediction unit 310 may generate a prediction block based on the data received from the entropy decoder 305. Based on a reference image stored in the decoded picture buffer 335, a reference picture list may be made using a default configuration scheme.

The intra-prediction unit may include a reference sample construction unit, a reference sample filter unit, a reference sample interpolation unit, a prediction block generation unit, a prediction mode decoding unit. Some of the components may perform the same processes as in the encoder, and others may inversely perform processes of the encoder.

The dequantization unit 315 may dequantize quantized transform coefficients that are provided in the bitstream and decoded by the entropy decoder 305.

The inverse transform unit 320 may generate a residual block by applying inverse DCT, inverse integer transform, or a similar inverse transform technique to the transform coefficients.

The dequantization unit 315 and the inverse transform unit 320 may reversely perform the processes of the transform unit 210 and the quantization unit 215 of the image encoding apparatus 20 described above, and may be implemented in various ways. For example, the dequantization unit 315 and the inverse transform unit 320 may use the same processes and inverse transform shared with the transform unit 210 and the quantization unit 215, and may reversely perform transformation and quantization using information about the transformation and quantization processes received from the image encoding apparatus 20 (e.g., a transform size, a transform shape, a quantization type, and so on).

The residual block that has been dequantized and inversely transformed may be added to the prediction block derived by the prediction unit 310, thus producing a reconstructed image block. This addition may be performed by the add unit/subtraction unit 325.

Regarding the filter 330, a deblocking filter may be applied to remove a blocking phenomenon from the reconstructed image block, when needed. To improve a video quality before and after the decoding process, other loop filters may be additionally used.

The reconstructed and filtered image block may be stored in the decoded picture buffer 335.

While not shown in the drawings, the image encoding/decoding apparatus may further include a picture division unit and a block division unit.

The picture division unit may divide or partition a picture into at least one area based on a predetermined division unit. Here, the division unit may include a subpicture, a slice, a tile, a brick, a block (e.g., a maximum coding unit), etc.

A picture may be divided into one or more tile rows or one or more tile columns. In this case, the tile may be a block-based unit including a predetermined non-square area of the picture. In this case, the tile may be divided into one or more bricks, and the brick may be composed of blocks in units of rows or columns of tiles.

Slices may be set with one or more configurations, one of which may be composed of a bundle (e.g., blocks, bricks, tiles, etc.) according to a scan order, and one of them may be composed of a shape including a non-square region, and other additional definitions may be possible.

As for a definition of the slice configuration, related information may be explicitly generated or may be implicitly determined. A plurality of definitions for the configuration of each division unit as well as the slice may be set, and selection information regarding this may be generated.

The slice may be configured in units of a non-square shape such as a block, a brick, and a tile, and the slice position and size information may be expressed based on position information (e.g., top-left position, bottom-right position, etc.) for the division unit.

In the present invention, it is described on an assumption that a picture may be composed of one or more sub-pictures, a sub-picture may be composed of one or more slices, tiles or bricks, a slice may be composed of one or more tiles or bricks, and a tile may be composed of one or more bricks. But the present invention is not limited thereto.

The division unit may be composed of an integer number of blocks, but is not limited thereto, and may be composed of a decimal number instead of an integer number. That is, when not composed of an integer number of blocks, at least one division unit may be composed of sub-blocks.

In addition to the non-square slice, there may be division units such as sub-pictures or tiles, and position information, size information of the units may be expressed based on various methods.

For example, the position and size information of a non-square unit may be expressed based on information on a number of non-square units, information on the number of columns or rows of the non-square unit, information on whether evenly divided into columns or rows in the non-square unit, information on a width or height of a column or row unit in the non-square unit, index information of the non-square unit.

In the case of sub-pictures and tiles, the position and size information of each unit may be expressed based on all or part of the information, and based on this, may be divided or partitioned into one or more units.

Meanwhile, it is possible to divide into blocks of various units and sizes through the block division unit. A basic coding unit (or a largest coding unit, coding tree unit. CTU) may mean a basic (or initial) unit for prediction, transform, quantization, etc. in an image coding process. In this case, the basic coding unit may be composed of one luma basic coding block (maximum coding block or CTB) and two basic chroma coding blocks according to a color format (YCbCr in this example), and the size of each block may be determined according to the color format. A coding block (CB) may be obtained according to the partitioning process. A CB may be understood as a unit which is not further sub-divided due to certain restrictions, and may be set as a starting unit for partitioning into sub-units. In the present disclosure, a block conceptually encompasses various shapes such as a triangle, a circle, and so on, not limited to a square.

While the following description is given in the context of one color component, it is also applicable to other color component with some modification, in proportion to a ratio according to the color format (e.g., in case of YCbCr 4:2:0, the width-height length ratio of the luma component and the chroma component is 2:1). Further, although block partitioning dependent on other color component (e.g., depending on the block partitioning result of Y in Cb/Cr) is possible, it should be understood that block independent partitioning of each color component is also possible. Further, although one common block partitioning configuration (in consideration of being proportional to a length ratio) may be used, it is also necessary to consider and understand that an individual block partitioning configuration is used according to a color component.

In the block division unit, a block may be expressed as M×N, and the maximum and minimum values of each block may be obtained within the range. For example, if the maximum and minimum values of a block are 256×256 and 4×4, respectively, a block of size $2m \times 2n$ (m and n are integers of 2 to 8 in this example), a block of size $2m \times 2n$ (m and n are integers of 2 to 128 in this example), or a block of size m×m (m and n are integers of 4 to 256 in this example) may be obtained. Herein, m and n may be equal or different, and one or more ranges in which blocks are supported, such as the maximum value and the minimum value, may be generated.

For example, information about the maximum size and minimum size of a block may be generated, and information about the maximum size and minimum size of a block may be generated in some partitioning configuration. In the former case, the information may be range information about maximum and minimum sizes that may be produced in an image, whereas in the latter case, the information may be information about maximum and minimum sizes that may be produced according to some partitioning configuration. The partitioning configuration may be defined by an image type (I/P/B), a color component (YCbCr or the like), a block type (coding/prediction/transform/quantization), a partitioning type (index or type), and a partitioning scheme (quad tree (QT), binary tree (BT), and ternary tree (TT) as tree methods, and SI2, SI3, and SI4 as type methods).

Further, there may be a constraint on a width-height ratio available to a block (a block shape), and in this regard, a boundary value may be set. Only blocks less than or equal to/less than a boundary value k may be supported, where k may be defined according to a width-height ratio, A/B (A is the longer or equal value between the width and height, and B is the other value). k may be a real number equal to or larger than 1, such as 1.5, 2, 3, 4, or the like. As in the above example, a constraint on the shape of one block in an image may be supported, or one or more constrains may be supported according to a partitioning configuration.

In summary, it may be determined whether block partitioning is supported based on the above-described range and constraint and a later-described partitioning configuration. For example, when a candidate (child block) split from a block (parent block) is satisfying a supported block condition, the partitioning may be supported, and otherwise, the partitioning may not be supported.

The block division unit may be configured in relation to each component of the image encoding apparatus and the image decoding apparatus, and the size and shape of a block may be determined in this process. Different blocks may be configured according to components. The blocks may include a prediction block for the prediction unit, a transform block for the transform unit, and a quantization block for the quantization unit. However, the present disclosure is not limited thereto, and block units may be additionally defined for other components. While the shape of each of an input and an output is described as a non-square in each component in the present disclosure, the input and the output of some component may have any other shape (e.g., a non-square triangle).

The size and shape of an initial (or starting) block in the block division unit may be determined from a higher unit. The initial block may be split into smaller blocks. Once an optimal size and shape are determined according to the block partitioning, the block may be determined as an initial block for a lower unit. The higher unit may be a coding block, and the lower unit may be a prediction block or a transform block, to which the present disclosure is not limited. Rather, various modification examples are possible. Once the initial block of the lower unit is determined as in the above example, a partitioning process may be performed to detect a block of an optimal size and shape like the higher unit.

In summary, the block division unit may split a basic coding block (or maximum coding block) into at least one coding block, and the coding block may be split into at least one prediction block/transform block/quantization block. Further, the prediction block may be split into at least one transform block/quantization block, and the transform block may be split into at least one quantization block. Some blocks may be in a dependent relationship with other blocks (i.e., defined by a higher unit and a lower unit) or may have an independent relationship with other blocks. For example, the prediction block may be a higher unit above the transform block or may be a unit independent of the transform block. Various relationships may be established according to the types of blocks.

Depending on a coding setting, whether to combine a higher unit and a lower unit may be determined. Combination between units means that a block of a higher unit is subjected to a coding process of a lower unit (e.g., in the prediction unit, transform unit, inverse transform unit, and so on), without being split into lower units. That is, it may mean that a partitioning process is shared between a plurality of units, and partitioning information is generated in one (e.g., a higher unit) of the units.

For example, (when a coding block is combined with a prediction block or a transform block), the coding block may be subjected to prediction, transformation, and inverse transformation.

For example, (when a coding block is combined with a prediction block), the coding block may be subjected to prediction, and a transform block equal to or smaller than the coding block in size may be subjected to transformation and inverse transformation.

For example, (when a coding block is combined with a transform block), a prediction block equal to or smaller than the coding block in size may be subjected to prediction, and the coding block may be subjected to transformation and inverse transformation.

For example, (when a prediction block is combined with a transform block), a prediction block equal to or smaller than the coding block in size may be subjected to prediction, transformation, and inverse transformation.

For example, (when there is no block combining), a prediction block equal to or smaller than a coding block in size may be subjected to prediction, and a transform block equal to or smaller than the coding block in size may be subjected to transformation and inverse transformation.

While various cases of a coding block, a prediction block, and a transform block have been described in the above examples, the present disclosure is not limited thereto.

For combination between units, a fixed configuration may be supported in an image, or an adaptive configuration may be supported in consideration of various coding factors. The coding factors include an image type, a color component, a coding mode (intra/inter), a partitioning configuration, a block size/shape/position, a width-height ratio, prediction-related information (e.g., intra-prediction mode, inter-prediction mode, or the like), transformation-related information (e.g., transformation scheme selection information or the like), quantization-related information (e.g., quantization region selection information and quantized transform coefficient coding information), and so on.

When a block of an optimal size and shape has been detected as described above, mode information (e.g., partitioning information) for the block may be generated. The mode information may be included in a bitstream along with information generated from a component to which the block belongs (e.g., prediction-related information and transformation-related information) and transmitted to the decoder, and may be parsed at the same unit level by the decoder, for use in a video decoding process.

Now, a partitioning scheme will be described. While it is assumed that an initial block is shaped into a square, for the convenience of description, the present disclosure is not limited thereto, and the description is applicable in the same manner or a similar manner to a case in which the initial block is non-square.

The block division unit may support various types of partitioning. For example, tree-based partitioning or index-based partitioning may be supported, and other methods may also be supported. In tree-based partitioning, a partition type may be determined based on various types of information (e.g., information indicating whether partitioning is performed, a tree type, a partitioning direction, and so on), whereas in index-based partitioning, a partitioning type may be determined using specific index information.

Figure 4:
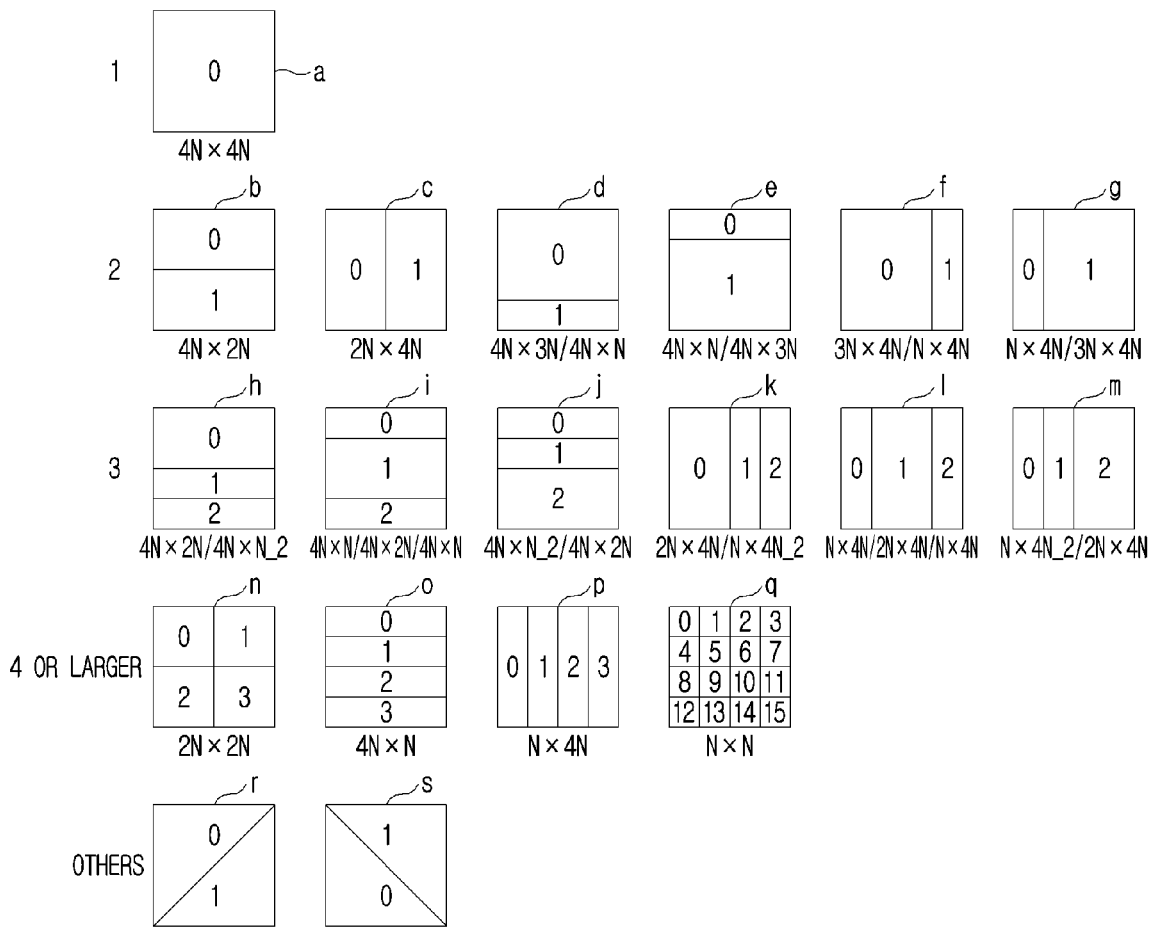
FIG. 4 illustrates a block division method based on a tree structure as an embodiment to which the present invention is applied.

FIG. 4 is an exemplary diagram illustrating various partition types which may be obtained in a block division unit of the present disclosure.

In this example, it is assumed that the partitioning types illustrated in FIG. 4 are obtained by one partitioning operation (or process), which should not be construed as limiting the present disclosure. The partition types may also be obtained in a plurality of partitioning operations. Further, an additional partition type which is not illustrated in FIG. 4 may also be available.

(Tree-Based Partitioning)

In tree-based partitioning of the present disclosure, QT, BT, and TT may be supported. If one tree method is supported, this may be referred to as single-tree partitioning, and if two or more tree methods are supported, this may be referred to as multi-tree partitioning.

In QT, a block is split into two partitions in each of the horizontal and vertical directions (n), whereas in BT, a block is split into two partitions in either the horizontal direction or the vertical direction (b to g). In TT, a block is split into three partitions in either the horizontal direction or the vertical direction (h to m).

In QT, a block may be split into four partitions by limiting the partitioning direction to one of the horizontal and vertical directions (o and p). Further, in BT, only split of a block into equal-sized partitions (b and c), only split of a block into partitions of different sizes (d to g), or both of the partition types may be supported. Further, in TT, split of a block into partitions concentrated only in a specific direction (1:1:2 or 2:1:1 in the direction of left→right or top→bottom) (h, j, k, and m), split of a block into partitions concentrated at the center (1:2:1) (i and I), or both the partition types may be supported. Further, split of a block into four partitions in each of the horizontal and vertical directions (i.e., a total of 16 partitions) may be supported (q).

Among the tree methods, split of a block into z partitions only in the horizontal direction (b, d, e, h, i, j, o), split of a block into z partitions only in the vertical direction (c, f, g, k, l, m, p), or both the partition types may be supported. Herein, z may be an integer equal to or greater than 2, such as 2, 3, or 4.

In the present disclosure, it is assumed that the partition type n is supported as QT, the partition types b and c are supported as BT, and partition types i and I are supported as TT.

One or more of the tree partitioning schemes may be supported according to a coding setting. For example, QT, QT/BT, or QT/BT/TT may be supported.

In the above example, the basic tree partitioning scheme is QT, and BT and TT are included as additional partitioning schemes depending on whether other trees are supported. However, various modifications may be made. Information indicating whether other trees are supported (bt_enabled_flag, tt_enabled_flag, and bt_tt_enabled_flag, with 0 indicating not support and 1 indicating support) may be implicitly determined according to a coding setting or explicitly determined in units such as sequence, picture, sub-picture, slice, tile, brick or etc.

Partitioning information may include information indicating whether partitioning is performed (tree_part_flag or qt_part_flag, bt_part_flag, tt_part_flag, and bt_tt part_flag, which may have a value of 0 or 1 with 0 indicating not partition and 1 indicating partition). Further, depending on partitioning schemes (BT and TT), information about a partitioning direction (dir_part_flag, or bt_dir_part_flag, tt_dir_part_flag, and bt_tt_dir_part_flag, which have a value of 0 or 1 with 0 indicating <width/horizontal> and 1 indicating <height/vertical>) may be added. This may be information that may be generated when partitioning is performed.

When multi-tree partitioning is supported, various pieces of partitioning information may be configured. The following description is given of an example of how partitioning information is configured at one depth level (that is, although recursive partitioning is possible by setting one or more supported partitioning depths), for the convenience of description.

In Example 1, information indicating whether partitioning is performed is checked. If partitioning is not performed, the partitioning ends.

If partitioning is performed, selection information about a partition type (e.g., tree_idx. 0 for QT, 1 for BT, and 2 for TT) is checked. Partitioning direction information is additionally checked according to the selected partition type, and the procedure proceeds to the next step (if additional partitioning is possible for reasons such as when a partitioning depth has not reached a maximum value, the procedure starts again from the beginning, and if the additional partitioning is not possible, the partitioning procedure ends).

In Example 2, information indicating whether partitioning is performed in a certain tree scheme (QT) is checked and the procedure proceeds to the next step. If partitioning is not performed in the tree scheme (QT), information indicating whether partitioning is performed in another tree scheme (BT) is checked. In this case, if partitioning is not performed in the tree scheme, information indicating whether partitioning is performed in a third tree scheme (TT) is checked. If partitioning is not performed in the third tree scheme (TT), the partitioning procedure ends.

If partitioning is performed in the tree scheme (QT), the procedure proceeds to the next step. Further, partitioning is performed in the second tree scheme (BT), partitioning direction information is checked and the procedure proceeds to the next step. If partitioning is performed in the third tree scheme (TT), partitioning direction information is checked and the procedure proceeds to the next step.

In Example 3, information indicating whether partitioning is performed in a tree scheme (QT) is checked. If partitioning is not performed in the tree scheme (QT), information indicating whether partitioning is performed in other tree schemes (BT and TT) is checked. If partitioning is not performed, the partitioning procedure ends.

If partitioning is performed in the tree scheme (QT), the procedure proceeds to the next step. Further, partitioning is performed in the other tree schemes (BT and TT), partitioning direction information is checked and the procedure proceeds to the next step.

While tree partitioning schemes are prioritized (Example 2 and Example 3) or no priorities are assigned to the tree partitioning schemes (Example 1) in the above examples, various modification examples may also be available. Further, partitioning in a current step is not related to the partitioning result of the previous step in the above example. However, it is also possible to configure partitioning in the current step to be dependent on the partitioning result of the previous step.

In Example 1 to Example 3, if some tree partitioning scheme (QT) is performed in the previous step and thus the procedure proceeds to the current step, the same tree partitioning scheme (QT) may be supported in the current step, as well.

On the other hand, if the certain tree partitioning scheme (QT) was not performed and thus another tree partitioning scheme (BT or TT) was performed in the previous step, and then the procedure proceeds to the current step, it may be configured that the other tree partitioning schemes (BT and TT) except for the certain tree partitioning scheme (QT) are supported in the current step and the following steps.

In the above case, a tree configuration supported for block partitioning may be adaptive, and thus the afore-mentioned partitioning information may also be configured differently. (The example to be described later is assumed to be Example 3). That is, if partitioning is not performed in the certain tree scheme (QT) in the previous step, the partitioning procedure may be performed with no regard to the tree scheme (QT) in the current step. In addition, partitioning information related to the certain tree scheme (e.g., information indicating whether partitioning is performed, information about a partitioning direction, and so on. In this example <QT>, information indicating whether partitioning is performed) may be removed.

The above example relates to an adaptive partitioning information configuration for the case where block partitioning is allowed (e.g., a block size is within a range between maximum and minimum values, the partitioning depth of each tree scheme has not reached a maximum depth (allowed depth), or the like). Even when block partitioning is restricted (e.g., the block size does not exist in the range between the maximum and minimum values, the partitioning depth of each tree scheme has reached the maximum depth, or the like), partitioning information may be configured adaptively.

As already mentioned, tree-based partitioning may be performed in a recursive manner in the present disclosure. For example, if a partition flag of a coding block with a partitioning depth of k is set to 0, coding block encoding is performed in the coding block with the partitioning depth of k. If the partition flag of the coding block with the partitioning depth of k is set to 1, coding block encoding is performed in N sub-coding blocks with a partitioning depth of k+1 according to a partitioning scheme (where N is an integer equal to or greater than 2, such as 2, 3, and 4).

The sub-coding block may be set as a coding block (k+1) and partitioned into sub-coding blocks (k+2) in the above procedure. This hierarchical partitioning scheme may be determined according to a partitioning configuration such as a partitioning range and an allowed partitioning depth.

In this case, a bitstream structure representing partitioning information may be selected from among one or more scan methods. For example, the bitstream of the partitioning information may be configured based on an order of partitioning depths, or based on whether partitioning is performed.

For example, in the partitioning depth order-based case, partitioning information is obtained at a current depth level based on an initial block, and then partitioning information is obtained at the next depth level. In the case based on whether partitioning is performed, additional partitioning information is first obtained in a block split from an initial block, and other additional scan methods may be considered.

The maximum block size and minimum block size may have a common setting regardless of the tree type (or all trees), or may have individual settings for each tree, or may have a common setting for two or more trees. have. In this case, the size of the maximum block may be set equal to or smaller than the maximum coding block. If the size of the maximum block according to the predetermined first tree is not the same as the maximum block size, partitioning is implicitly performed using a predetermined second tree method until the maximum block size of the first tree is reached.

In addition, regardless of the tree type, a common split depth may be supported, an individual split depth may be supported according to each tree, or a common split depth for two or more trees may be supported. Alternatively, a split depth may be supported for some trees, and a split depth may not be supported for some trees.

An explicit syntax element for the setting information may be supported, and some setting information may be determined implicitly.

(Index-Based Partitioning)

In index-based partitioning of the present disclosure, a constant split index (CSI) scheme and a variable split index (VSI) scheme may be supported.

In the CSI scheme, k sub-blocks may be obtained through partitioning in a predetermined direction, and k may be an integer equal to or greater than 2, such as 2, 3, or 4. Specifically, the size and shape of a sub-block may be determined based on k irrespective of the size and shape of a block. The predetermined direction may be one of or a combination of two or more of horizontal, vertical, and diagonal directions (top-left→bottom-right direction or bottom-left→top-right direction).

In the index-based CSI partitioning scheme of the present disclosure, z candidates may be obtained through partitioning in either the horizontal direction or the vertical direction. In this case, z may be an integer equal to or greater than 2, such as 2, 3, or 4, and the sub-blocks may be equal in one of width and height and may be equal or different in the other one of width and height. The width or height length ratio of the sub-blocks are A1:A2: . . . :AZ, and each of A1 to AZ may be an integer equal to or greater than 1, such as 1, 2, or 3.

Further, a candidate may be obtained by partitioning into x partitions and y partitions along the horizontal and vertical directions, respectively. Each of x and y may be an integer equal to or greater than 1, such as 1, 2, 3, or 4. However, a candidate with both x and y being 1s may be restricted (because a already exists). Although FIG. 4 illustrates cases where sub-blocks have the same width or height ratio, candidates having the different width ratio or height ratio may also be included.

Further, a candidate may be split into w partitions in one of diagonal directions, top-left→bottom-right and bottom-left→top-right. Herein, w may be an integer equal to or greater than 2, such as 2 or 3.

Referring to FIG. 4, partition types may be classified into a symmetrical partition type (b) and an asymmetric partition type (d and e) according to a length ratio of each sub-block. Further, partition types may be classified into a partition type concentrated in a specific direction (k and m) and a centered partitioning type (k). Partition types may be defined by various coding factors including a sub-block shape as well as a sub-block length ratio, and a supported partition type may be implicitly or explicitly determined according to a coding setting. Thus, a candidate group may be determined based on the supported partition type in the index-based partitioning scheme.

In the VSI scheme, with the width w or height h of each sub-block fixed, one or more sub-blocks may be obtained through partitioning in a predetermined direction. Herein, each of w and h may be an integer equal to or greater than 1, such as 1, 2, 4, or 8. Specifically, the number of sub-blocks may be determined based on the size and shape of a block, and the w or h value.

In the index-based VSI partitioning scheme of the present disclosure, a candidate may be partitioned into sub-blocks, each being fixed in one of the width and length. Alternatively, a candidate may be partitioned into sub-blocks, each being fixed in both the width and length. Since the width or height of a sub-block is fixed, equal partitioning in the horizontal or vertical direction may be allowed. However, the present disclosure is not limited thereto.

In the case where a block is of size M×N prior to partitioning, if the width w of each sub-block is fixed, the height h of each sub-block is fixed, or both of the width w and height h of each sub-block are fixed, the number of obtained sub-blocks may be (M*N)/w, (M*N)/h, or (M*N)/w/h.

Depending on a coding setting, only one or both of the CSI scheme and the VSI scheme may be supported, and information about a supported scheme may be implicitly or explicitly determined.

The present disclosure will be described in the context of the CSI scheme being supported.

A candidate group may be configured to include two or more candidates in the index-based partitioning scheme according to a coding setting.

For example, a candidate group such as {a, b, c}, {a, b, c, n}, or {a to g and n} may be formed. The candidate group may be an example of including block types predicted to occur many times based on general statistical characteristics, such as a block divided into two partitions in the horizontal or vertical direction or in each of the horizontal and vertical directions.

Alternatively, a candidate group such as {a, b}, {a, o}, or {a, b, o}, or a candidate group such as {a, c}, {a, p}, or {a, c, p} may be configured. The candidate group may be an example of including candidates each being partitioned into partitions and four partitions in the horizontal and vertical directions, respectively. This may be an example of configuring block types predicted to be partitioned mainly in a specific direction as a candidate group.

Alternatively, a candidate group such as {a, o, p} or {a, n, q} may be configured. This may be an example of configuring a candidate group to include block types predicted to be partitioned into many partitions smaller than a block prior to partitioning.

Alternatively, a candidate group such as {a, r, s} may be configured, and it may be an example of determining that the optimal partitions result that may be obtained in a non-square shape through other method (tree method) from the block before being split, and configuring the non-square shape as a candidate group.

As noted from the above examples, various candidate group configurations may be available, and one or more candidate group configurations may be supported in consideration of various encoding/decoding factors.

Once a candidate group is completely configured, various partitioning information configurations may be available.

For example, regarding a candidate group including the candidate a which is not partitioned and the candidates b to s which are partitioned, index selection information may be generated.

Alternatively, information indicating whether partitioning is performed (information indicating whether the partitioning type is a) may be generated. If partitioning is performed (if the partitioning type is not a), index selection information may be generated regarding a candidate group including the candidates b to s that are partitioned.

The partitioning information may be configured in many other ways than described above. Except for the information indicating whether partitioning is performed, binary bits may be assigned to the index of each candidate in the candidate group in various manners such as fixed length binarization, variable length binarization, and so on. If the number of the candidate is 2, 1 bit may be assigned to the index selection information, and if the number of the candidates is 3, one or more bits may be assigned to the index selection information.

Compared to the tree-based partitioning scheme, partition types predicted to occur many times may be included in a candidate group in the index-based partitioning scheme.

Since the number of bits used to represent index information may increase according to the number of supported candidate groups, this scheme may be suitable for single-layer partitioning (e.g., the partitioning depth is limited to 0), instead of tree-based hierarchical partitioning (recursive partitioning). That is, a single partitioning operation may be supported, and a sub-block obtained through index-based partitioning may not be further split.

This may mean that further partitioning into smaller blocks of the same type is impossible (e.g., a coding block obtained through index-based partitioning may not be further split into coding blocks), and also mean that further partitioning into different types of blocks may also be impossible (e.g., partitioning of a coding block into prediction blocks as well as coding blocks is not possible). Obviously, the present disclosure is not limited to the above example, and other modification examples may also be available.

Now, a description will be given of determination of a block partitioning configuration mainly based on a block type among coding factors.

First, a coding block may be obtained in a partitioning process. A tree-based partitioning scheme may be adopted for the partitioning process, and a partition type such as a(no split), n(QT), b, c(BT), i, or I(TT) of FIG. 4 may result according to a tree type. Various combinations of tree types, such as QT/QT+BT/QT+BT+TT may be available according to a coding configuration.

The following examples are processes of finally dividing a coding block obtained in the above procedure into prediction blocks and transform blocks. It is assumed that prediction, transformation, and inverse transformation are performed based on the size of each partition.

In Example 1, prediction may be performed by setting the size of a prediction block equal to that of a coding block, and transformation and inverse transformation may be performed by setting the size of a transform block equal to that of the coding block (or prediction block).

In Example 2, prediction may be performed by setting the size of a prediction block equal to that of a coding block. A transform block may be obtained by partitioning the coding block (or prediction block) and transformation and inverse transformation may be performed based on the size of the obtained transform block.

Here, a tree-based partitioning scheme may be adopted for the partitioning process, and a partition type such as a(no split), n(QT), b, c(BT), i, or I(TT) of FIG. 4 may result according to a tree type. Various combinations of tree types, such as QT/QT+BT/QT+BT+TT may be available according to a coding configuration.

Here, the partitioning process may be an index-based partitioning scheme. A partition type such as a (no split), b, c, or d of FIG. 4 may be obtained according to an index type. Depending on a coding configuration, various candidate groups such as {a, b, c} and {a, b, c, d} may be configured.

In Example 3, a prediction block may be obtained by partitioning a coding block, and subjected to prediction based on the size of the obtained prediction block. For a transform block, its size is set to the size of the coding block, and transformation and inverse transformation may be performed on the transform block. In this example, the prediction block and the transform block may be in an independent relationship.

An index-based partitioning scheme may be used for the partitioning process, and a partitioning type such as a (no split), b to g, n, r, or s of FIG. 4 may be obtained according to an index type. Various candidate groups such as {a, b, c, n}, {a to g, n}, and {a, r, s}, may be configured according to a coding configuration.

In Example 4, a prediction block may be obtained by partitioning a coding block, and subjected to prediction based on the size of the obtained prediction block. For a transform block, its size is set to the size of the prediction block, and transformation and inverse transformation may be performed on the transform block. In this example, the transform block may have a size equal to the size of the obtained prediction block or vice versa (the size of the transform block is set as the size of the prediction block).

A tree-based partitioning scheme may be used for the partitioning process, and a partition type such as a (no split), b, c (BT), i, I (TT), or n (QT) of FIG. 4 may be generated according to a tree type. Depending on a coding configuration, various combinations of tree types such as QT/BT/QT+BT may be available.

Here, an index-based partitioning scheme may be used for the partitioning process, and a partition type such as a (no split), b, c, n, o, or p of FIG. 4 may result according to an index type. Various candidate groups such as {a, b}, {a, c}, {a, n}, {a, o}, {a, p}, {a, b, c}, {a, o, p}, {a, b, c, n}, and {a, b, c, n, p} may be configured depending on a coding configuration. Further, a candidate group may be configured in the VSI scheme alone or the CSI scheme and the VSI scheme in combination, as the index-based partitioning scheme(s).

In Example 5, a prediction block may be obtained by partitioning a coding block, and subjected to prediction based on the size of the obtained prediction block. A transform block may also be obtained by partitioning the coding block and subjected to transformation and inverse transformation based on the size of the obtained transform block. In this example, each of a prediction block and a transform block may result from partitioning a coding block.

Here, a tree-based partitioning scheme and an index-based partitioning scheme may be used for the partitioning process, and a candidate group may be configured in the same manner as or in a similar manner to in Example 4.

In this case, the above examples are cases that may occur depending on whether a process of partitioning each block type is shared, which should not be construed as limiting the present disclosure. Various modification examples may also be available. Further, a block partitioning configuration may be determined in consideration of various coding factors as well as a block type.

The coding factors may include an image type (I/P/B), a color component (YCbCr), a block size/shape/position, a block width-height ratio, a block type (coding block, prediction block, transform block, or quantization block), a partition state, a coding mode (Intra/Inter), prediction-related information (intra-prediction mode or inter-prediction mode), transformation-related information (transformation scheme selection information), quantization-related information (quantization region selection information and quantized transform coefficient coding information).

In an image encoding method according to an embodiment of the present invention, inter prediction may be configured as follows. The inter prediction of the prediction unit may include a reference picture construction step, a motion estimation step, a motion compensation step, a motion information determination step, and a motion information encoding step. In addition, the video encoding apparatus may include a reference picture construction unit, a motion estimation unit, a motion compensation unit, a motion information determination unit, and a motion information encoding unit that implement the reference picture construction step, the motion estimation step, the motion compensation step, the motion information determination step, and the motion information encoding step. Some of the above-described processes may be omitted or other processes may be added, and may be changed in an order other than the order described above.

In the video decoding method according to an embodiment of the present invention, inter prediction may be configured as follows. The inter prediction of the prediction unit may include a motion information decoding step, a reference picture construction step, and a motion compensation step. Also, the image decoding apparatus may include a motion information decoding unit, a reference picture construction unit, and a motion compensation unit that implement the motion information decoding step, the reference picture construction step and the motion compensation step. Some of the above-described processes may be omitted or other processes may be added, and may be changed in an order other than the order described above.

Since the reference picture construction unit and the motion compensation unit of the image decoding apparatus perform the same role as the corresponding configuration of the image decoding apparatus, detailed descriptions are omitted, and the motion information decoding unit may be performed using the method used in the motion information encoding unit in reverse. Here, a prediction block generated by the motion compensation unit may be transmitted to the addition unit.

Figure 5:
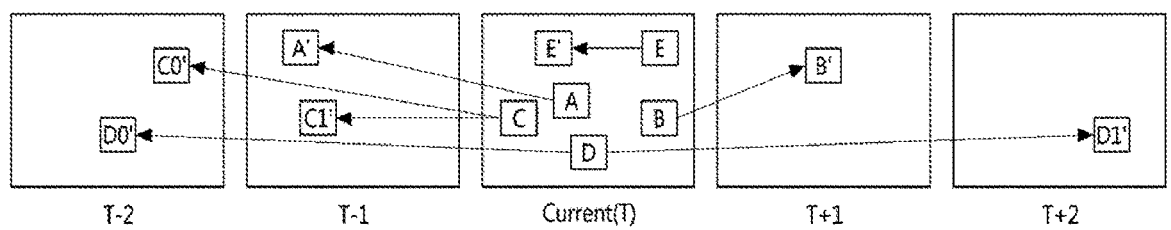
FIG. 5 is an exemplary diagram illustrating various cases of obtaining a prediction block through inter prediction according to the present invention.

FIG. 5 is an exemplary diagram illustrating various cases of obtaining a prediction block through inter prediction according to the present invention.

Referring to FIG. 5, in uni-directional prediction, a prediction block A (forward prediction) may be obtained from previously coded reference pictures (T−1, T−2), or a prediction block B (backward prediction) may be obtained from later coded reference picture (T+1, T−2). In bi-directional prediction, prediction blocks C and D may be generated from a plurality of previously coded reference pictures (T−2 to T+2). In general, a P picture type may support uni-directional and a B picture type may support bi-directional prediction.

As in the above example, a picture referenced for coding of a current picture may be obtained from a memory, and a reference picture list may be constructed by including a reference picture before the current picture and a reference picture after the current picture in a temporal or display order based on the current picture T.

An inter prediction (E) may be performed on the current image as well as the previous or subsequent images based on the current image. Performing inter prediction on the current image may be referred to as non-directional prediction. This may be supported by an I image type or a P/B image type, and a supported image type may be determined according to a coding setting. Performing inter prediction in the current image is to generate a prediction block using spatial correlation. For the purpose of using temporal correlation, performing inter prediction in other images is different, but a prediction method (e.g., reference image, Motion vectors, etc.) may be the same.

Here, it is assumed that P and B pictures are the image types capable of performing inter prediction, but may also be applicable to various image types that are added or replaced. For example, a specific image type may not support intra prediction, but may only support inter prediction, or may only support inter prediction in a predetermined direction (backward direction), or may only support inter prediction in a predetermined direction.

The reference picture construction unit may construct and manage a reference picture used for coding a current picture through a reference picture list. At least one reference picture list may be constructed according to coding settings (e.g., an image type, a prediction direction, etc.), and a prediction block may be generated from a reference picture included in the reference picture list.

In the case of uni-directional prediction, inter prediction may be performed on at least one reference picture included in a reference picture list 0 (L0) or a reference picture list 1 (L1). In addition, in the case of bi-directional prediction, inter prediction may be performed on at least one reference picture included in a combination list LC generated by combining L0 and L1.

For example, uni-directional prediction may be classified into forward prediction (Pred_L0) using a forward reference picture list (L0) and backward prediction (Pred_L1) using a backward reference picture list (L1). The bi-directional prediction (Pred_BI) may use both the forward reference picture list L0 and the backward reference picture list L1.

Alternatively, performing two or more forward predictions by copying the forward reference picture list (L0) to the backward reference picture list (L1) may be included in the bi-directional prediction, and performing two or more backward predictions by copying the backward reference picture list (L1) is transferred. Two or more backward predictions by copying the backward reference picture list (L0) to the forward reference picture list (L1) may also be included in the bi-directional prediction.

The prediction direction may be indicated by flag information indicating the corresponding direction (e.g., inter_pred_idc, this value is assumed to be adjustable by predFlagL0, predFlagL1, predFlagBI). predFlagL0 indicates whether forward prediction is performed, and predFlagL1 indicates whether backward prediction is performed. Bi-directional prediction may be indicated by indicating whether prediction is made through predFlagBI or by simultaneously activating predFlagL0 and predFlagL1 (e.g., when each flag is 1).

In the present invention, a case of omni-prediction and uni-prediction using an omni-directional reference picture list is mainly described, but the same or modified application may be applied to other cases.

In general, it is possible to use a method of determining an optimal reference picture for a picture to be encoded by an encoder, and explicitly transmitting information on the reference picture to a decoder. To this end, the reference picture construction unit may manage a picture list referenced for inter prediction of the current picture, and may set a rule for reference picture management in consideration of a limited memory size.

The transmitted information may be defined as a reference picture set (RPS), and pictures selected in the RPS are classified as reference pictures and stored in a memory (or DPB), and pictures not selected in the RPS are classified as non-reference pictures. It may be removed from memory after an hour. A predetermined number of pictures (e.g., 14, 15, 16 pictures or more) may be stored in the memory, and the size of the memory may be set according to the level and resolution of the image.

Figure 6:
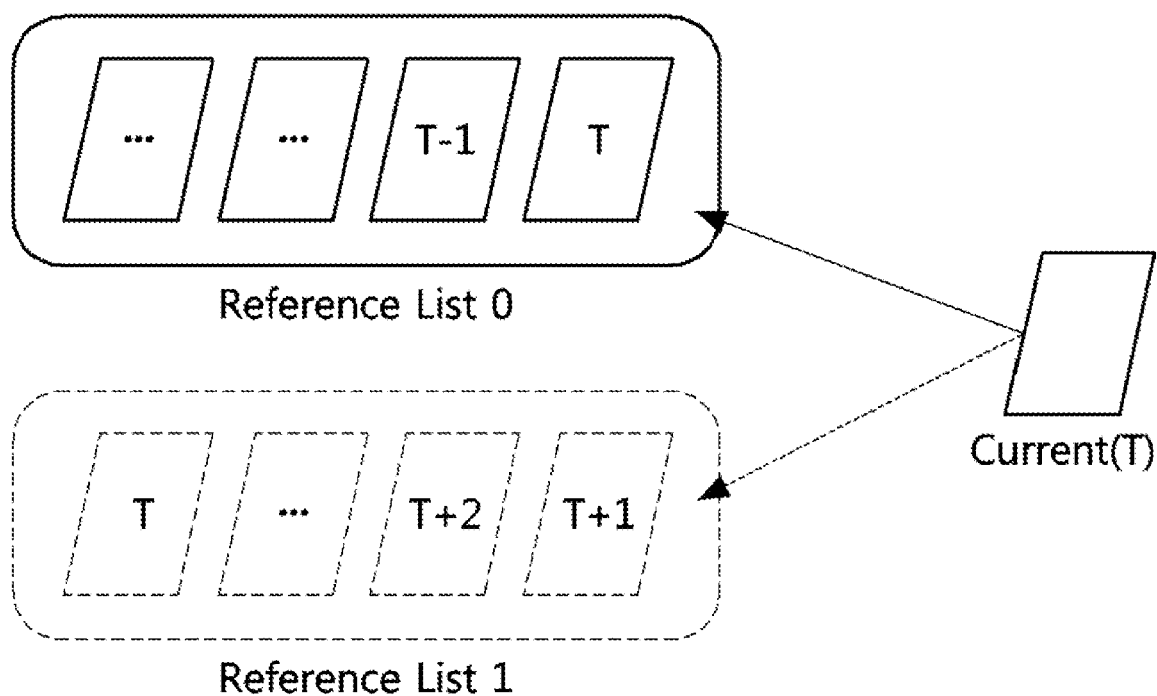
FIG. 6 is an exemplary diagram of constructing a reference picture list according to an embodiment of the present invention.

FIG. 6 is an exemplary diagram of constructing a reference picture list according to an embodiment of the present invention.

Referring to FIG. 6, in general, reference pictures (T−1, T−2) existing before the current picture may be assigned to L0 and managed, and reference pictures (T+1, T+2) existing after the current picture may be assigned to L1 and managed. When constructing L0, a reference picture of L1 may be allocated may the number of reference pictures of L0 is not sufficient. Similarly, when constructing L1, a reference picture of L0 may be allocated when the number of reference pictures of L1 is not sufficient.

Also, the current picture may be included in at least one reference picture list. For example, L0 or L1 may include the current picture, and L0 may be constructed by adding a reference picture (or current picture) with a temporal order of T to a reference picture prior to the current picture, and L1 may be constructed by adding a reference picture with a temporal order of T to a reference picture after the current picture.

The construction of the reference picture list may be determined according to coding settings.

The current picture may not be included in a reference picture list, but may be managed through a separate memory separated from the reference picture list, or the current picture may be included in at least one reference picture list and managed.

For example, it may be determined by a signal (curr_pic_ref_enabled_flag) indicating whether a reference picture list includes the current picture. Here, the signal may be implicitly determined information or explicitly generated information.

Specifically, when the signal is deactivated (e.g., curr_pic_ref_enabled_flag=0), the current picture may not be included in any reference picture list as a reference picture, and when the signal is activated (e.g., curr_pic_ref_enabled_flag=1), whether to include the current picture in a predetermined reference picture list may be implicitly determined (e.g., added only to L0, added only to L1, and may be added to L0 and L1 at the same time) or explicitly related signals (e.g., curr_pic_ref_from_l0_flag, curr_pic_ref_from_l1_flag) may be generated and determined. The signal may be supported in units such as a sequence, a picture, a sub-picture, a slice, a tile, and a brick.

Here, the current picture may be located in a first or last order of the reference picture list as shown in FIG. 6, and the arrangement order in the list may be determined according to coding settings (e.g., image type information). For example, the I type may be located first, and the P/B type may be located last, but the present invention is not limited thereto, and other examples of modifications may be possible.

Alternatively, an individual reference picture memory may be supported according to a signal (ibc_enabled_flag) indicating whether block matching (or template matching) is supported in the current picture. Here, the signal may be implicitly determined information or explicitly generated information.

In detail, when the signal is deactivated (e.g., ibc_enabled_flag=0), it may mean that block matching is not supported in the current picture, and when the signal is activated (e.g., ibc_enabled_flag=1), block matching may be supported in the current picture, and the reference picture memory for this may be supported. In this example, it is assumed that an additional memory is provided, but it is also possible to set up to support block matching directly from an existing memory supported for the current picture without providing the additional memory.

The reference picture construction unit may include a reference picture interpolation unit, and whether to perform an interpolation process for a pixel of a fractional unit may be determined according to interpolation precision of inter prediction. For example, when the interpolation precision is in an integer unit, the reference picture interpolation process may be omitted, and when the interpolation precision is in a fractional unit, the reference picture interpolation process may be performed.

An interpolation filter used in a reference picture interpolation process may be implicitly determined according to coding settings or may be explicitly determined from among a plurality of interpolation filters. The configuration of the plurality of interpolation filters may support fixed candidates or adaptive candidates according to coding settings, and the number of candidates may be an integer of 2, 3, 4 or more. The explicitly determined unit may be determined from a sequence, a picture, a sub-picture, a slice, a tile, a brick, or a block.

Here, the coding settings may be determined according to an image type, a color component, state information of a target block (e.g., block size, shape, horizontal/vertical length ratio, etc.), inter prediction settings (e.g., motion information coding mode, motion model selection information, motion vector precision selection information, reference picture, reference direction, etc.). The motion vector precision may mean a precision of a motion vector (i.e., pmv+mvd), but may be replaced with a precision of a motion vector predictor (pmv) or a motion vector difference (mvd).

Here, the interpolation filter may have a filter length of k-tap, and k may be an integer of 2, 3, 4, 5, 6, 7, 8 or more. The filter coefficient may be derived from an equation having various coefficient characteristics such as a Wiener filter and a Kalman filter. Filter information (e.g., filter coefficient, tap information, etc.) used for interpolation may be implicitly determined or derived, or related information may be explicitly generated. In this case, the filter coefficient may be configured to include 0.

The interpolation filter may be applied to a predetermined pixel unit, and the predetermined pixel unit may be limited to an integer or a fractional unit, or may be applied to the integer and the fractional unit.

For example, the interpolation filter may be applied to k integer unit pixels adjacent to an interpolation target pixel (i.e., fractional unit pixel) in a horizontal direction or a vertical direction.

Alternatively, an interpolation filter may be applied to p integer unit pixels and q fractional unit pixels (p+q=k) adjacent to the interpolation target pixel in the horizontal or vertical direction. In this case, the precision of the fractional unit referred to for interpolation (e.g., in the unit of ¼) may be expressed with the same or lower precision (e.g., $2/4 \rightarrow 1/2$) than the interpolation target pixel.

When only one of the x and y components of the interpolation target pixel is located in a fractional unit, interpolation may be performed based on k pixels adjacent to the fractional component direction (e.g., the x-axis is horizontal and the y-axis is vertical). When both the x and y components of the interpolation target pixel are located in a fractional unit, a first interpolation may be performed based on x pixels adjacent in either horizontal or vertical direction, and interpolation is performed based on y pixels adjacent in the other direction. In this case, a case where x and y are the same as k will be described, but the case is not limited thereto, and a case where x and y are different may also occur.

The interpolation target pixel may be obtained by interpolation precision (1/m), and m may be an integer of 1, 2, 4, 8, 16, 32 or higher. The interpolation precision may be implicitly determined according to a coding setting, or related information may be explicitly generated. The coding setting may be defined based on an image type, a color component, a reference picture, a motion information coding mode, motion model selection information, etc. The explicitly determined unit may be determined from a sequence, a sub picture, a slice, a tile, or a brick.

Through the above process, an interpolation filter setting of a target block may be obtained, and reference picture interpolation may be performed based thereon. In addition, a detailed interpolation filter setting based on the interpolation filter setting may be obtained, and reference picture interpolation may be performed based thereon. That is, it is assumed that the obtained interpolation filter setting of the target block may be obtained by obtaining one fixed candidate, but may also be obtaining the possibility of using a plurality of candidates. In the example described later, it is assumed that the interpolation precision is 1/16 (e.g., 15 pixels to be interpolated).

As an example of setting the detailed interpolation filter, one of a plurality of candidates may be adaptively used for a first pixel unit at a predetermined position, and one predetermined interpolation filter may be used for a second pixel unit at a predetermined position.

The first pixel unit may be determined among pixels of all fractional units (1/16 to 15/16 in this example) supported by interpolation precision, and the number of pixels included in the first pixel unit may be a, and a may be determined between 0, 1, 2, . . . , (m−1).

The second pixel unit may include a pixel excluding the first pixel unit from a pixel of total fractional units, and the number of pixels included in the second pixel unit may be derived by subtracting the number of pixels in the first pixel unit from the total number of pixels to be interpolated. In this example, an example of dividing the pixel unit into two will be described, but the present invention is not limited thereto and may be divided into three or more.

For example, the first pixel unit may be a unit expressed in a multiple unit such as ½, ¼, ⅛. For example, in case of ½ unit, it may be a pixel located at 8/16, and in case of ¼ unit, it may be a pixel located at {4/16, 8/16, 12/16}, and in case of ⅛ unit, it may be a pixel located at {2/16, 4/16, 6/16, 8/16, 10/16, 12/16, 14/16}.

The detailed interpolation filter setting may be determined according to a coding setting, and the coding setting may be defined by an image type, a color component, state information of a target block, an inter prediction setting, etc. The following will look at an example of setting detailed interpolation filters according to various coding elements. For convenience of explanation, it is assumed that a is 0 and c or more (c is an integer greater than or equal to 1).

For example, in the case of a color component (luma, chroma), a may be (1, 0), (0, 1), (1, 1). Alternatively, in the case of the motion information coding mode (merge mode, competition mode), a may be (1, 0), (0, 1), (1, 1), (1, 3). Or, in the case of motion model selection information (translation motion, non-translation motion A, non-translation motion B), a may be (0, 1, 1), (1, 0, 0), (1, 1, 1), (1, 3, 7). Alternatively, in the case of motion vector precision (½, ¼, ⅛), a may be (0, 0, 1), (0, 1, 0), (1, 0, 0), (0, 1, 1), (1, 0, 1), (1, 1, 0), (1, 1, 1). Alternatively, in the case of the reference picture (current picture, other picture) a may be (0, 1), (1, 0), (1, 1).

As described above, an interpolation process may be performed by selecting one of a plurality of interpolation precisions, and when the interpolation process according to an adaptive interpolation precision is supported (e.g., adaptive_ref_resolution_enabled_flag. If 0, a predetermined interpolation precision is used, and If 1, one of a plurality of interpolation precisions is used) precision selection information (e.g., ref_resolution_idx) may be generated.

A motion estimation and compensation process may be performed according to the interpolation precision, and a representation unit and a storage unit for a motion vector may also be determined based on the interpolation precision.

For example, when the interpolation precision is ½ unit, the motion estimation and compensation process may be performed by ½ unit, and motion vectors may be expressed by ½ unit and may be used in the coding process. Also, motion vectors may be stored in units of ½ and may be referred to in a coding process of motion information of another block.

Alternatively, when the interpolation precision is ⅛, the motion estimation and compensation process may be performed in ⅛ units, and motion vectors may be expressed in ⅛ units and may be used in the coding process and stored in ⅛ units.

In addition, motion estimation and compensation processes and motion vectors may be performed, expressed, and stored in units different from interpolation precision, such as integer, ½, and ¼ units, which may be adaptively determined according to an inter prediction method/setting (e.g., motion estimation/compensation method, motion model selection information, motion information coding mode, etc.).

As an example, assuming that the interpolation precision is ⅛, in the case of the translation motion model, motion estimation and compensation may be performed in ¼ units, and motion vectors may be expressed in ¼ units (in this example, assuming a unit in coding process) and may be stored in ⅛ units. In the case of the non-translation motion model, the motion estimation and compensation process may be performed in ⅛ units, and motion vectors may be expressed in ¼ units, and may be stored in ⅛ units.

For example, assuming that the interpolation precision is ⅛ units, in the case of block matching, motion estimation and compensation may be performed in ¼ units, and motion vectors may be expressed in ¼ units and may be stored in ⅛ units. In the case of template matching, motion estimation and compensation process may be performed in ⅛ units, and motion vectors may be expressed in ⅛ units and may be stored in ⅛ units.

For example, assuming that the interpolation precision is ¹⁄₁₆, in the case of the competition mode, the motion estimation and compensation process may be performed in ¼ units, and motion vectors may be expressed in ¼ units and may be stored in ¹⁄₁₆ units. In the case of the merge mode, the motion estimation and compensation process may be performed in units of ⅛, and motion vectors may be expressed in units of ¼, and may be stored in units of ¹⁄₁₆. In the case of the skip mode, motion estimation and compensation may be performed in units of ¹⁄₁₆, and motion vectors may be expressed in units of ¼, and may be stored in units of ¹⁄₁₆.

In summary, units of motion estimation, motion compensation, motion vector expression, and storage may be adaptively determined based on an inter prediction method or setting, and interpolation precision. In detail, units of motion estimation, motion compensation and motion vector expression may be adaptively determined according to the inter prediction method or setting, and a storage unit of a motion vector may generally be determined according to interpolation precision, but is not limited thereto, and examples of various modifications may be possible. In addition, in the above example, examples according to one category (e.g., motion model selection information, motion estimation/compensation method, etc.) have been exemplified, but it may also be possible when two or more categories are mixed to determine the setting.

In addition, as described above, the interpolation precision information may have a predetermined value or may be selected as one of a plurality of precisions, and the reference picture interpolation precision is determined according to the motion estimation and compensation settings supported according to the inter prediction method or setting. For example, when a translation motion model supports up to ⅛ units and a non-translation motion model supports up to ¹⁄₁₆ units, the interpolation process may be performed according to the precision unit of the non-translation motion model with the highest precision.

That is, reference picture interpolation may be performed according to settings for supported precision information such as a translation motion model, a non-translation motion model, a competition mode, a merge mode, and a skip mode. In this case, the precision information may be implicitly or explicitly determined, and when the related information is explicitly generated, it may be included in units such as a sequence, a picture, a sub-picture, a slice, a tile, and a brick.

The motion estimation unit means a process of estimating (or searching) whether a target block has a high correlation with a predetermined block of a predetermined reference picture. The size and shape (M×N) of the target block on which prediction is performed may be obtained from the block division unit. As an example, the target block may be determined in the range of 4×4 to 128×128. In general, inter prediction may be performed in units of prediction blocks, but may be performed in units such as a coding block or a transform block according to a setting of the block division unit. Estimation may be performed within an estimable range of the reference region, and at least one motion estimation method may be used. In the motion estimation method, an estimation order and conditions for each pixel may be defined.

Motion estimation may be performed based on a motion estimation method. For example, a region to be compared for the motion estimation process may be a target block in the case of block matching, and may be a predetermined region (template) set around the target block in the case of template matching. In the former case, a block with the highest correlation may be found within an estimable range of the target block and the reference region, and in the latter case, a region with the highest correlation may be found within the estimable range of the template defined according to a coding setting and the reference region.

Motion estimation may be performed based on a motion model. Motion estimation and compensation may be performed using an additional motion model in addition to a translation motion model that considers only parallel motion. For example, motion estimation and compensation may be performed using a motion model that considers motion such as rotation, perspective, and zoom-in/out as well as parallel motion. This may be supported to improve coding performance by generating a prediction block by reflecting the above various types of motions occurring according to regional characteristics of an image.

Figure 7:
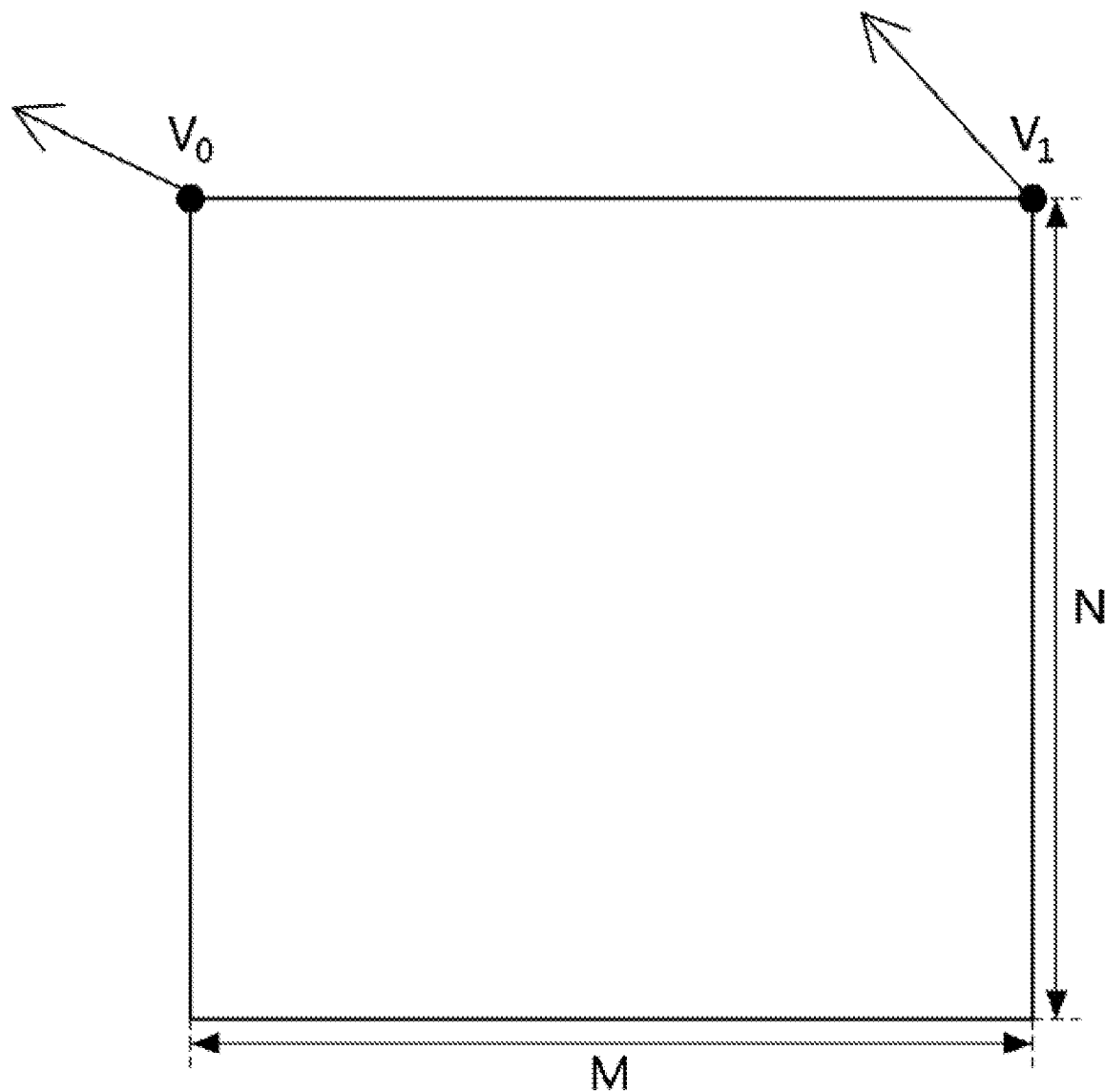
FIG. 7 is a conceptual diagram illustrating a non-translation motion model according to an embodiment of the present invention.

FIG. 7 is a conceptual diagram illustrating a non-translation motion model according to an embodiment of the present invention.

Referring to FIG. 7, as an example of an affine model, an example of expressing motion information based on motion vectors $V_0$ and $V_1$ at a predetermined position is shown. Since motion may be expressed based on a plurality of motion vectors, accurate motion estimation and compensation may be possible.

As in the above example, inter prediction is performed based on a pre-defined motion model, but inter prediction based on an additional motion model may also be supported. Here, it is assumed that the pre-defined motion model is a translation motion model and the additional motion model is an affine model, but the present invention is not limited thereto and various modifications are possible.

In the case of a translation motion model, motion information (assuming uni-directional prediction) may be expressed based on one motion vector, and a control point (reference point) for indicating motion information is assumed to be a top-left coordinate, but is not limited thereto.

In the case of a non-translation motion model, it may be expressed as motion information of various configurations. In this example, it is assumed that the configuration is expressed as additional information in one motion vector (relative to the top-left coordinate). Some motion estimation and compensation mentioned through examples to be described later may not be performed in units of blocks, but may be performed in units of predetermined sub-blocks. In this case, the size and position of the predetermined sub-block may be determined based on each motion model.

Figure 8:
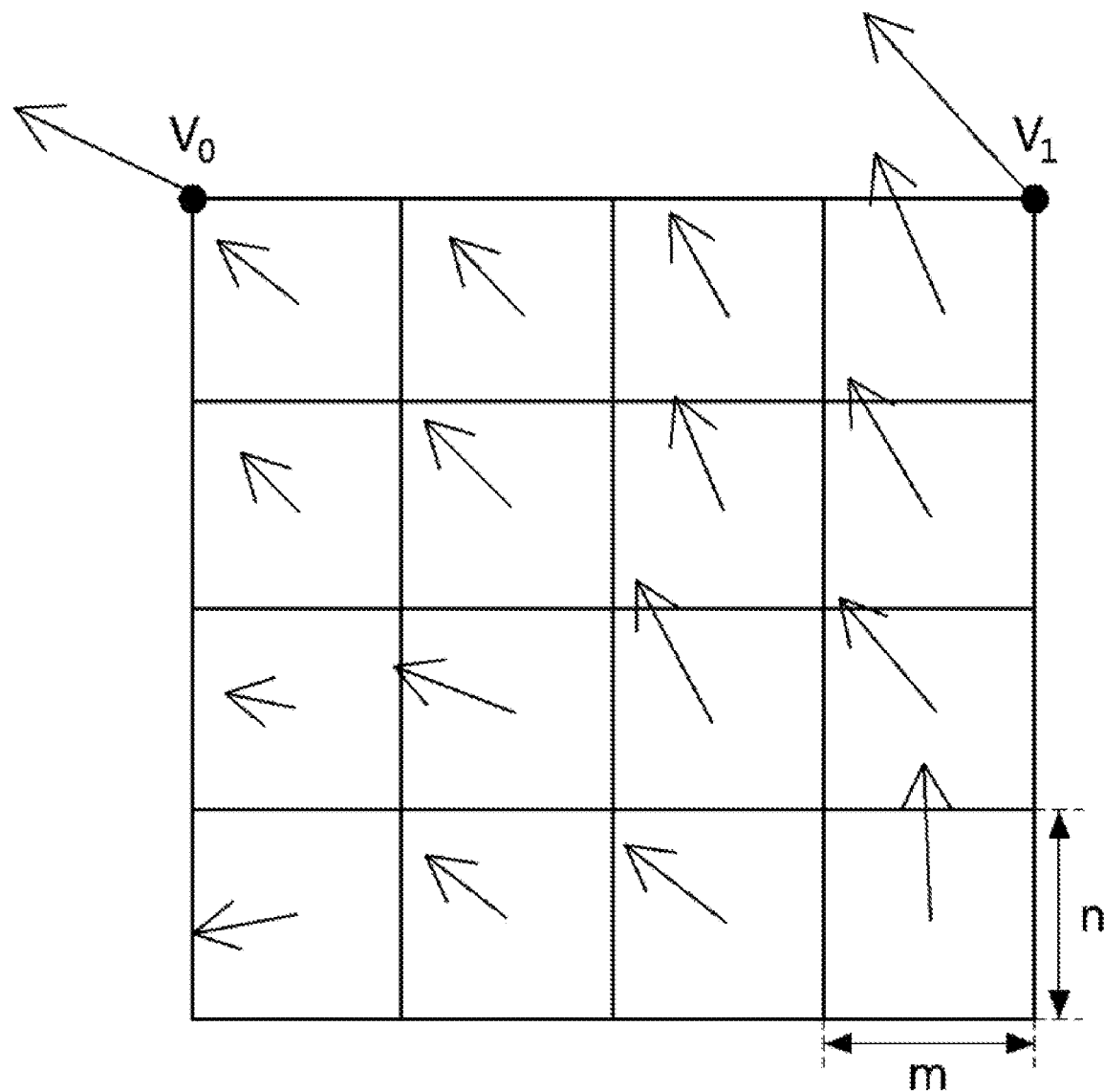
FIG. 8 is an exemplary diagram illustrating motion estimation in units of sub-blocks according to an embodiment of the present invention.

FIG. 8 is an exemplary diagram illustrating motion estimation in units of sub-blocks according to an embodiment of the present invention. In detail, it illustrates motion estimation in units of sub-blocks according to the affine model (two motion vectors).

In the case of the translation motion model, a motion vector of pixel unit included in a target block may be the same. That is, the motion vector may be collectively applied to a pixel unit, and motion estimation and compensation may be performed using one motion vector $V_0$.

In the case of a non-translation motion model (affine model), a motion vector of pixel unit included in a target block may not be the same, and an individual motion vector for each pixel may be required. In this case, a motion vector of a pixel unit or a sub-block unit may be derived based on a motion vector ($V_0$, $V_1$) at a position of a predetermined control point of the target block, and motion estimation and compensation may be performed using the derived motion vector.

For example, a motion vector of a sub-block or pixel unit within the target block (e.g., ($V_x$,$V_y$)) may be derived by an equation $V_x=(V_{1x}-V_{0x}) \times x/M - (V_{1y}-V_{0y}) \times y/N+V_{0x}$, $V_y=(V_{1y}-V_{0y}) \times x/M+(V_{1x}-V_{0x}) \times y/N+V_{0y}$. In the above equation, $V_0$ (in this example, ($V_{0x}$,$V_{0y}$)) refers to a motion vector at the top-left of the target block, and $V_1$ (in this example, ($V_{1x}$,$V_{1y}$)) refers to a motion vector at the top-right of the target block. In consideration of complexity, motion estimation and motion compensation of a non-translation motion model may be performed in units of sub-blocks.

Here, the size of the sub-block (M×N) may be determined according to a coding setting, and may have a fixed size or may be set to an adaptive size. Here, M and N may be 2, 4, 8, 16 or more integers, and M and N may or may not be the same. The size of the sub-block may be explicitly generated in units such as a sequence, a picture, a sub-picture, a slice, a tile, and a brick. Alternatively, it may be implicitly determined by a common commitment between the encoder and the decoder, or may be determined by a coding setting.

Here, the coding setting may be defined by one or more elements in state information, an image type, a color component, inter prediction setting information (motion information coding mode, reference picture information, interpolation precision, motion model selection information, etc.) of the target block.

In the above example, a process of deriving a size of a sub-block according to a predetermined non-translation motion model, and performing motion estimation and compensation based thereon has been described. As in the above example, motion estimation and compensation in units of sub-blocks or pixels according to the motion model may be performed, and detailed descriptions thereof will be omitted.

The following shows various examples of motion information constructed according to a motion model.

For example, in the case of a motion model expressing rotational motion, a translation motion of a block may be expressed with one motion vector, and rotational motion may be expressed with rotation angle information. Rotation angle information may be measured relative to (0 degrees) a predetermined position (e.g., top-left coordinate), and may be expressed as k candidates (k is an integer of 1, 2, 3 or more) having a predetermined interval (e.g., an angle difference value having 0 degrees, 11.25 degrees, 22.25 degrees, etc.) in a predetermined angle range (e.g., between −90 degrees and 90 degrees).

Here, the rotation angle information may be coded as it is during the motion information coding process or may be coded based on motion information (e.g., motion vector, rotation angle information) of an adjacent block (e.g., prediction+difference information).

Alternatively, a translation motion of a block may be expressed with one motion vector, and a rotational motion of the block may be expressed with one or more additional motion vectors. In this case, the number of additional motion vectors may be an integer of 1, 2, or more, and a control point of an additional motion vector may be determined from among top-right, bottom-left, and bottom-right coordinates, or other coordinates within the block may be set as a control point.

Here, the additional motion vector may be coded as it is during the motion information coding process, or coded based on motion information of an adjacent block (e.g., a motion vector according to a translation motion model or a non-translation motion model) (e.g., prediction+difference information) or may be coded based on another motion vector in a block representing rotational motion (e.g., prediction+difference information).

For example, in the case of a motion model expressing a size adjustment or scaling motion such as a zoom in/out situation, a translation motion of a block may be expressed with a single motion vector, and a scaling motion may be expressed with scaling information. The scaling information may be expressed as scaling information indicating expansion or reduction in a horizontal or vertical direction based on a predetermined position (e.g., top-left coordinate).

Here, scaling may be applied to at least one of horizontal or vertical direction. In addition, individual scaling information applied in a horizontal or vertical direction may be supported, or scaling information applied in common direction may be supported. The width and height of the scaled block may be added to a predetermined position (top-left coordinate) to determine a position for motion estimation and compensation.

Here, the scaling information may be coded as it is during the motion information coding process or may be coded (e.g., prediction+difference information) based on motion information (e.g., motion vector, scaling information) of an adjacent block.

Alternatively, a translation motion of a block may be expressed with one motion vector, and a size adjustment of the block may be expressed with one or more additional motion vectors. In this case, the number of additional motion vectors may be an integer of 1, 2 or more, and a control point of an additional motion vector may be determined from among top-right, bottom-left, and bottom-right coordinates, or other coordinates within the block may be set as a control point.

Here, the additional motion vector may be coded as it is during the motion information coding process, or may be coded based on motion information of an adjacent block (e.g., a motion vector according to a translation motion model or a non-translation motion model other than motion) (e.g., prediction+difference information) or may be encoded (e.g., prediction+difference) based on a predetermined coordinate (e.g., bottom-right coordinate) within a block.

In the above example, a case of expression for representing some motions has been described, and may be expressed as motion information for expressing a plurality of motions.

For example, in the case of a motion model expressing various or complex motions, a translation motion of a block may be expressed with one motion vector, a rotational motion may be expressed with rotation angle information, and a size adjustment may be expressed with scaling information. Since the description of each motion may be derived through the above-described example, a detailed description will be omitted.

Alternatively, a translation motion of a block may be expressed with one motion vector, and other motions of the block may be expressed with one or more additional motion vectors. In this case, the number of additional motion vectors may be an integer of 1, 2 or more, and the control point of the additional motion vector may be determined from among top-right, bottom-left, and bottom-right coordinates, or other coordinates within the block may be set as control points.

Here, the additional motion vector may be coded as it is during the motion information encoding process, or may be coded based on motion information of an adjacent block (e.g., a motion vector according to a translation motion model or a non-translation model) (e.g., prediction+difference information), or may be coded (e.g., prediction+difference information) based on other motion vectors within a block representing various motions.

The above description may be about the affine model, and will be described based on a case where there are one or two additional motion vectors. In summary, it is assumed that the number of motion vectors used according to the motion model may be 1, 2, or 3, and may be regarded as individual motion models according to the number of motion vectors used to express motion information. In addition, when there is one motion vector, it is assumed that it is a pre-defined motion model.

A plurality of motion models for inter prediction may be supported, and may be determined by a signal indicating support of an additional motion model (e.g., adaptive_motion_mode_enabled_flag). Here, if the signal is 0, a pre-defined motion model is supported, and if the signal is 1, a plurality of motion models may be supported. The signal may be generated in units such as sequence, picture, sub-picture, slice, tile, brick, block, etc., but if it is not possible to check separately, a value of the signal may be allocated according to a pre-defined setting. Alternatively, whether to implicitly support or not may be determined based on a coding setting. Alternatively, an implicit or explicit case may be determined according to the coding setting. Here, the coding setting may be defined by one or more elements in an image type, an image type (e.g., a normal image if 0, a 360 degree image if 1), or a color component.

Whether to support a plurality of motion models may be determined through the above process. The following assumes that there are two or more additional motion models supported, and it is assumed that multiple motion models are supported in units such as sequence, picture, sub picture, slice, tile, brick, etc., but a some of the configuration that may be excluded. In an example to be described later, it is assumed that motion models A, B, and C may be supported, A is a basic supported motion model, and B and C are additionally supported motion models.

Configuration information on a supported motion model may be generated in the unit. That is, a supported motion model configuration such as {A, B}, {A, C}, {A, B, C} may be possible.

For example, indexes (0 to 2) may be allocated to candidates of the above configuration and selected. If index 2 is selected, a motion model configuration supporting {A, C} may be determined, and if index 3 is selected, a motion model configuration supporting {A, B, C} may be determined.

Alternatively, information indicating whether a predetermined motion model is supported may be individually supported. That is, a flag indicating whether B is supported, or a flag indicating whether C is supported may be generated. If both flags are 0, only A may be supported. This example may be an example in which information indicating whether a plurality of motion models is supported is not generated and processed.

When a candidate group of supported motion models is configured as in the above example, a motion model of one of the candidate groups may be explicitly determined and used in block units, or may be used implicitly.

In general, the motion estimation unit may be a component present in the encoding apparatus, but may be a component that may be included in the decoding apparatus according to a prediction method (e.g., template matching, etc.). For example, in the case of template matching, the decoder may obtain motion information of the target block by performing motion estimation through a template adjacent to the target block. In this case, motion estimation related information (e.g., a motion estimation range, a motion estimation method <scan order>, etc.) may be implicitly determined or explicitly generated to be included in unit such as a sequence, picture, subpicture, slice, tile, brick, etc.

The motion compensation unit refers to a process of obtaining data of some blocks of a predetermined reference picture determined through a motion estimation process as a prediction block of a target block. In detail, the prediction block of the target block may be generated from at least one region (or block) of at least one reference picture based on motion information (e.g., reference picture information, motion vector information, etc.) obtained through the motion estimation process.

Motion compensation may be performed based on the motion compensation method as follows.

In the case of block matching, a prediction block of a target block may be compensated with a data of a region corresponding to right by M and down by N relative to $(P_x+V_x, P_y+V_y)$, which is explicitly obtained from a reference picture and is a coordinate obtained through a motion vector $(V_x, V_y)$ of a target block (M×N) and the top-left coordinate $(P_x, P_y)$ of the target block $(P_x, P_y)$.

In the case of template matching, a prediction block of a target block may be compensated with a data of a region corresponding to right by M and down by N relative to $(P_x+V_x, P_y+V_y)$, which is implicitly obtained from a reference picture and is a coordinate obtained through a motion vector $(V_x, V_y)$ of a target block (M×N) and the top-left coordinate $(P_x, P_y)$ of the target block $(P_x, P_y)$.

In addition, motion compensation may be performed based on a motion model as follows.

In the case of a translation motion model, a prediction block of a target block may be compensated with a data of a region corresponding to right by M and down by N relative to $(P_x+V_x, P_y+V_y)$, which is explicitly obtained from a reference picture and is a coordinate obtained through one motion vector $(V_x, V_y)$ of a target block (M×N) and the top-left coordinate $(P_x, P_y)$ of the target block $(P_x, P_y)$.

In the case of a non-translation motion model, prediction blocks of sub-blocks may be compensated with a data of a region corresponding to right by M and down by N relative to $(P_x+V_x, P_y+V_y)$, which is a coordinate obtained through motion vectors $(V_{mx}, V_{ny})$ of m×n sub-blocks implicitly obtained through a plurality of motion vectors $(V_{0x}, V_{0y})$ and $(V_{1x}, V_{1y})$ of a target block (M×N) explicitly acquired from a reference picture and the top-left coordinate $(P_{mx}, P_{ny})$ of each subblock. That is, the prediction blocks of the sub-blocks may be collected and compensated to a prediction block of the target block.

The motion information determination unit may perform a process for selecting optimal motion information of a target block. In general, the optimal motion information may be determined in terms of encoding cost using the distortion of a block (for example, a distortion of the target block and the reconstructed block. SAD (Sum of Absolute Difference), SSD (Sum of Square Difference), etc.) and a rate-distortion technique considering an amount of bits generated according to the corresponding motion information to determine. A prediction block generated based on motion information determined through the above process may be transmitted to a subtraction unit and an addition unit. In addition, it may be a configuration that may be included in a decoding apparatus according to some prediction methods (e.g., template matching, etc.), and in this case, it may be determined based on the distortion of the block.

In the motion information determination unit, setting information related to inter prediction, such as a motion compensation method and a motion model, may be considered. For example, when a plurality of motion compensation methods are supported, motion compensation method selection information, corresponding motion vector, reference picture information, etc. may be optimal motion information. Alternatively, when a plurality of motion models are supported, motion model selection information, motion vector corresponding thereto, and reference picture information may be optimal motion information.

The motion information encoding unit may encode motion information of the target block obtained through the motion information determination process. In this case, the motion information may be composed of information on an image and a region referenced for prediction of the target block. In detail, it may be composed of information on the referenced image (e.g., reference image information) and information on the referenced region (e.g., motion vector information).

In addition, setting information related to inter prediction (or selection information, for example, a motion estimation/compensation method, selection information of a motion model, etc.) may be included in the motion information of the target block. Information (e.g., the number of motion vectors, etc.) on the reference image and the reference region may be configured based on a setting related to inter prediction.

The motion information may be encoded by configuring the reference image and the information on the reference region as one combination, and the combination of the reference image and the information on the reference region may be configured as a motion information coding mode.

Here, the information about the reference image and the reference region may be obtained based on adjacent blocks or predetermined information (e.g., an image coded before or after a current picture, a zero motion vector, etc.).

The adjacent block may be classified to a block belonging to the same space as the target block and closest to the target block (inter_blk_A), a block belonging the same space and far adjacent to the target block (inter_blk_B), and a block belonging to a space not identical to the target block (inter_blk_C), and information about the reference image and the reference region may be obtained based on an adjacent block (candidate block) belonging to at least one of the categories.

For example, motion information of the target block may be encoded based on motion information or reference picture information of a candidate block, and the motion information of the target block may be encoded based on information derived from the motion information or the reference picture information of the candidate block (or information median value, a transform process, etc.). That is, motion information of the target block may be predicted from a candidate block and information about the motion information may be encoded.

In the present invention, motion information of the target block may be encoded based on one or more motion information coding modes. Here, the motion information coding mode may be defined in various ways, and may include one or more of a skip mode, a merge mode, and a competition mode.

Based on the above-described template matching (tmp), it may be combined with the motion information coding mode, or may be supported as a separate motion information coding mode, or may be included in a detailed configuration of all or some of the motion information coding modes. This presupposes a case where it is determined that template matching is supported in a higher unit (e.g., picture, sub-picture, slice, etc.), but a flag regarding whether to support may be considered as a part of the inter prediction setting.

Based on the above-described method for performing block matching within the current picture (ibc), it may be combined with the motion information coding mode, or may be supported as a separate motion information coding mode, or may be included in a detailed configuration of all or some of the motion information coding modes. This presupposes a case where it is determined that the block matching is supported in the current picture in a higher unit, but a flag regarding whether to support may be considered as a part of the inter prediction setting.

Based on the above-described motion model (affine), the motion information coding mode may be combined with the motion information coding mode, or may be supported as a separate motion information coding mode, or may be included in a detailed configuration of all or some of the motion information coding modes. This presupposes a case where it is determined that the higher unit supports the non-translation motion model, but a flag regarding whether to support may be considered as a part of the inter prediction setting.

For example, individual motion information coding modes such as temp_inter, temp_tmp, temp_ibc, temp_affine may be supported. Alternatively, a combined motion information coding mode such as temp_inter_tmp, temp_inter_ibc, temp_inter_affine, temp_inter_tmp_ibc, etc. may be supported. Alternatively, a template-based candidate, a candidate based on a method for performing block matching in the current picture, and an affine-based candidate among the motion information prediction candidate group constituting temp may be included.

Here, temp may mean a skip mode (skip), a merge mode (merge), and a competition mode (comp). For example, it is the same as that motion information encoding modes such as skip_inter, skip_tmp, skip_ibc, skip_affine in skip mode, and merge_inter, merge_tmp, merge_ibc, merge_affine in merge mode, comp_inter, comp_tmp, comp_ibc, comp_affine in competition mode are supported.

When the skip mode, merge mode, and competition mode are supported, and a candidate considering the above factors is included in the motion information prediction candidate group of each mode, one mode may be selected by a flag that distinguishes the skip mode, merge mode, and competition mode. As an example, a flag indicating whether the skip mode is supported, and if the value is 1, the skip mode is selected. And if the value is 0, a flag indicating whether the merge mode is supported. If the value is 1, the merge mode is selected, and if the value is 0, the competition mode may be selected. In addition, candidates based on inter, tmp, ibc, and affine may be included in the motion information prediction candidate group of each mode.

Alternatively, when a plurality of motion information coding modes are supported under one common mode, in addition to a flag for selecting one of the skip mode, the merge mode, and the competition mode, an additional flag for distinguishing a detailed mode of the selected mode may be supported. For example, when the merge mode is selected, it means that a flag selecting a detailed mode among merge_inter, merge_tmp, merge_ibc, merge_affine, etc., which are detailed modes related to the merge mode, are additionally supported. Alternatively, a flag indicating whether it is merge_inter may be supported, and if it is not merge_inter, a flag selecting among merge_tmp, merge_ibc, merge_affine, etc., may be additionally supported.

All or part of the motion information coding mode candidates may be supported according to a coding setting. Here, the coding setting may be defined by more than one element among state information, an image type, an image type, a color component, and an inter prediction support setting (e.g., whether template matching is supported, whether block matching is supported in a current picture, non-translation motion model support elements, etc.) of a target block.

For example, a supported motion information coding mode may be determined according to a size of a block. In this case, the size of the block may be determined by a first threshold size (minimum value) or a second threshold size (maximum value), and each threshold size may be expressed as width (W) and height (H) of the block, W, H, W×H, and W*H. In the case of the first threshold size, the W and H may be 4, 8, 16 or higher integers, and the W*H may be 16, 32, 64 or higher integers. In the case of the second threshold size, W and H may be integers of 16, 32, 64 or higher integers, and W*H may be an integer of 64, 128, 256 or higher integers. The range may be determined by one of the first threshold size or the second threshold size, or may be determined using both.

In this case, the threshold size may be fixed or may be adaptive according to an image (e.g., image type, etc.). In this case, the first threshold size may be set based on sizes of a minimum coding block, a minimum prediction block, and a minimum transform block, and the second threshold size may be set based on sizes of a maximum coding block, a maximum prediction block, and a maximum transform block.

For example, a supported motion information coding mode may be determined according to an image type. In this case, the I picture type may include at least one of the skip mode, the merge mode, and the competition mode. In this case, a method of performing block matching (or template matching) in a current picture, an individual motion information coding mode for an affine model (hereinafter, referred to as an element) may be supported, or a motion information coding mode may be supported by combining two or more elements. Alternatively, an element other than a predetermined motion information coding mode may be configured as a motion information prediction candidate group.

The P/B image type may include at least one of the skip mode, the merge mode, and the competition mode. In this case, a method of performing general inter prediction, template matching, block matching on current picture, an individual motion information coding mode for an affine model (hereinafter referred to as an element) may be supported, or a motion information coding mode may be supported by combining two or more elements. Alternatively, an element other than a predetermined motion information coding mode may be configured as a motion information prediction candidate group.

Figure 9:
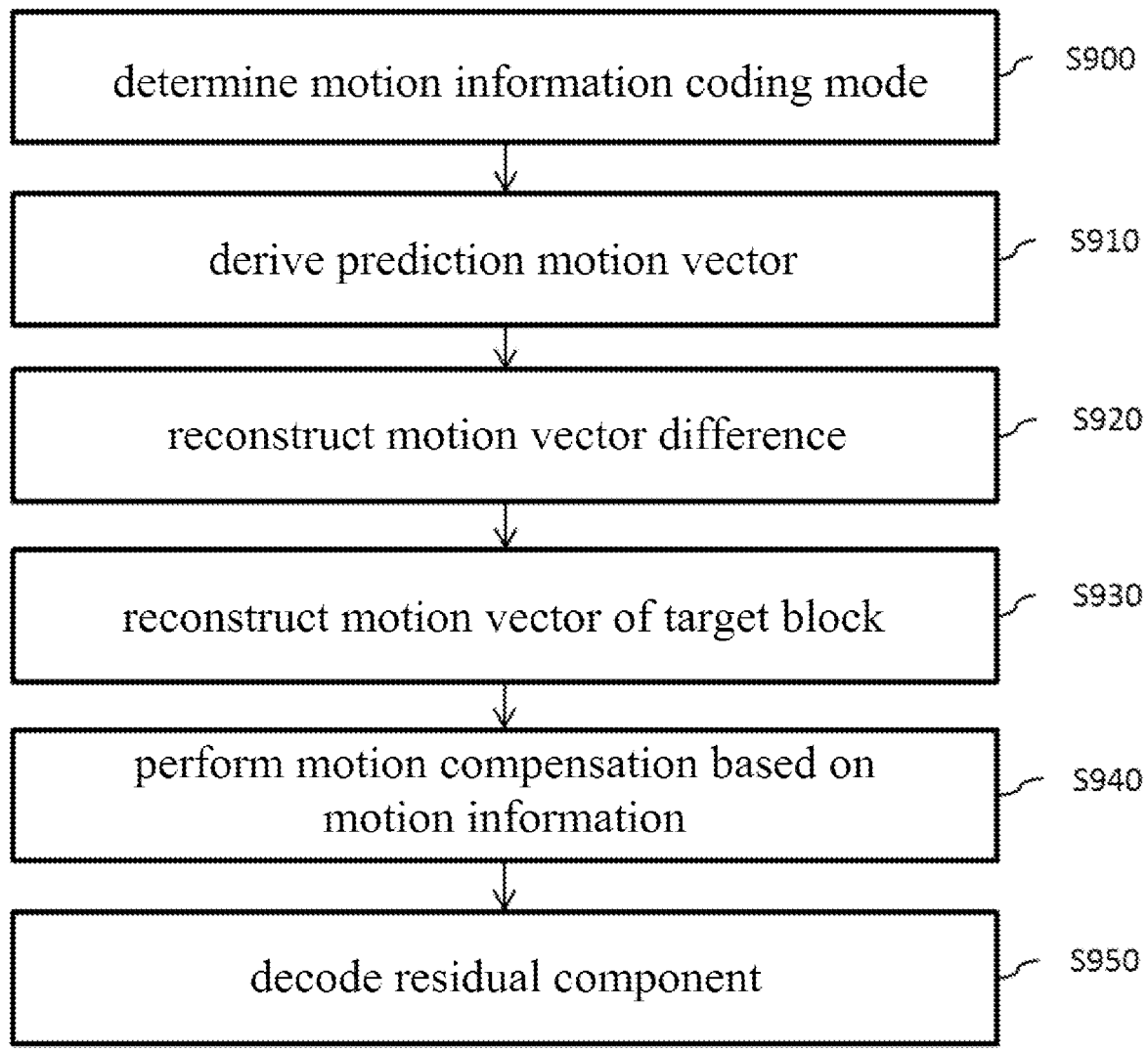
FIG. 9 is a flowchart illustrating coding of motion information according to an embodiment of the present invention.

FIG. 9 is a flowchart illustrating coding of motion information according to an embodiment of the present invention.

Referring to FIG. 9, a motion information coding mode of a target block may be checked (S900).

The motion information coding mode may be defined by combining and setting predetermined information (e.g., motion information, etc.) used for inter prediction. The predetermined information may include one or more of a prediction motion vector, a motion vector difference, a motion vector difference precision, reference image information, reference direction, motion model information, information on the presence or absence of a residual component, etc. The motion information coding mode may include at least one of a skip mode, a merge mode, and a competition mode, and may include other additional modes.

The configuration and setting of explicitly generated information and implicitly determined information may be determined according to the motion information coding mode. In this case, in the explicit case, each information may be generated individually or may be generated in a combination form (e.g., in the form of an index).

For example, in the skip mode or the merge mode, the prediction motion vector, reference image information, and/or reference direction may be defined based on (one) predetermined index information. In this case, the index may be composed of one or more candidates, and each candidate may be set based on motion information of a predetermined block (e.g., a prediction motion vector, reference image information, and a reference direction of a corresponding block are composed of one combination). In addition, the motion vector difference may be implicitly processed (e.g., a zero vector).

For example, in the competition mode, the prediction motion vector, reference image information, and/or reference direction may be defined based on (one or more) predetermined index information. In this case, the index may be individually supported for each piece of information, or a combination of two or more pieces of information may be supported. In this case, the index may be composed of one or more candidates, and each candidate may be set based on motion information of a predetermined block (e.g., a prediction motion vector, etc.), or may be configured with a predetermined value (e.g., an interval between the current picture is processed by 1, 2, 3, etc., and reference direction information is processed by L0, L1, etc.) (e.g., reference image information, reference direction information, etc.). In addition, the motion vector difference may be explicitly generated, and motion vector difference precision information may additionally be generated according to the motion vector difference (e.g., if it is not a zero vector).

As an example, in the skip mode, information on the presence or absence of a residual component may be implicitly processed (e.g., processed as cbf_flag=0), and the motion model may be implicitly processed as a predetermined value (e.g., supporting a parallel motion model).

For example, in the merge mode or the competition mode, information on the presence or absence of a residual component may be explicitly generated, and the motion model may be explicitly selected. In this case, information for classifying the motion model may be generated in one motion information coding mode, or a separate motion information coding mode may be supported.

In the above description, when one index is supported, index selection information may not be generated, and when two or more indexes are supported, index selection information may be generated.

In the present invention, a candidate group consisting of two or more indexes is referred to as a motion information prediction candidate group. In addition, an existing motion information coding mode may be changed or a new motion information coding mode may be supported through various predetermined information and settings.

Referring to FIG. 9, a prediction motion vector of the target block may be derived (S910).

The prediction motion vector may be determined as a predetermined value, or a prediction motion vector candidate group may be constructed and selected from among them.

In the former case, it means a case that is implicitly determined, and in the latter case, index information for selecting a prediction motion vector may be explicitly generated.

Here, the predetermined value may be set based on a motion vector of one block at a predetermined position (e.g., a left, top, left, top-right, bottom-left direction block, etc.) or may be set based on a motion vector of two or more blocks, or may be set to a default value (e.g., zero vector).

The prediction motion vector may have the same or different candidate group construction settings according to a motion information coding mode. For example, the skip mode/merge mode/competition mode may support a, b, and c prediction candidates, respectively, and the number of each candidate may be the same or different. In this case, a, b, and c may be composed of an integer greater than or equal to 1 such as 2, 3, 5, 6, 7 and etc. The order of constructing the candidate group, setting, etc. will be described through other embodiments. In an example to be described later, the construction of the skip mode candidate group will be described on the assumption that it is the same as the merge mode, but is not limited thereto and some may have different construction.

The prediction motion vector obtained based on the index information may be used as it is to reconstruct the motion vector of the target block, or may be adjusted based on a reference direction and a distance between reference images.

For example, in the case of the competition mode, reference image information may be generated separately. When a distance between the current picture and the reference picture of the target block and a distance between a picture including the prediction motion vector candidate block and the reference picture of the corresponding block are different, it may be adjusted according to the distance between the current picture and the reference picture of the target block.

In addition, the number of motion vectors derived according to the motion model may be different. That is, in addition to the motion vectors of the top-left control point positions, motion vectors at the top-right and bottom-left control points may be additionally derived according to the motion model.

Referring to FIG. 9, a motion vector difference of the target block may be reconstructed (S920).

The motion vector difference may be derived as a zero vector value in the skip mode and the merge mode, and difference information of each component may be reconstructed in the competition mode.

The motion vector may be expressed according to a predetermined precision (e.g., set based on interpolation precision or set based on motion model selection information). Alternatively, it may be expressed based on one of a plurality of precisions, and predetermined information for this may be generated. In this case, the predetermined information may be regarding selection about motion vector precision.

For example, when one component of the motion vector is 32/16, motion component data for 32 may be obtained based on an implicit precision setting in units of $1/16$ pixels. Alternatively, a motion component may be converted to 2/1 based on an explicit precision setting in units of 2 pixels, and motion component data for 2 may be obtained.

The above configuration may be a method for precision processing of a motion vector that has the same precision or is obtained by adding a motion vector difference and a prediction motion vector obtained through the same precision conversion process.

In addition, the motion vector difference may be expressed according to a predetermined precision or may be expressed with one of a plurality of precisions. In this case, in the latter case, precision selection information may be generated.

The precision may include at least one of $1/16$, $1/8$, $1/4$, $1/2$, 1, 2, 4 pixel units, and the number of candidates may be an integer greater than or equal to 1, 2, 3, 4, 5. Here, the supported precision candidate group configuration (e.g., divided by number, candidate, etc.) may be explicitly determined in units such as a sequence, a picture, a sub-picture, a slice, a tile, and a brick. Alternatively, it may be implicitly determined according to a coding setting, where the coding setting may be defined by at least one or more elements in an image type, a reference image, a color component, and motion model selection information.

The following describes a case in which a precision candidate is formed according to various coding elements, and the precision is described by assuming a description of a motion vector difference, but this may be similar or applied to a motion vector.

For example, in the case of a translation motion model, a candidate group such as $\{1/4, 1\}$, $\{1/4, 1/2\}$, $\{1/4, 1/2, 1\}$, $\{1/4, 1, 4\}$, $\{1/4, 1/2, 1, 4\}$ may be configured, and in the case of non-translation motion models, a precision candidate group such as $\{1/16, 1/4, 1\}$, $\{1/16, 1/8, 1\}$, $\{1/16, 1, 4\}$, $\{1/16, 1/4, 1, 2\}$, $\{1/16, 1/4, 1, 4\}$ may be configured. This assumes that the supported minimum precision is $1/4$ pixel unit in the former case and $1/16$ pixel unit in the latter case, and additional precision other than the minimum precision may be included in the candidate group.

Alternatively, when a reference image is a different picture, a candidate group such as $\{1/4, 1/2, 1\}$, $\{1/4, 1, 4\}$, $\{1/4, 1/2, 1, 4\}$ may be configured. In addition, when the reference image is the current picture, a candidate group such as $\{1, 2\}$, $\{1, 4\}$, $\{1, 2, 4\}$ may be configured. In this case, the latter case may be a configuration that does not perform interpolation in a fractional unit for block matching, and if interpolation in a fractional unit is performed, it may be configured to include a precision candidate of a fractional unit.

Alternatively, when a color component is a luma component, a candidate group such as $\{1/4, 1/2, 1\}$, $\{1/4, 1, 4\}$, $\{1/4, 1/2, 1, 4\}$ may be possible. And when a color component is a chroma component, a candidate group such as $\{1/8, 1/4\}$, $\{1/8, 1/2\}$, $\{1/8, 1\}$, $\{1/8, 1/4, 1/2\}$, $\{1/8, 1/2, 2\}$, $\{1/8, 1/4, 1/2, 2\}$ may be possible. In this case, in the latter case, a candidate group proportional to the luma component may be formed according to a color component composition ratio (e.g., 4:2:0, 4:2:2, 4:4:4, etc.) or an individual candidate group may be configured.

Although the above example describes a case where there are a plurality of precision candidates according to each coding element, a case where there is one candidate configuration (i.e., expressed with a predetermined minimum precision) may be possible.

In summary, a motion vector difference having a minimum precision may be reconstructed based on a motion vector difference precision in the competition mode, and a motion vector difference value having a zero vector value may be derived in the skip mode and the merge mode.

Here, the number of motion vector difference reconstructed according to a motion model may be different. That is, in addition to a motion vector difference of a position of a top-left control point, a motion vector difference value of a position of top-right and bottom-left control points may be additionally derived according to the motion model.

In addition, one motion vector difference precision may be applied to a plurality of motion vector differences, or an individual motion vector difference precision may be applied to each motion vector difference, which may be determined according to coding settings.

In addition, when at least one motion vector difference is not 0, information on the motion vector difference precision may be generated, and otherwise, it may be omitted, but is not limited thereto.

Referring to FIG. 9, the motion vector of the target block may be reconstructed (S930).

The motion vector of the target block may be reconstructed by obtaining a prediction motion vector and a motion vector difference obtained through the process prior to this step, and adding them. In this case, when it is reconstructed by selecting one of a plurality of precisions, a precision unification process may be performed.

For example, the motion vector obtained by adding the prediction motion vector (related to the motion vector precision) and the motion vector difference may be reconstructed based on precision selection information. Alternatively, the motion vector difference (related to the differential motion vector precision) may be reconstructed based on the precision selection information, and the motion vector may be obtained by adding the reconstructed motion vector difference and the prediction motion vector.

Referring to FIG. 9, motion compensation may be performed based on motion information of the target block (S940).

The motion information may include reference image information, reference direction, motion model information, etc. in addition to the above-described prediction motion vector and motion vector difference. In the case of the skip mode and the merge mode, some of the information (e.g., reference image information, reference direction, etc.) may be implicitly determined, and in the case of the competition mode, related information may be explicitly processed.

A prediction block may be obtained by performing motion compensation based on the motion information obtained through the above process.

Referring to FIG. 9, decoding on a residual component of the target block may be performed (S950).

The target block may be reconstructed by adding the residual component obtained through the above process and the prediction block. In this case, explicit or implicit processing may be performed on information about the presence or absence of the residual component according to a motion information coding mode.

Figure 10:
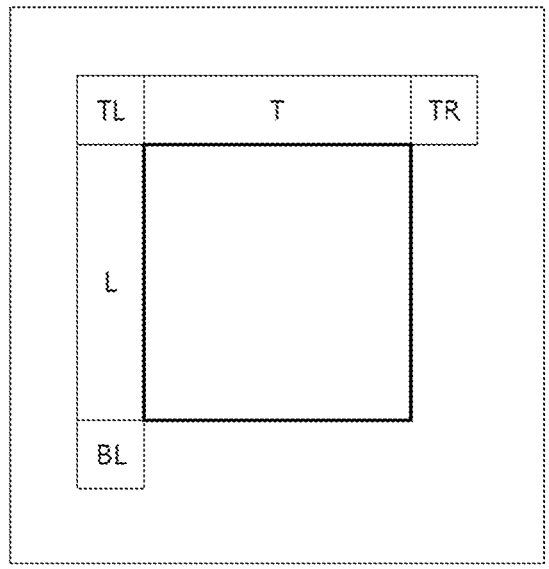
FIG. 10 is a layout diagram of a target block and a block adjacent thereto according to an embodiment of the present invention.
Figure 10:
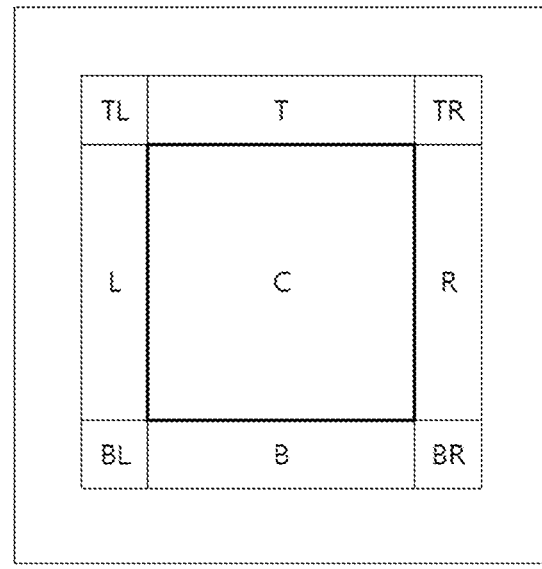

FIG. 10 is a layout diagram of a target block and a block adjacent thereto according to an embodiment of the present invention.

Referring to FIG. 10, a block <inter_blk_A> adjacent to a target block in the left, top, top-left, top-right, bottom-left direction, etc., and a block<inter_blk_B> adjacent to a block corresponding to the target block in a temporally not identical space (Col_Pic) in the center, left, right, top, bottom, top-left, top-right, bottom-left, bottom-right direction, etc. may be configured as a candidate block for prediction of motion information (e.g., a motion vector) of the target block.

In the case of inter_blk_A, the direction of adjacent blocks may be determined based on a coding order such as raster scan or z-scan, and the existing direction may be removed or adjacent blocks in the right, bottom, bottom-right directions may be additionally composed of a candidate block.

Referring to FIG. 10, Col_Pic may be an adjacent image before or after a current image (e.g., when an interval between images is 1), and a corresponding block may have the same position in the image as the target block.

Alternatively, Col_Pic may be an image in which the interval between images is predefined relative to the current image (e.g., the interval between images is z. z is an integer of 1, 2, 3), and the corresponding block may be set to a position moved by a predetermined disparity vector from a predetermined coordinate (e.g., top-left) of the target block, and the disparity vector may be set to a pre-defined value.

Alternatively, Col_Pic may be set based on motion information (e.g., a reference image) of an adjacent block, and the disparity vector may be set based on the motion information (e.g., a motion vector) of the adjacent block to determine the location of the corresponding block.

In this case, k adjacent blocks may be referenced, and k may be an integer of 1, 2 or more. If k is 2 or more, Col_Pic and the disparity vector may be obtained based on calculations such as a maximum value, a minimum value, a median value, a weighted average value of motion information (e.g., a reference image or a motion vector) of the adjacent block. For example, the disparity vector may be set as a motion vector of the left or top block, and may be set as a median value or an average value of the motion vectors of the left and bottom blocks.

The setting of a temporal candidate may be determined based on a motion information configuration setting or etc. For example, a position of Col_Pic, a position of a corresponding block, etc., may be determined according to whether motion information for which motion information in units of blocks or motion information in units of sub-blocks is to be included in a motion information prediction candidate group is configured in units of blocks or in units of sub-blocks. For example, when motion information in units of sub-blocks is acquired, a block at a position moved by a predetermined disparity vector may be set as the position of the corresponding block.

The above example shows a case in which information on a position of a block corresponding to Col_Pic is implicitly determined, and also related information may be explicitly generated in units such as a sequence, a picture, a slice, a tile group, a tile, and a brick.

On the other hand, when a division unit partition such as a sub-picture, a slice, a tile, etc. are not limited to one picture (e.g., the current picture) and are shared between images, and if a position of a block corresponding to Col_Pic is different from the division unit to which the target block belongs (that is, if it extends or deviates from a boundary of the division unit to which the target block belongs), it may be determined based on motion information of a subsequent candidate according to a predetermined priority. Alternatively, it may be set as identical position in the image with the target block.

The motion information of the above-described spatially adjacent block and the temporally adjacent block may be included in the motion information prediction candidate group of the target block, which is referred to as a spatial candidate and a temporal candidate. a spatial candidates and b temporal candidates may be supported, and a and b may be integers of 1 to 6 or more. In this case, a may be greater than or equal to b.

A fixed number of spatial candidates and temporal candidates may be supported, or a variable number (e.g., 0 included) may be supported according to a configuration of preceding motion information prediction candidates.

In addition, a block <inter_blk_C> not immediately adjacent to the target block may be considered in the candidate group construction.

For example, motion information of a block positioned at a predetermined interval difference relative to the target block (e.g., top-left coordinate) may be a target to be included the candidate group. The interval may be p and q (depending on each component of the motion vector), p and q may be integers of 2 or more, such as 0, 2, 4, 8, 16, 32, and p and q may be the same or different. That is, assuming that the top-left coordinate of the target block is (m, n), motion information of the block including the (m±p, n±q) position may be included in the candidate group.

For example, motion information of a block for which coding has been completed before the target block may be target to be included the candidate group. In this case, based on a predetermined coding order (e.g., raster scan, Z scan, etc.) relative to the target block, a predetermined number of recently coded blocks may be considered as candidates, and since the coding proceeds in a first-in, first-out method such as FIFO, a block having an old coding order may be removed from the candidate.

Since the above example refers to a case in which motion information of the non-most-adjacent block that has already been coded relative to the target block is included in the candidate group, this is referred to as a statistical candidate.

In this case, a reference block for obtaining the statistical candidate may be set as a target block, but a higher block of the target block (for example, if the target block is a coding block <1>/prediction block <2>, the higher block is a maximum coding block <1>/coding block <2>, etc.) may be set. K statistical candidates may be supported, and k may be an integer of 1 to 6 or more.

Motion information obtained by combining motion information of the spatial candidate, the temporal candidate, the statistical candidate, etc. may be included in the candidate group. For example, a candidate obtained by applying a weighted average to each component of a plurality of (2, 3 or more) motion information previously included in the candidate group may be obtained, and a candidate obtained through a process of median, maximum, minimum, etc. for each component of the plurality of motion information may be obtained. This is referred to as a combination candidate, and r combination candidates may be supported, and r may be an integer of 1, 2, 3 or more.

When the candidate used for the combination does not have the same information on the reference image, it may be set as reference image information of the combination candidate based on reference image information on one of the candidates or may be set as a pre-defined value.

A fixed number of the statistical candidates or combination candidates may be supported, or a variable number may be supported according to a configuration of preceding motion information prediction candidates.

In addition, a default candidate having a predetermined value such as (s, t) may also be included in the candidate group, and a variable number (0, 1 or more integer) may be supported according to a configuration of preceding motion information prediction candidates. In this case, s and t may be set to include 0, and may be set based on various block sizes (e.g., the maximum coding/prediction/transform block, the minimum coding/prediction/transform block's horizontal or vertical length, etc.).

Depending on a motion information coding mode, the motion information prediction candidate group may be constructed among the candidates, and other additional candidates may be included. Also, a candidate group configuration setting may be the same or different according to the motion information coding mode.

For example, the skip mode and the merge mode may construct the candidate group in common, and the competition mode may construct an individual candidate group.

Here, the candidate group configuration setting may be defined by a category and position of the candidate block (e.g., determined from among the left/top/top-left/top-right/bottom-left directions, sub-block position for obtaining motion information among the determined directions), the number of candidates (e.g., total number, a maximum number of each category), a candidate construction method (e.g., priority of each category, priority within a category, etc.).

The number of motion information prediction candidate groups (total number) may be k, and k may be an integer of 1 to 6 or more. In this case, when the number of candidates is one, it may mean that candidate group selection information is not generated and motion information of a predefined candidate block is set as predicted motion information, and when there are two or more, candidate group selection information may be generated.

The category of the candidate block may be one or more of inter_blk_A, inter_blk_B, and inter_blk_C. In this case, inter_blk_A may be a category included by default, and another category may be a category additionally supported, but is not limited thereto.

The above description may be related to the motion information prediction candidate construction for the translation motion model, and the same or similar candidate blocks may be used/referenced in the candidate group construction in the non-translation motion model (affine model). On the other hand, the affine model may be different from the candidate group construction of the translation motion model because the motion characteristics as well as the number of motion vectors are different from the translation motion model.

For example, when the motion model of the candidate block is the affine model, the motion vector set configuration of the candidate block may be included in the candidate group as it is. For example, when top-left and top-right coordinates are used as control points, a motion vector set of top-left and top-right coordinates of the candidate block may be included in the candidate group as one candidate.

Alternatively, when the motion model of the candidate block is a translation motion model, a motion vector combination of the candidate block, which is set based on the position of the control point, may be constructed as a set and included in the candidate group. For example, when the top-left, top-right, and bottom-left coordinates are used as control points, the motion vector of the top-left control point may be predicted based on the motion vectors of the top-left, top, and top-left blocks of the target block (e.g., in the case of the translation motion model), and the motion vector of the top-right control point may be predicted based on the motion vector of the top and top-right block of the target block (e.g., in the case of the translation motion model), and the motion vector of the bottom-left control point may be predicted based on the motion model of the left and right of the target block. In the above example, a case where the motion model of the candidate block set based on the position of the control point is the translation motion model has been described, but even in the case of the affine model, it may be possible to obtain only the motion vector of the control point position by obtaining or deriving it. That is, a motion vector may be obtained or derived from among the top-left, top-right, bottom-left, and bottom-right control points of the candidate block for motion vectors of the top-left, top-right, and bottom-left control points of the target block.

In summary, when the motion model of the candidate block is the affine model, the motion vector set of the corresponding block may be included in the candidate group (A), and when the motion model of the candidate block is the translation motion model, a set of motion vectors which is obtained according to combinations of control points considering a motion vector of a predetermined control point of the target block, may be included in the candidate group (B).

In this case, the candidate group may be constructed using only one of the A or B method, or the candidate group may be constructed using both the A and B methods. In addition, the method A may be used for construction first and the method B may be used for construction later, but is not limited thereto.

Figure 11:
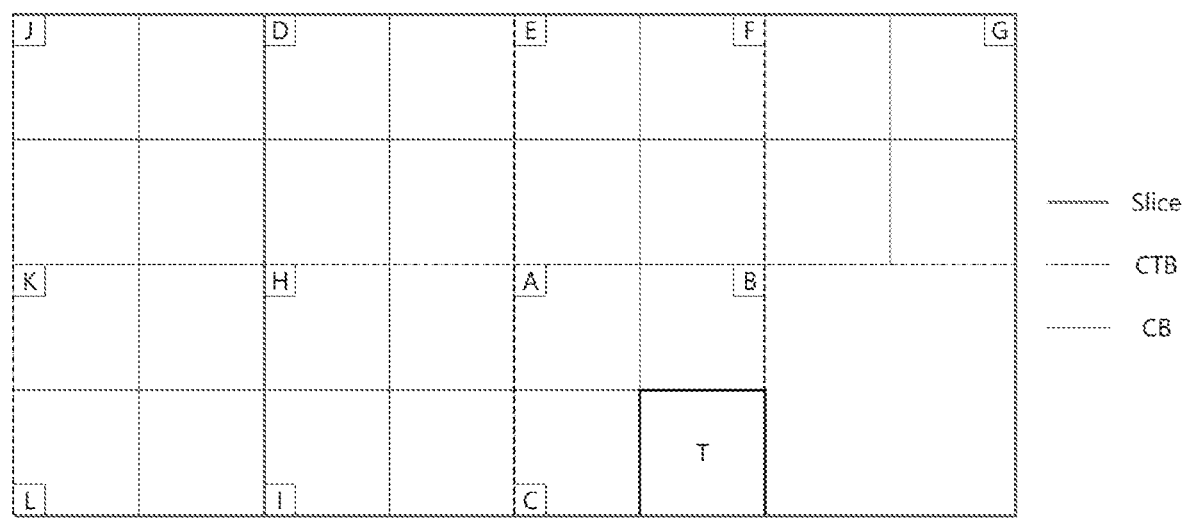
FIG. 11 shows an exemplary diagram of a statistical candidate according to an embodiment of the present invention.

FIG. 11 shows an exemplary diagram of a statistical candidate according to an embodiment of the present invention.

Referring to FIG. 11, blocks corresponding to A to L of FIG. 11 refer to blocks on which coding has been completed separated by a predetermined interval from a target block.

When a candidate block for motion information of the target block is limited to a block adjacent to the target block, various characteristics of an image may not be reflected. To this end, a block that has been coded before the current picture may also be considered as a candidate block. A category for this has already been referred to as inter_blk_B, and this is referred to as a statistical candidate.

Since the number of candidate blocks included in the motion information prediction candidate group is limited, efficient statistical candidate management may be required for this.

(1) A block at a predetermined position having a predetermined distance interval from the target block may be considered as a candidate block.

As an example, a block having a predetermined interval may be considered as a candidate block by limiting to the x component relative to a predetermined coordinate (e.g., top-left coordinate, etc.) of the target block, and an example such as (−4, 0), (−8, 0), (−16, 0), (−32, 0), etc. may be possible.

As an example, a block having a predetermined interval may be considered as a candidate block by limiting to the y component relative to a predetermined coordinate of the target block, and an example such as (0, −4), (0, −8), (0, −16), (0, −32), etc. may be possible.

As an example, a block having a predetermined interval other than 0 as x and y components relative to a predetermined coordinate of the target block may be considered as a candidate block, an example such as (−4, −4), (−4, −8), (−8, −4), (−16, 16), (16, −16), etc. may be possible. In this example, the x component may have a positive sign depending on the y component.

A candidate block considered as statistical candidates may be limitedly determined according to a coding setting. Refers to FIG. 11 for an example to be described later.

The candidate block may be classified as a statistical candidate according to whether it belongs to a predetermined unit. Here, the predetermined unit may be determined from a maximum coding block, a brick, a tile, a slice, a sub-picture, a picture, etc.

For example, when a candidate block is selected by limiting to a block belonging to the same maximum coding block as the target block, A to C may be a target.

Alternatively, when a candidate block is selected by limiting to a block belonging to the maximum coding block to which the target block belongs and a left maximum coding block, A to C, H, I may the target.

Alternatively, when a candidate block is selected by limiting to a block belonging to the maximum coding block to which the target block belongs and a top maximum coding block, A to C, E, F may be the target.

Alternatively, when a candidate block is selected by limiting to a block belonging to the same slice as the target block, A to I may be the target.

A candidate block may be classified as the statistical candidate according to whether the candidate block is positioned in a predetermined direction relative to the target block. Here, the predetermined direction may be determined from the left, top, top-left, top-right direction, etc.

For example, when a candidate block is selected by limiting to a block positioned in the left and top directions relative to the target block, B, C, F, I, L may be the target.

Alternatively, when a candidate block is selected by limiting to a block positioned in the left, top, top-left, or top-right direction relative to the target block, A to L may be the target.

As in the above example, even if a candidate block considered as a statistical candidate is selected, there may be a priority order for including in a motion information prediction candidate group. That is, as many as the number of statistical candidates supported may be selected in priority.

A predetermined order may be supported as the priority, or the priority may be determined by various coding element. The coding element may be defined based on a distance between the candidate block and the target block (e.g., whether it is a short distance, the distance between blocks may be checked based on the x and y components), and a relative direction of the candidate block relative to the target block (e.g., left, top, top-left, top-right direction, an order of left→top→top-right→left, etc.).

(2) A block that has been coded according to a predetermined coding order relative to the target block may be considered as a candidate block.

The following example assumes that a raster scan (e.g., a maximum coding block) and a Z-scan (e.g., a coding block, a prediction block, etc.) are followed, but it should be understood that the contents described later may be changed according to a scan order.

In the case of the above-described example (1), a priority for constructing the motion information prediction candidate group may be supported, and likewise, a predetermined priority may be supported in this embodiment. The priority may be determined by various coding elements, but for convenience of description, it is assumed that the priority is determined according to a coding order. In an example to be described later, a candidate block and priority will be considered together.

A candidate blocks considered as a statistical candidate may be limitedly determined according to a coding setting.

The candidate block may be classified as the statistical candidate according to whether it belongs to a predetermined unit. Here, the predetermined unit may be determined from the maximum coding block, brick, tile, slice, sub-picture, picture, etc.

For example, when a block belonging to the same picture as the target block is selected as a candidate block, candidate blocks and a priority such as J-D-E-F-G-K-L-H-I-A-B-C may be a target.

Alternatively, when a block belonging to the same slice as the target block is selected as a candidate block, candidate blocks and a priority such as D-E-F-G-H-I-A-B-C may be the target.

A candidate block may be classified as a statistical candidate according to whether the candidate block is positioned in a predetermined direction relative to the target block. Here, the predetermined direction may be determined from the left or top direction.

For example, when a candidate block is selected by limiting to the block located in the left direction relative to the target block, candidate blocks and a priority such as K-L-H-I-A-B-C may be the target.

Alternatively, when a candidate block is selected by limiting to a block positioned in the top direction relative to the target block, candidate blocks and a priority such as E-F-A-B-C may be the target.

The description above is based on the assumption that candidate blocks and priorities are combined, but is not limited thereto, and various candidate blocks and priorities may be set.

It has been mentioned that a priority included in the motion information prediction candidate group may be supported through the description of (1) and (2) above. One or more of priorities may be supported, and one priority for the entire candidate block may be supported. Or a candidate block may be classified into two or more categories, and individual priorities according to the categories may be supported. In the former case, it may be an example that k candidate blocks are selected from one priority, and in the latter case, it may be an example that p and q (p+q=k) candidate blocks are selected from each priority (e.g., two categories). In this case, the category may be classified based on a predetermined coding element, and the coding element may include whether it belongs to a predetermined unit, whether a candidate block is positioned in a predetermined direction relative to a target block, etc.

An example of selecting a candidate block based on whether it belongs to the predetermined unit (e.g., a division unit) described through (1) and (2) has been described. Apart from the division unit, a candidate block may be selected by limiting to blocks within a predetermined range relative to the target block. For example, it may be identified by boundary points defining a range of (x1, y1), (x2, y2), (x3, y3), etc., and a minimum value, a maximum value of the x or y component. Values such as x1 to y3 may be integers such as 0, 4, and 8 (based on an absolute value).

A statistical candidate may be supported based on the setting of one of (1) or (2) described above, or a statistical candidate in a form in which (1) and (2) are mixed may be supported. Through the above description, how to select a candidate block for a statistical candidate has been described, and management and update of the statistical candidate, and a case of being included in the motion information prediction candidate group will be described later.

The construction of the motion information prediction candidate group may generally be performed in units of blocks, because motion information of a block adjacent to the target block is likely to be the same or similar. That is, a spatial candidate or a temporal candidate may be constructed based on the target block.

Meanwhile, the statistical candidate may be constructed based on a predetermined unit because a position of a candidate block is not adjacent to the target block. The predetermined unit may be a higher block including the target block.

For example, when the target block is a prediction block, a statistical candidate may be constructed in units of a prediction block or a statistical candidate may be constructed in units of a coding block.

Alternatively, when the target block is a coding block, a statistical candidate may be constructed in units of a coding block, or a statistical candidate may be constructed in units of an ancestor block (e.g., depth information is at least one difference from the target block). In this case, the ancestor block may include the maximum coding block or may be a unit acquired based on the maximum coding block (e.g., an integer multiple of the maximum coding block).

As in the above example, the statistical candidate may be constructed based on a target block or a higher unit, and in an example to be described later, it is assumed that the statistical candidate is constructed based on the target block.

Also, memory initialization for the statistical candidate may be performed based on a predetermined unit. The predetermined unit may be determined from a picture, a sub-picture, a slice, a tile, a brick, or a block, and in the case of the block, it may be set based on a maximum coding block. For example, memory initialization for the statistical candidate may be performed based on an integer number (1, 2, or more) of the maximum coding block, a row or column unit of the maximum coding block, etc.

The following describes statistical candidate management and update. A memory for managing statistical candidates may be prepared, and motion information of up to k blocks may be stored. In this case, k may be an integer of 1 to 6 or more. Motion information stored in the memory may be determined from a motion vector, a reference picture, and a reference direction. Here, the number of motion vectors (e.g., 1 to 3, etc.) may be determined based on motion model selection information. For convenience of explanation, a case in which a block whose coding is completed according to a predetermined coding order based on the target block is considered as a candidate block will be described later.

(case 1) Motion information of a block previously coded according to the coding order may be included as a candidate in a preceding ranking. In addition, when the maximum number is filled and updated by additional candidates, candidates in the preceding ranking may be removed and the order may be shifted forward one by one. In the following examples, x means a blank that has not yet been constructed.

Example 1 order-[a, x, x, x, x, x, x, x, x, x]
2 order-[a, b, x, x, x, x, x, x, x, x]
. . .
9 order-[a, b, c, d, e, f, g, h, i, x]
10 order-[a, b, c, d, e, f, g, h, i, j]→add j. full
11 order-[b, c, d, e, f, g, h, i, j, k]→add k. remove the leading a. shift order (case 2) When duplicating motion information exists, a candidate that previously exists is removed, and the order of the existing candidates may be adjusted to forward.

In this case, duplication means that the motion information is the same, which may be defined by the motion information coding mode. As an example, in the case of the merge mode, duplication may be determined based on a motion vector, a reference picture, and a reference direction, and in the case of a competition mode, duplication may be determined based on a motion vector and a reference picture. In this case, in the case of the competition mode, if the reference pictures of each candidate are the same, duplication may be determined through comparison of motion vectors, and if the reference pictures of each candidate are different, duplication may be determined through comparison of motion vectors scaled based on the reference pictures of each candidate, however it is not limited thereto.

Example 1 order-[a, b, c, d, e, f, g, x, x, x]
2 order-[a, b, c, d, e, f, g, d, x, x]→d overlap
[a, b, c, e, f, g, d, x, x, x]→remove existing d, shift order (case 3) When duplicating motion information exists, the corresponding candidate may be marked and managed as a long-term stored candidate (long-term candidate) according to a predetermined condition.

A separate memory for the long-term candidate may be supported, and information such as occurrence frequency in addition to the motion information may be additionally stored and updated. In the following example, a memory for a long-term stored candidate may be expressed as ( ).

Example 1 order-[( ), b, c, d, e, f, g, h, i, j, k]
2 order-[( ), b, c, d, e, f, g, h, i, j, k]→e is the next order. overlap
[(e), b, c, d, f, g, h, i, j, k]→move to the front. long-term marking
3 order-[(e), c, d, f, g, h, i, j, k, l]→add l. remove b
. . .
10 order-[(e), l, m, n, o, p, q, r, s, t]→l is the next order. overlap
[(e, l), m, n, o, p, q, r, s, t]→long-term marking
11 order-[(e, l), m, n, o, p, q, r, s, t]→l is the next order. 3 overlap
[(l, e), m, n, o, p, q, r, s, t]→change long-term candidate order The above example shows a case where the existing statistical candidates (short-term candidates) are managed in an integrated manner, but may be managed separately from the short-term candidates, and the number of long-term candidates may be 0, 1, 2 or more integers.

Short-term candidates may be managed in a first-in, first-out manner based on a coding order, but long-term candidates may be managed according to frequency based on candidates with redundancy among short-term candidates. In the case of the long-term candidates, the order of the candidate may be changed according to the frequency in the process of updating the memory, but is not limited thereto.

The above example may be a case where a candidate block is classified into two or more categories and priority according to the category is supported. When constructing the motion information prediction candidate group to include a statistical candidate, a and b of short-term and long-term candidates, respectively, may be constructed according to priority within each candidate. Here, a and b may be 0, 1, 2, or more integers.

The above cases 1 to 3 are examples according to statistical candidates, and the configuration of (case 1+case 2) or (case 1+case 3) may be possible, and the statistical candidates may be managed in form of various modifications and additions.

Figure 12:
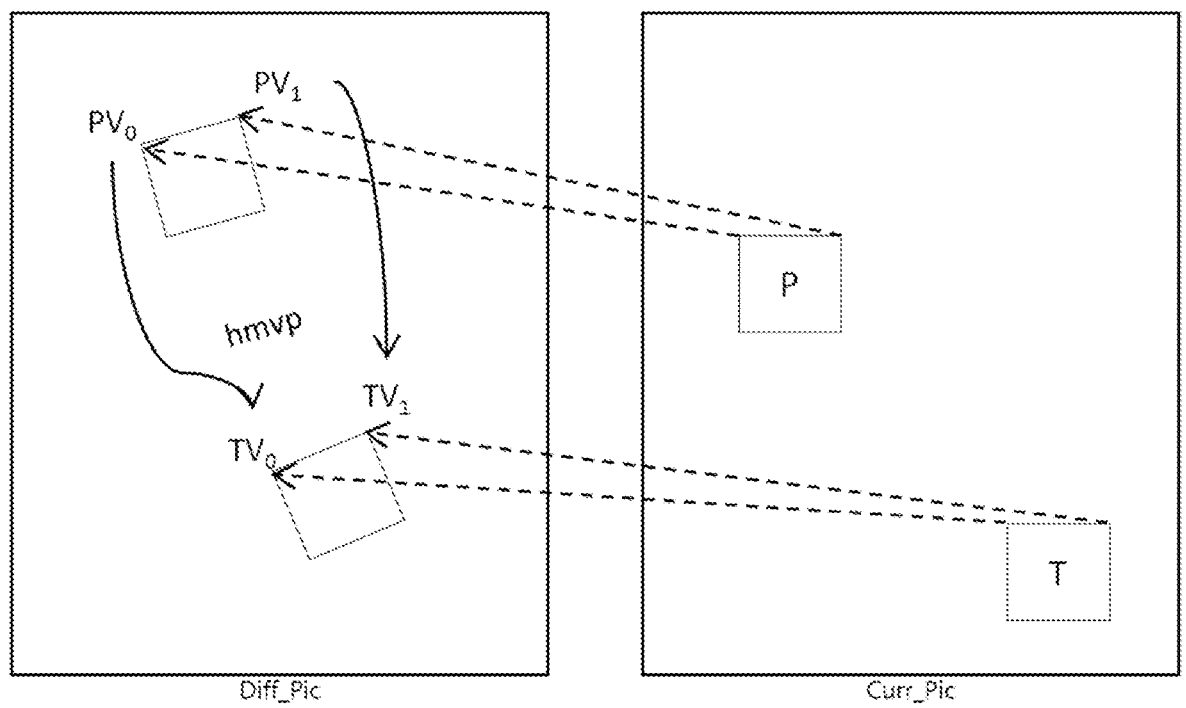
FIG. 12 is a conceptual diagram of statistical candidates according to a non-translation motion model according to an embodiment of the present invention.

FIG. 12 is a conceptual diagram of statistical candidates according to a non-translation motion model according to an embodiment of the present invention.

The statistical candidate may be a candidate supported not only for a translation motion model but also for a non-translation motion model. In the case of the translation motion model, since the occurrence frequency is high, there may be many blocks that may be referenced from a spatial or temporal candidate, etc., but in the case of the non-translation motion model, the statistical candidate other than a spatial or temporal candidate may be required because the occurrence frequency is small.

Referring to FIG. 12, a case where motion information {TV0, TV1} of the target block is predicted (hmvp) based on motion information {PV0, PV1} of a block <inter_blk_B> that belongs to the same space as the target block and is far adjacent to the target block (hmvp).

Compared with the above-described statistical candidates of the translation motion model, the number of motion vectors among motion information stored in the memory may be increased. Therefore, the basic concept of the statistical candidate may be the same as or similar to the translation motion model, and a related explanation may be derived with a configuration in which the number of motion vectors is different. The following will be described later focusing on the differences according to the non-translation motion model. In the example described later, it is assumed that the affine model has three control points (e.g., v0, v1, and v2).

In the case of the affine model, motion information stored in the memory may be determined from a reference picture, a reference direction, and motion vectors v0, v1, and v2. Here, the stored motion vector may be stored in various forms. For example, a motion vector may be stored as it is or predetermined difference value information may be stored.

Figure 13A:
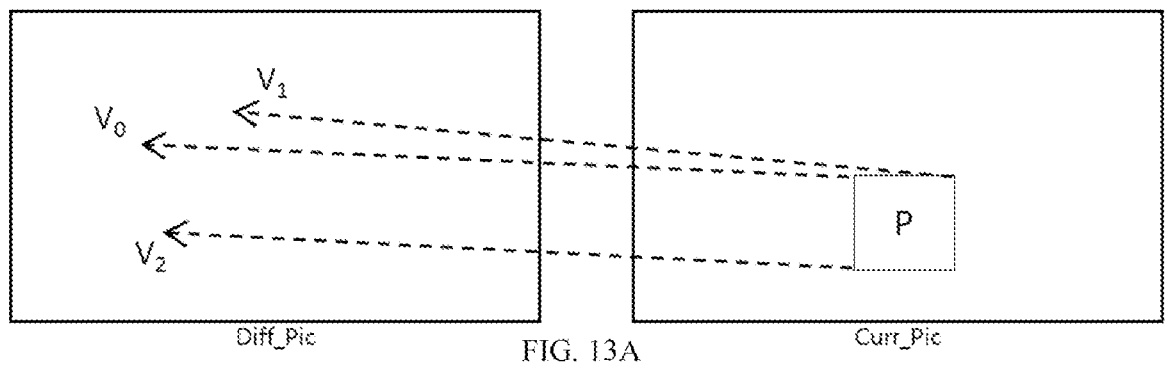
FIGS. 13A-13B show an exemplary diagram for motion information construction of a position of each control point stored as a statistical candidate according to an embodiment of the present invention.
Figure 13B:
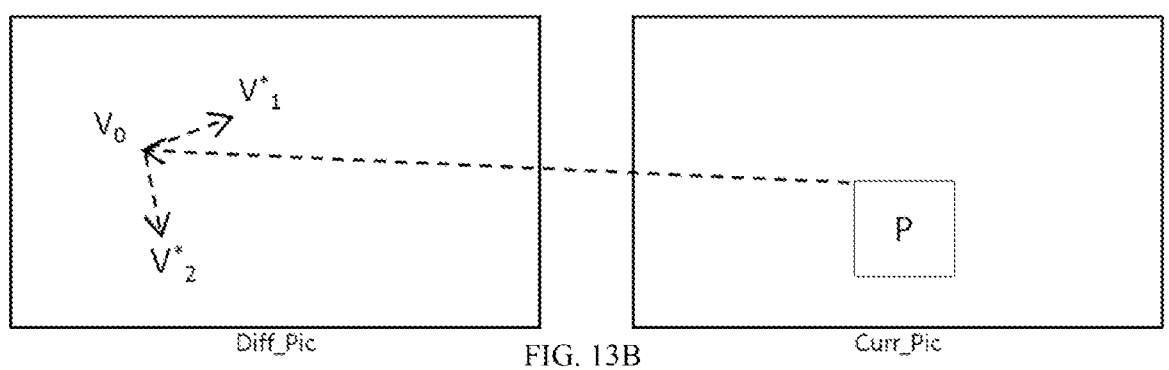

FIGS. 13A-13B show an exemplary diagram for motion information construction of a position of each control point stored as a statistical candidate according to an embodiment of the present invention.

Referring to FIG. 13A, motion vectors of v0, v1, and v2 of a candidate block are expressed as v0, v1, and v2, and in FIG. 13B, a motion vector of v0 of a candidate block are expressed as v0, and motion vector of v1 and v2 are expressed as v*1 and v*2, which are differences with the motion vector of v0.

That is, the motion vector of each control point position may be stored as it is or a difference value from the motion vector of another control point position may be stored, which may be an example of a configuration considered in terms of memory management, and various examples of modifications may be possible.

Whether to support statistical candidates may be explicitly generated in units such as a sequence, a picture, a slice, a tile, and a brick, or may be implicitly determined according to a coding setting. Since the coding setting may be defined by various coding elements described above, detailed descriptions are omitted.

Here, whether to support the statistical candidate may be determined according to a motion information coding mode. Alternatively, whether to support it may be determined according to motion model selection information. For example, the statistical candidate may be supported among merge_inter, merge_ibc, merge_affine, comp_inter, comp_ibc, comp_affine.

If the statistical candidates are supported for the translation motion model and the non-translation motion model, memories for a plurality of statistical candidates may be supported.

Next, a method of constructing a motion information prediction candidate group according to a motion information coding mode will be described.

The motion information prediction candidate group for the competition mode (hereinafter, the competition mode candidate group) may include k candidates, and k may be an integer of 2, 3, 4 or more. The competition mode candidate group may include at least one of a spatial candidate or a temporal candidate.

The spatial candidate may be derived from at least one of blocks adjacent to the reference block in the left, top, top-left, top-right, and bottom-left directions. Alternatively, at least one candidate may be derived from a block adjacent to the left (left, bottom-left blocks) and a block adjacent to the top direction (top-left, top, top-right blocks), which will be described later on the assumption of this setting.

There may be two or more priorities for constructing a candidate group. In a region adjacent to the left direction, a priority order of (bottom-left)-(left) may be set, and in a region adjacent to the top direction, a priority order of (top-right)-(top)-(top-left) order may be set.

In the above example, the spatial candidate may be derived only from a block in which the reference picture of the target block is the same, and the spatial candidate may be derived through a scaling process (marked with * in the following) based on the reference picture of the target block. In this case, in a region adjacent to the left direction, a priority order of (left)-(bottom-left)-(left*)-(bottom-left*) or (left)-(bottom-left)-(bottom-left*)-(left*) may be set, and in a region adjacent to the top direction, a priority order of (top-right)-(top)-(top-left)-(top-right*)-(top*)-(top-left*) or (top-right)-(top)-(top-left)-(top-left*)-(top*)-(top-right*) may be set.

The temporal candidate may be derived from at least one of blocks adjacent to the center, left, right, top, bottom, top-left, top-right, bottom-left, bottom-right, etc. based on the block corresponding to the reference block. Priorities for configuring candidate groups may exist, and a priority such as (center)-(bottom-left)-(right)-(bottom)-(bottom-left)-(center)-(top-left), etc. may be set.

When the sum of the maximum allowable number of spatial candidates and the maximum allowable number of temporal candidates is less than the number of competition mode candidates, the temporal candidate may be included in the candidate group regardless of the construction of the candidate group of spatial candidates.

All or part of the candidates may be included in the candidate group based on the priority, an availability of each candidate block, and a maximum allowable number of temporal candidates (the number of q, an integer between 1 and the number of competition mode candidates).

Here, when the maximum allowable number of spatial candidates is set equal to the number of merge mode candidates, the temporal candidate may not be included in the candidate group, and when the maximum allowable number of spatial candidates is not filled, the temporal candidate may be included in the candidate group. This example assumes the latter case.

Here, the motion vector of the temporal candidate may be obtained based on the motion vector of the candidate block and a distance interval between the current image and the reference image of the target block, and the reference image of the temporal candidate may be obtained based on a distance interval between the current image and the reference image of the target block, or may be obtained as a pre-defined reference image (e.g., a reference picture index of 0).

If the competition mode candidate group is not filled with spatial candidates, temporal candidates, etc., the candidate group construction may be completed through a default candidate including a zero vector.

The competition mode focuses on the description of comp_inter, and in the case of comp_ibc or comp_affine, a candidate group may be constructed for similar or different candidates.

For example, in the case of comp_ibc, a candidate group may be constructed based on a predetermined candidate selected from the spatial candidate, the statistical candidate, the combination candidate, and the default candidate. In this case, the candidate group may be constructed by prioritizing the spatial candidate, and then the candidate group may be constructed in the order of statistical candidate-combination candidate-default candidate, etc., but the order is not limited thereto.

Alternatively, in the case of comp_affine, a candidate group may be constructed based on a predetermined candidate selected from the spatial candidate, the statistical candidate, the combination candidate, and the default candidate. In detail, a motion vector set candidate of the candidate (e.g., one block) may be constructed in a candidate group <1>, or a candidate in which motion vectors of candidates (e.g., two or more blocks) based on a control point position are combined may be constructed configured in a candidate group <2>. The order in which the candidate for <1> is first included in the candidate group and then the candidate for <2> is included in the candidate group may be possible, but is not limited thereto.

Since the detailed description of the above-described construction of various competition mode candidate groups may be derived from comp_inter, detailed descriptions are omitted.

In the process of constructing the competition mode candidate group, when duplicating motion information exists among the candidates included first, the candidate included first may be maintained and the candidate having the next priority may be included in the candidate group.

Here, before constructing the candidate group, the motion vector of the candidate group may be scaled based on a distance between the reference picture of the target block and the current picture. For example, when the distance between the reference picture of the target block and the current picture, and the distance between the reference picture of the candidate block and the picture to which the candidate block belongs are the same, a motion vector may be included in the candidate group, and otherwise, a motion vector scaled according to the distance between the reference picture of the target block and the current picture may be included in the candidate group.

In this case, redundancy may mean that the motion information is the same, which may be defined by a motion information coding mode. In the case of the competition mode, duplication may be determined based on a motion vector, a reference picture, and a reference direction. For example, when the components of at least one motion vector are different, it may be determined that there is no duplication. The redundancy check process may generally be performed when a new candidate is included in the candidate group, but it may be modified to be omitted.

The motion information prediction candidate group for the merge mode (hereinafter, the merge mode candidate group) may include k candidates, and k may be an integer of 2, 3, 4, 5, 6 or more. The merge mode candidate group may include at least one of a spatial candidate or a temporal candidate.

The spatial candidate may be derived from at least one of blocks adjacent to the reference block in the left, top, top-left, top-right, and bottom-left directions. Priorities for constructing the candidate group may exist, and priorities such as (left)-(top)-(bottom-left)-(top right)-(top-left), (left)-(top)-(top-right)-(bottom-left)-(top-left), (top)-(left)-(bottom-left)-(top-left)-(top-right) may be set.

All or some of the candidates may be included in the candidate group based on based on the priority, availability of each candidate block (e.g., determined based on coding mode, block position, etc.), and the maximum allowable number of spatial candidates (the number of p, integer between 1 and the number of merge mode candidate groups). According to the maximum allowable number and the availability, it may not be included in the candidate group in the order of tl-tr-bl-t3-l3. If the maximum allowable number is 4 and the availability of all candidate blocks is true, motion information of tl may not be included in the candidate group, and if the availability of some candidate blocks is false, the motion information of tl may be included in the candidate group.

The temporal candidate may be derived from at least one of blocks adjacent to the center, left, right, top, bottom, top-left, top-right, bottom-left, bottom-right, etc., based on the block corresponding to the reference block. Priorities for constructing candidate groups may exist, and priorities such as (center)-(bottom-left)-(right)-(bottom), (bottom-left)-(center)-(top-left), etc. may be set.

All or part of the candidates may be included in the candidate group based on the priority, the availability of each candidate block, and the maximum allowable number of temporal candidates (q, an integer between 1 and the number of merge mode candidates).

Here, the motion vector of the temporal candidate may be obtained based on the motion vector of the candidate block, and the reference image of the temporal candidate may be obtained based on the reference image of the candidate block or may be obtained as a pre-defined reference image (e.g., a reference picture index is 0).

As for a priority included in the merge mode candidate group, (spatial candidate)-(temporal candidate) or vice versa may be set, and a priority in which a spatial candidate and a temporal candidate are mixed may be supported. In this example, (spatial candidate)-(temporal candidate) is assumed.

In addition, a statistical candidate or a combination candidate may be further included in the merge mode candidate group. The statistical candidate and the combination candidate may be constructed after the spatial candidate and the temporal candidate, but are not limited thereto and various priorities may be set.

As for the statistical candidate, up to n pieces of motion information may be managed, and among this, z pieces of motion information may be included in the merge mode candidate group as statistical candidates. z may be variable according to a candidate construction already included in the merge mode candidate group, may be an integer of 0, 1, 2 or more, and may be less than or equal to n.

The combination candidate may be derived by combining n candidates already included in the merge mode candidate group, and n may be an integer of 2, 3, 4 or more. The number of combination candidates (n) may be information explicitly generated in units such as a sequence, a picture, a sub-picture, a slice, a tile, a brick, or a block. Alternatively, it may be implicitly determined according to a coding setting. In this case, the coding setting may be defined based on one or more factors in a size, a shape, a position, an image type, and a color component of the reference block.

Also, the number of combination candidates may be determined based on the number of candidates that have not been filled in the merge mode candidate group. In this case, the number of candidates that is not filled in the merge mode candidate group may be a difference value between the number of merge mode candidates and the number of already filled candidates. That is, if the merge mode candidate group construction has already been completed, the combination candidate may not be added. If the merge mode candidate group construction is not completed, the combination candidate may be added, but when there are less than or equal to one candidate filled in the merge mode candidate group, the combination candidate is not added.

If the merge mode candidate group is not filled with the spatial candidate, the temporal candidate, the statistical candidate, the combination candidate, etc., the candidate group construction may be completed through a default candidate including a zero vector.

The merge mode focuses on the description of merge_inter, and in the case of merge_ibc or merge_affine, a candidate group may be constructed for similar or different candidates.

For example, in the case of merge_ibc, a candidate group may be constructed based on a predetermined candidate selected from the spatial candidate, the statistical candidate, the combination candidate, and the default candidate. In this case, the candidate group may be constructed by prioritizing the spatial candidate, and then the candidate group may be constructed in the order of (statistical candidate)-(combination candidate)-(default candidate), etc, but the order is not limited thereto.

Alternatively, in the case of merge_affine, a candidate group may be constructed based on a predetermined candidate selected from the spatial candidate, the temporal candidate, the statistical candidate, the combination candidate, and the default candidate. In detail, a motion vector set candidate of the candidate (e.g., one block) may be constructed in a candidate group <1>, or a candidate in which motion vectors of candidates (e.g., two or more blocks) based on a control point position are combined may be constructed in a candidate group <2>. The order in which the candidate for <1> is first included in the candidate group and then the candidate for <2> is included be possible, but is not limited thereto.

Since the detailed description of the above-described construction of various merge mode candidate groups may be derived from merge_inter, a detailed description will be omitted.

In the process of constructing the merge mode candidate group, if overlapping motion information exists among the candidates included first, the candidate included first may be maintained and the candidate having the next priority may be included in the candidate group.

In this case, redundancy means that the motion information is the same, which may be defined by a motion information coding mode. In the case of the merge mode, it may be determined to be overlapped based on a motion vector, a reference picture, and a reference direction. For example, if a component of at least one motion vector are different, it may be determined that there is no overlap. The redundancy check process may generally be performed when a new candidate is included in the candidate group, but it may be modified to be omitted.

Figure 14:
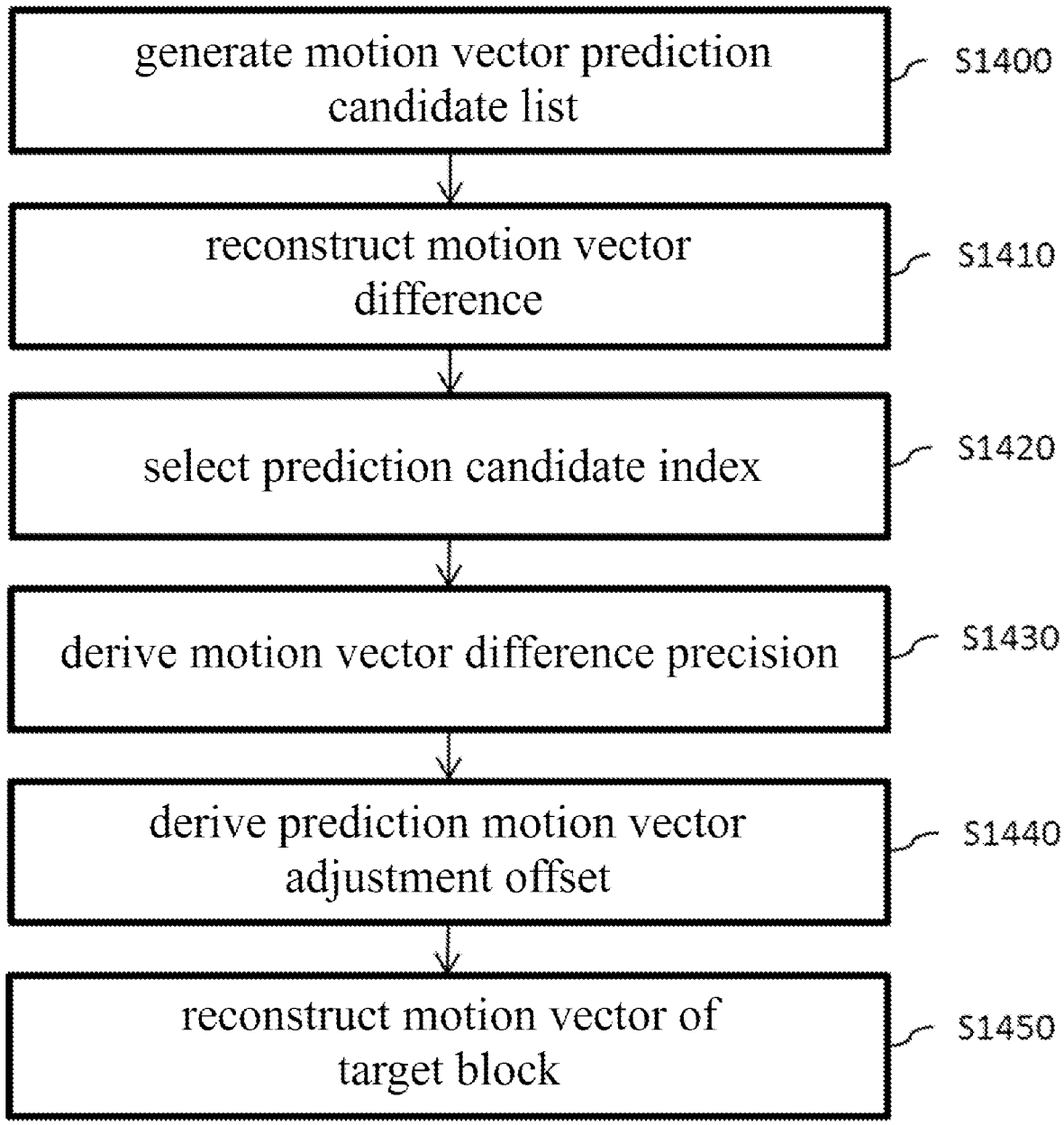
FIG. 14 is a flowchart illustrating motion information coding according to an embodiment of the present invention.

FIG. 14 is a flowchart illustrating motion information coding according to an embodiment of the present invention.

A motion vector prediction candidate list of a target block may be generated (S1400). The aforementioned competition mode candidate group may mean a motion vector candidate list, and a detailed description thereof will be omitted.

A motion vector difference of the target block may be reconstructed (S1410). Differences for the x and y components of the motion vector may be individually reconstructed, and the differences for each component may have a value of 0 or more.

A prediction candidate index of the target block may be selected from a motion vector prediction candidate list (S1420). A motion vector predictor of the target block may be derived based on a motion vector obtained according to the candidate index from the candidate list. If one predetermined motion vector predictor may be derived, the process of selecting the prediction candidate index and the index information may be omitted.

Precision information of the motion vector difference may be derived (S1430). Precision information commonly applied to x and y components of the motion vector may be derived, or precision information applied to each component may be derived. If the motion vector difference is 0, the precision information may be omitted, and this process may also be omitted.

An adjustment offset for the motion vector predictor may be derived (S1440). The offset may be a value added or subtracted to the x or y component of the motion vector predictor. The offset may be supported only for one of the x and y components, or may be supported for both the x and y components.

Assuming that the motion vector predictors are (pmv_x, pmv_y) and the adjustment offsets are offset_x and offsety, the motion vector predictors may be adjusted (or obtained) to (pmv_x+offset_x, pmvy+offset_y).

Here, the absolute values of offset_x and offsety may be 0, 1, 2 or more integers, respectively, and may have values (+1, −1, +2, −2, etc.) that sign information is considered together. Also, offset_x and offset_y may be determined based on a predetermined precision. The predetermined precision may be determined in units of 1/16, 1/8, 1/4, 1/2, and 1 pixel, and may be determined based on interpolation precision, motion vector precision, etc.

For example, if the interpolation precision is in units of 1/4 pixels, it may be derived to be 0, 1/4, −1/4, 2/4, −2/4, 3/4, −3/4 combined with the absolute value and sign information.

Here, offset_x and offsety may be supported by a and b, respectively, and a and b may be 0, 1, 2 or more integers. a and b may have fixed values or may have variable values. Also, a and b may have the same or unequal values.

Whether to support the adjustment offset for the motion vector predictor may be explicitly supported in units such as a sequence, a picture, a sub-picture, a slice, a tile, a brick, etc., or may be implicitly determined according to a coding setting. In addition, the setting of the adjustment offset (e.g., a range of values, a number, etc.) may be determined according to the coding setting.

The coding setting may be determined in consideration of at least one of coding elements such as an image type, color component, state information of the target block, motion model selection information (e.g., whether it is a translation motion model), a reference picture (e.g., whether it is a current picture), and motion vector precision difference selection information (e.g., whether it is a predetermined unit among 1/4, 1/2, 1, 2, 4 units).

For example, whether to support the adjustment offset and offset setting may be determined according to a size of a block. In this case, the size of the block may be determined by a first threshold size (minimum value) or a second threshold size (maximum value), and each threshold size may be expressed as W, H, W×H, and W*H with a width (W) and height (H) of the block. In the case of the first threshold size, W and H may be 4, 8, 16 or more integers, and W*H may be 16, 32, 64 or more integers. In the case of the second threshold size, W and H may be 16, 32, 64 or more integers, and W*H may be 64, 128, 256 or more integers. The range may be determined by one of the first threshold size or the second threshold size, or may be determined using both.

In this case, the threshold size may be fixed or may be adaptive according to an image (e.g., image type, etc.). In this case, the first threshold size may be set based on sizes of a minimum coding block, a minimum prediction block, a minimum transform block, and the second threshold size may be set based on sizes of a maximum coding block, a maximum prediction block, a maximum transform block.

Further, the adjustment offset may be applied to all candidates included in the motion information prediction candidate group or may be applied to only some candidates. In an example to be described later, it is assumed that all candidates included in the candidate group may be applied, but a candidate to which the adjustment offset is applied may be selected from 0, 1, 2 to the maximum number of candidates.

If the adjustment offset is not supported, this process and the adjustment offset information may be omitted.

The motion vector of the target block may be reconstructed by adding the motion vector predictor and the motion vector difference (S1450). In this case, a process of unifying the motion vector predictor or the motion vector difference with the motion vector precision may precede, and the above-described motion vector scaling process may precede or may be performed during this process.

The configuration and order are not limited thereto, but may be variously changed.

Figure 15:
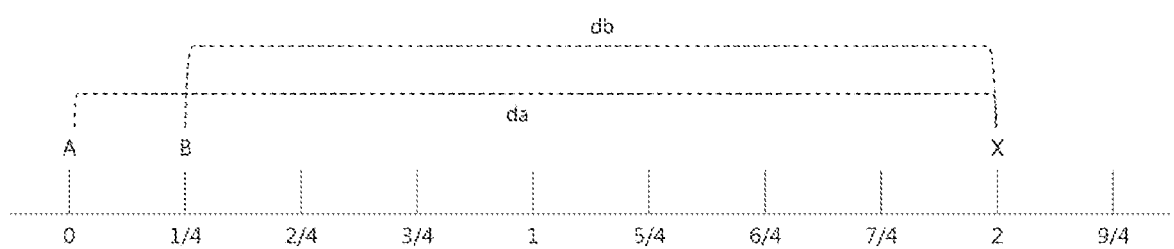
FIG. 15 is an exemplary diagram for a motion vector prediction candidate and a motion vector of a target block according to an embodiment of the present invention.

FIG. 15 is an exemplary diagram for a motion vector prediction candidate and a motion vector of a target block according to an embodiment of the present invention.

For convenience of explanation, two motion vector prediction candidates are supported, and one component (either x or y component) is assumed to be compared. In addition, it is assumed that the interpolation precision or the motion vector precision is ¼ pixel unit. In addition, it is assumed that ¼, 1, and 4 pixel units are supported (e.g., if ¼, assumed to be binarized as <0>, if 1, assumed to be binarized as <10>, and if 4, assumed to be binarized as <11>) for the motion vector difference precision. In addition, it is assumed that sign information is omitted for the motion vector difference and the motion vector difference is processed by unary binarization (e.g., 0: <0>, 1: <10>, 2: <110>, etc.).

Referring to FIG. 15, an actual motion vector X has a value of 2, candidate 1 (A) has a value of 0, and candidate 2 (B) has a value of ¼.

(in case where differential motion vector precision is not supported)

Since the distance (da) between A and X is 8/4 (9 bits) and the distance between B and X (db) is 7/4 (8 bits), a prediction candidate may be selected as B in terms of bit amount generation.

(in case where motion vector difference precision is supported)

Since da is 8/4, 1 pixel unit precision (2 bits) and 2/1 difference information (3 bits) may be generated, thus a total of 5 bits may be generated. On the other hand, since db is 7/4, ¼ pixel unit precision (1 bit) and 7/4 difference information (8 bits) may be generated, thus a total of 9 bits may be generated. The prediction candidate may be selected as A, in terms of bit amount generation.

As in the above example, if the motion vector difference precision is not supported, it may be advantageous to select a candidate with a short distance interval from the motion vector of the target block as the prediction candidate. If supported, in addition to the distance interval from the motion vector of the target block, it may be important to be selected as the prediction candidate based on the amount of information generated based on precision information.

Figure 16:
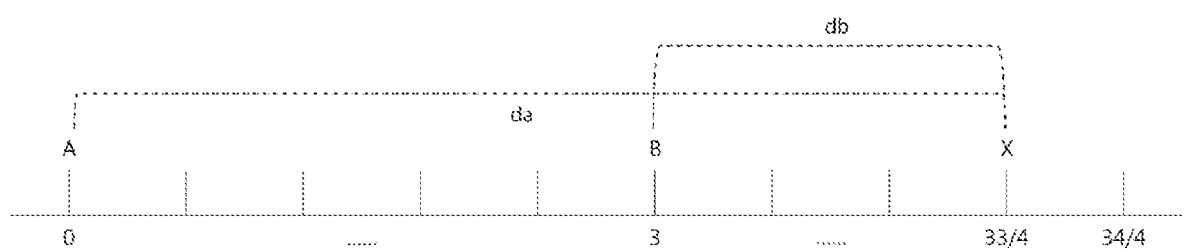
FIG. 16 is an exemplary diagram for a motion vector prediction candidate and a motion vector of a target block according to an embodiment of the present invention.

FIG. 16 is an exemplary diagram for a motion vector prediction candidate and a motion vector of a target block according to an embodiment of the present invention. In the following, it is assumed that the motion vector difference precision is supported.

Since da is 33/4, a ¼ pixel unit precision (1 bit) and 33/4 difference information (34 bits) may be generated, thus a total of 35 bits may be generated. On the other hand, since db is 21/4, ¼ pixel unit precision (1 bit) and 21/4 difference information (22 bits) may be generated, thus a total of 23 bits may be generated. The prediction candidate may be selected as B, in terms of bit amount generation.

Figure 17:
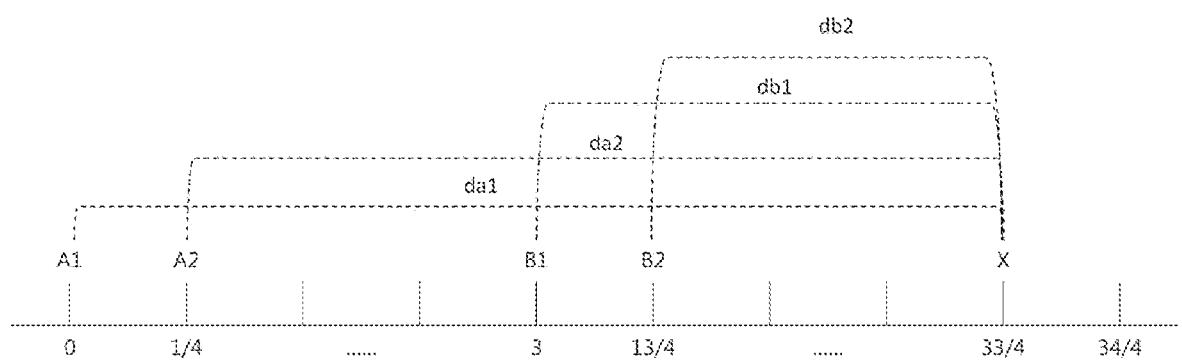
FIG. 17 is an exemplary diagram for motion a vector prediction candidate and a motion vector of a target block according to an embodiment of the present invention.

FIG. 17 is an exemplary diagram for motion a vector prediction candidate and a motion vector of a target block according to an embodiment of the present invention. In the following, it is assumed that the motion vector difference precision is supported and the adjustment offset information is supported.

In this example, it is assumed that the adjustment offset has 0 and +1 candidates, and a flag (1 bit) and offset selection information (1 bit) indicating whether the adjustment offset has been applied are generated.

Referring to FIG. 17, A1 and B1 may be motion vector predictors obtained based on a prediction candidate index, and A2 and B2 may be new motion vector predictors obtained by modifying A1 and B1 with an adjustment offset. It is assumed that the distances between A1, A2, B1, B2 from X are da1, da2, db1, db2, respectively.

(1) Since da1 is 33/4, ¼ pixel unit precision (1 bit), offset application flag (1 bit), offset selection information (1 bit), and 33/4 difference information (34 bits) may be generated, thus a total of 37 bits may be generated.

(2) Since da2 is 32/4, 4 pixel unit precision (2 bits), offset application flag (1 bit), offset selection information (1 bit), and 2/1 difference information (3 bits) may be generated, thus a total of 7 bits may be generated.

(3) Since db1 is 21/4, ¼ pixel unit precision (1 bit), offset application flag (1 bit), offset selection information (1 bit), and 21/4 difference information (22 bits) may be generated, thus a total of 25 bits may be generated.

(4) Since db2 is 20/4, 1 pixel unit precision (2 bits), offset application flag (1 bit), offset selection information (1 bit), and 5/1 difference information (6 bits) may be generated, thus a total of 10 bits may be generated.

In terms of bit amount generation, the prediction candidate may be selected as A, and the offset selection information may be selected as index 1 (+1 in this example).

In the above example, when a motion vector difference is derived based on an existing motion vector predictor, there may be a case in which many bits are generated due to a small difference in vector values. The above problem may be solved by adjusting the motion vector predictor.

A predetermined flag may be supported to apply the adjustment offset to the motion vector predictor. The predetermined flag may be configured through an offset application flag, offset selection information, etc.

(If Only Offset Application Flag is Supported)

When the offset application flag is 0, the offset is not applied to the motion vector predictor, and when the offset application flag is 1, a predetermined offset may be added or subtracted to the motion vector predictor.

(If Only Offset Selection Information is Supported)

An offset set based on the offset selection information may be added or subtracted to the motion vector predictor. (If Offset Application Flag and Offset Selection Information are Supported)

When the offset application flag is 0, the offset is not applied to the motion vector predictor, and when the offset application flag is 1, the offset set based on the offset selection information may be added or subtracted to the motion vector predictor. This setting is assumed in an example to be described later.

Meanwhile, the offset application flag and offset selection information may be used as information that is unnecessarily generated in some cases. That is, even if the offset is not applied, if the information has already been zero or the amount of information is reduced based on the maximum precision information, the offset-related information may be rather inefficient. Therefore, it is necessary to support a setting that is implicitly generated according to a predetermined condition, not when the offset-related information is always explicitly generated.

Next, it is assumed that the motion-related coding sequence is (motion vector difference reconstruction→motion vector difference precision acquisition). In this example, it is assumed that the motion vector difference precision is supported when at least one of the x and y components is not zero.

When the motion vector difference is not 0, one of {¼, ½, 1, 4} pixel units may be selected for the motion vector difference precision.

If the selection information belongs to a predetermined category, information on the adjustment offset may be implicitly omitted, and if not, information on the adjustment offset may be explicitly generated.

Here, the category may include one of differential motion vector precision candidates, it may be possible to configure with various categories such as {¼}, {¼, ½}, {¼, ½, 1}. Here, a minimum precision may be included in the category.

For example, if the motion vector difference precision is ¼ pixel unit (e.g., minimum precision), an offset application flag is implicitly set to 0 (i.e., not applied), and if the motion vector difference precision is not ¼ pixel, the offset application flag is explicitly generated, and if the offset application flag is 1 (i.e., offset application), offset selection information may be generated.

Alternatively, when the motion vector difference precision is 4 pixels unit (e.g., maximum precision), an offset application flag is explicitly generated, and when the offset application flag is 1, offset selection information may be generated. Alternatively, when the motion vector difference precision is not 4 pixels unit, the offset information may be implicitly set to 0.

The above example assumes that the offset-related information is implicitly omitted when the motion vector difference indicates the minimum precision, and the offset-related information is explicitly generated when the motion vector difference indicates the maximum precision, but is not limited thereto.

Figure 18:
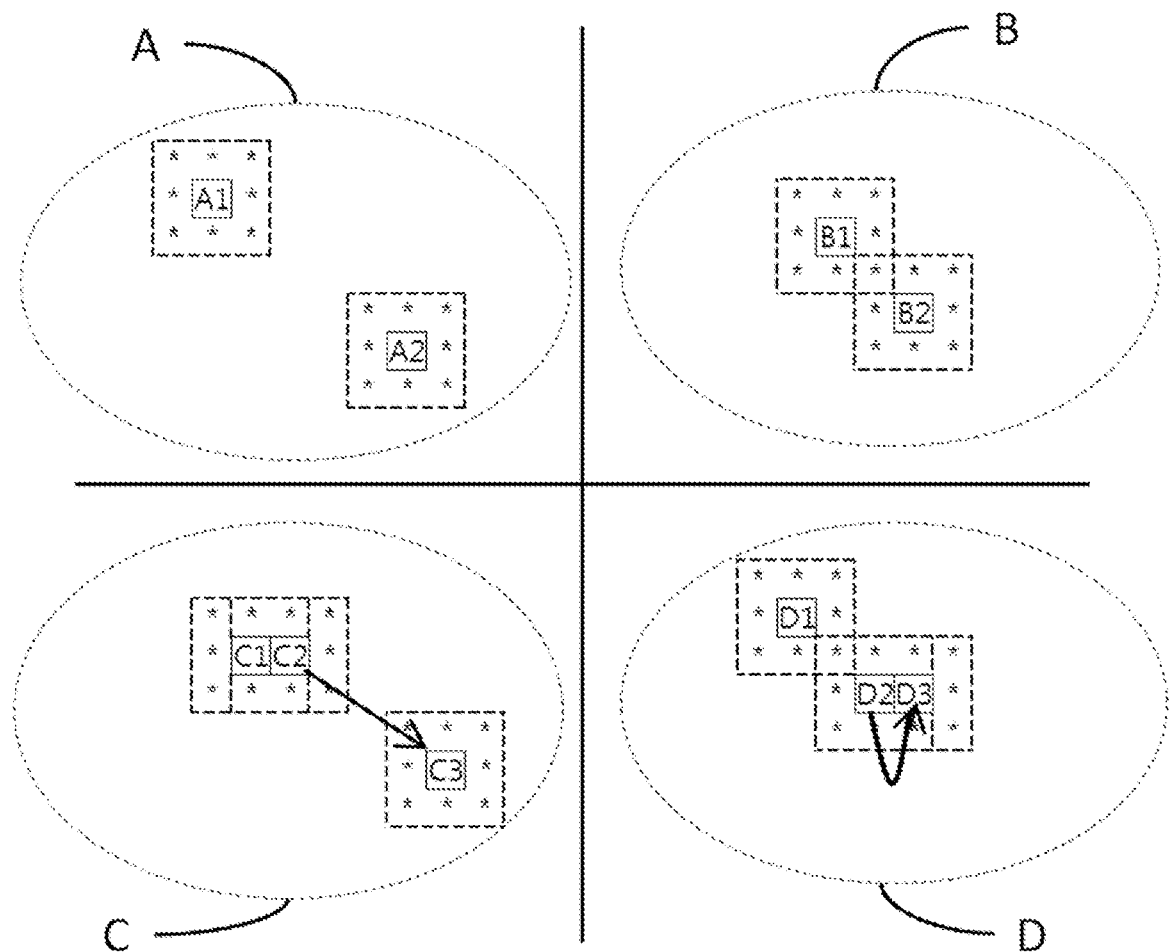
FIG. 18 is an exemplary diagram illustrating an arrangement of a plurality of motion vector predictors according to an embodiment of the present invention.

FIG. 18 is an exemplary diagram illustrating an arrangement of a plurality of motion vector predictors according to an embodiment of the present invention.

Through the above-described example, the part regarding redundancy check when constructing the motion information prediction candidate group has been described. Here, the redundancy means that the motion information is the same, and it has been described above that if the components of at least one motion vector are different, it may be determined that there is no redundancy.

A plurality of candidates for the motion vector predictor may not overlap each other through the redundancy check process. However, when the plurality of candidate component elements are very similar (i.e., x or y components of each candidate exist within a predetermined range, and a width or height of the predetermined range is an integer of 1, 2, or more. Or, the range is may be set based on the offset information), the motion vector predictor and the offset-modified motion vector predictor may overlap. Various settings for this may be possible.

As an example (C1), in the step of constructing the motion information prediction candidate group, the new candidate may be included in the candidate group when they do not overlap with the already included candidate. That is, it may be a configuration that may be included in the candidate group if it is not overlapped only by comparison of the candidate itself the same as the previous description.

As an example (C2), if a new candidate and a candidate obtained by adding an offset based thereon (group_A) and an already included candidate and a candidate obtained by adding an offset based thereon (group_B) do not overlap by a predetermined number, it may be included in the candidate group. The predetermined number may be an integer of 0, 1, or more. If the predetermined number is 0, if even one is overlapped, the corresponding new candidate may not be included in the candidate group. Alternatively, (C3), a predetermined offset (this is a different concept from the adjustment offset) may be added to the new candidate to be included in the candidate group, and the offset may be a value enabling group_A to be configured so as not to overlap with group_B.

Referring to FIG. 18, it may be a case where a plurality of motion vectors belonging to the categories of A, B, C, D (in this example, AX, BX, CX, DX. X is 1 and 2. For example, A1 is a candidate included in the candidate group before A2.) satisfy a non-overlapping condition (if any one component of the candidate motion vector is different).

In this example, it is assumed that −1, 0, 1 are supported for the x and y components, respectively, and the offset-modified motion vector predictor may be expressed as * in the drawing. Further, a dotted line (square) denotes a range (e.g., group_A, group_B, etc.) that may be obtained by adding an offset based on a predetermined motion vector predictor.

In the case of category A, it may correspond to a case where A1 and A2 do not overlap, and group_A1 and group_A2 do not overlap.

In the case of categories B, C, D, it may correspond to a case where B1/C1/D1 and B2/C2/D2 do not overlap, and group_B1/C1/D1 and group_B2/C2/D2 partially overlap.

Here, in the case of category B, it may be an example of constructing a candidate group without taking any special action (C1).

Here, in the case of category C, it may be a configuration in which it is determined that C2 has redundancy in the redundancy check step, and C3 in the next priority is included in the candidate group (C2).

Here, in the case of category D, it may be a case in which it is determined that D2 has redundancy in the redundancy check step, and D2 is modified so that group_D2 does not overlap with group_D1 (i.e., D3. D3 is not a motion vector existing in the candidate group construction priority) (C3).

Among the various categories, it may be applied to a setting in which a prediction mode candidate group is constructed, or various methods other than those mentioned above may be applied.

Figure 19:
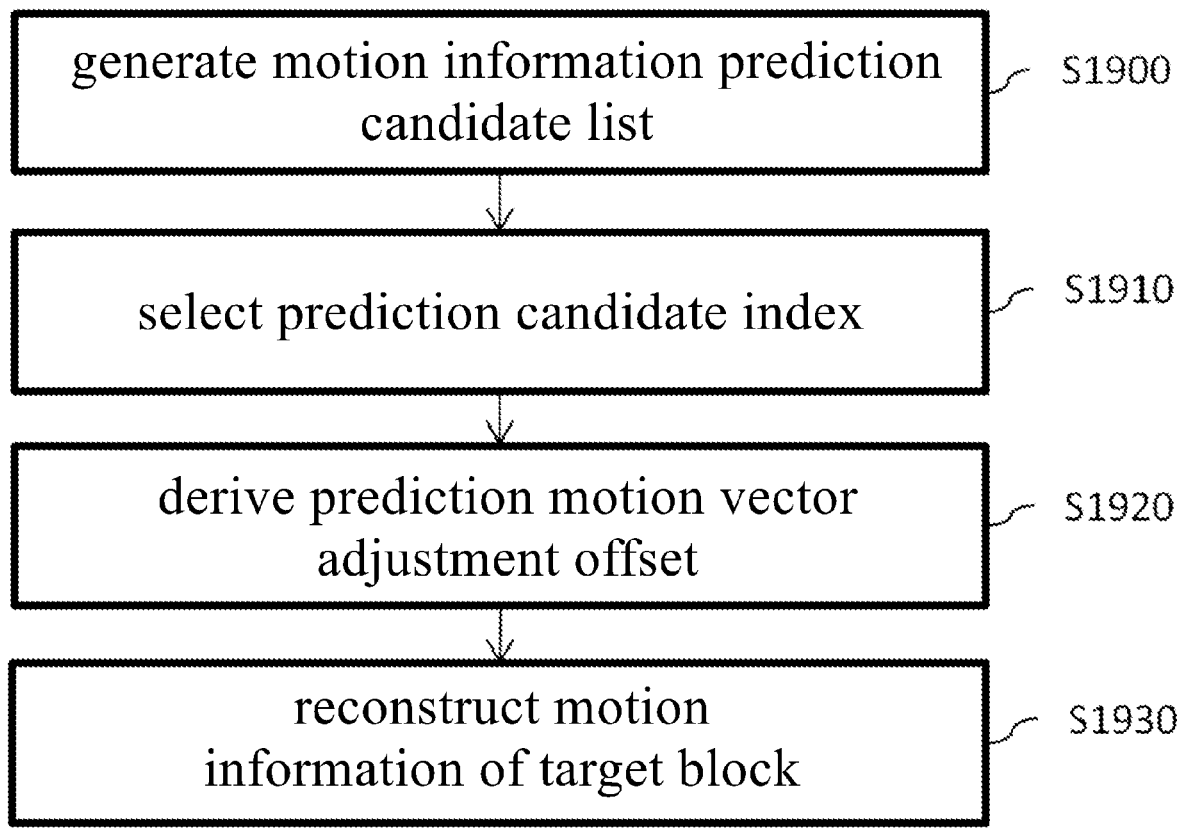
FIG. 19 is a flowchart illustrating motion information coding in a merge mode according to an embodiment of the present invention.

FIG. 19 is a flowchart illustrating motion information coding in a merge mode according to an embodiment of the present invention.

A motion information prediction candidate list of a target block may be generated (S1900). The above-mentioned merge mode candidate group may mean a motion information prediction candidate list, and a detailed description thereof will be omitted.

A prediction candidate index of the target block may be selected from the motion information prediction candidate list (S1910). A motion vector predictor of the target block may be derived based on motion information obtained according to the candidate index from the candidate list. If one predetermined motion information predictor may be derived, the process of selecting the prediction candidate index and the index information may be omitted.

An adjustment offset for the motion vector predictor may be derived (S1920). The offset may be a value added or subtracted to the x or y component of the motion vector predictor. The offset may be supported only for one of the x or y component, or may be supported for both the x and y components.

Since the adjustment offset in this process may be the same as or similar to the above adjustment offset, detailed descriptions are omitted, and a part of the difference will be described later.

Assuming that the motion vector predictors are (pmv_x, pmv_y) and the adjustment offsets are offset_x and offset_y, the motion vector predictors may be adjusted (or obtained) to (pmv_x+offset_x, pmv_y+offset_y).

Here, the absolute values of offset_x and offset_y may be integers such as 0, 1, 2, 4, 8, 16, 32, 64, 128, etc., respectively, and may have a value that sign information is considered together. Also, offset_x and offset_y may be determined based on a predetermined precision. The predetermined precision may be determined in units of 1/16, 1/8, 1/4, 1/2, 1 pixel.

For example, if the motion vector precision is 1/4 pixel unit, the motion vector precision may be derived to 0, 1/4, −1/4, 1/2, −1/2, 1, −1, 2, −2, etc., combined with the absolute value and the sign information.

Here, offset_x and offset_y may be a and b resources, respectively, and a and b may be integers such as 0, 1, 2, 4, 8, 16, 32, etc. a and b may have fixed values or may have variable values. Also, a and b may have the same or unequal values.

Whether to support the adjustment offset for the motion vector predictor may be explicitly supported in units such as a sequence, a picture, a sub-picture, a slice, a tile, a brick, etc., or may be implicitly determined according to a coding setting. In addition, a setting of the adjustment offset (e.g., a range of values, a number, etc.) may be determined according to the coding setting.

The coding setting may be determined in consideration of at least one of coding elements such as image type, color component, state information of the target block, motion model selection information (e.g., whether it is a translation motion model or not), a reference picture (e.g., whether it is a current picture or not), etc.

For example, whether to support the adjustment offset and offset setting may be determined according to a size of a block. In this case, the size of the block may be determined by a first threshold size (minimum value) or a second threshold size (maximum value), and each threshold size may be expressed as W, H, W×H, and W*H with a width (W) and height (H) of the block. In the case of the first threshold size, W and H may be 4, 8, 16 or more integers, and W*H may be 16, 32, 64 or more integers. In the case of the second threshold size, W and H may be 16, 32, 64 or more integers, and W*H may be 64, 128, 256 or more integers. The range may be determined by one of the first threshold size or the second threshold size, or may be determined using both.

In this case, the threshold size may be fixed or may be adaptive according to an image (e.g., image type, etc.). In this case, the first threshold size may be set based on sizes of a minimum coding block, a minimum prediction block, a minimum transform block, and the second threshold size may be set based on sizes of a maximum coding block, a maximum prediction block, a maximum transform block.

Further, the adjustment offset may be applied to all candidates included in the motion information prediction candidate group or may be applied to only some candidates. In an example to be described later, it is assumed that all candidates included in the candidate group may be applied, but a candidate to which the adjustment offset is applied may be selected from the number between 0, 1, or 2 to the maximum number of candidates.

A predetermined flag for applying the adjustment offset to the motion vector predictor may be supported. The predetermined flag may be configured through an offset application flag, offset absolute value information, offset sign information, etc.

If the adjustment offset is not supported, this process and the adjustment offset information may be omitted.

The motion vector of the target block may be reconstructed through the motion vector predictor (S1930). Motion information (e.g., a reference picture, a reference direction, etc.) other than the motion vector may be obtained based on the prediction candidate index.

The configuration and order are not limited thereto, but may be variously changed. Background description for supporting the adjustment offset in the merge mode has been described above through various examples of the competition mode, and thus a detailed description thereof will be omitted.

The methods of the present disclosure may be implemented as program instructions executable by various computer means, and stored in a computer-readable medium. The computer-readable medium may include program instructions, data files, and data structures alone or in combination. The program instructions recorded on the computer-readable medium may be specially designed for the present disclosure or known to those skilled in the art of computer software and thus available.

The computer-readable medium may include a hardware device specially adapted to store and execute program instructions, such as a read only memory (ROM), a random access memory (RAM), a flash memory, and the like. Program instructions may include machine language code that is produced by a compiler or high-level language code that may be executed in a computer by an interpreter. The above-described hardware device may be configured to operate as one or more software modules in order to perform operations according to the present disclosure, and vice versa.

Further, the above-described method or apparatus may be implemented in full or partial combination or separation of its configurations or functions.

While the present disclosure has been described above with reference to preferred embodiments of the present disclosure, those skilled in the art will understand that various modifications and variations may be made to the present disclosure without departing from the scope and spirit of the present disclosure.

INDUSTRIAL AVAILABILITY

The present invention may be used to encode/decode a video signal.

The invention claimed is:

1. An image decoding method performing inter prediction, the method comprising:
constructing a merge candidate list of a target block including a statistical merge candidate from a statistical merge candidate group and a spatial merge candidate from a neighboring block of the target block;
determining a motion vector from a selected merge candidate in the merge candidate list based on a candidate index; and
determining a prediction block for the target block based on the determined motion vector,
wherein the statistical merge candidate group includes one or more statistical merge candidates and a number of statistical merge candidates in the statistical merge candidate group cannot be larger than a predetermined maximum number of the statistical merge candidates,
the statistical merge candidate indicates inter-prediction information of a block that is decoded prior to the target block and the merge candidate list includes one or more statistical merge candidates in the statistical merge candidate group that are not immediately adjacent to the target block,
the statistical merge candidate group is updated after completion of decoding the target block by the following method:
when the inter-prediction information of the target block is not overlapped with any of the statistical merge candidates in the statistical merge candidate group, the statistical merge candidate group is updated by adding inter-prediction information of the target block as the first statistical merge candidate of the statistical merge candidate group and removing the last statistical merge candidate from the statistical merge candidate group and modifying the orders of the remained statistical merge candidates,
when the inter-prediction information of the target block is overlapped with any of the statistical merge candidates in the statistical merge candidate group, the statistical merge candidate group is updated by adding inter-prediction information of the target block as the first statistical merge candidate of the statistical merge candidate group and removing the overlapped statistical merge candidate from the statistical merge candidate group and modifying the orders of the remained statistical merge candidates,
the statistical merge candidate group is initialized when the target block is the first block of a predetermined data unit,
in the merge candidate list, the statistical merge candidate is included after the spatial merge candidate in order.

2. The method of claim 1, wherein the statistical merge candidate group is initialized when the target block is the first block of a row of maximum coding blocks.

3. The method of claim 1, wherein, when the inter-prediction information of the target block is not overlapped with any of the statistical merge candidates in the statistical merge candidate group and a number of the statistical merge candidates is less than a maximum number of the statistical merge candidates, the statistical merge candidate group is updated by adding inter-prediction information of the target block into the statistical merge candidate group without removing any of statistical merge candidates.

4. An image encoding method performing inter prediction, the method comprising:
constructing a merge candidate list of a target block including a statistical merge candidate from a statistical merge candidate group and a spatial merge candidate from a neighboring block of the target block;
determining a motion vector from a selected merge candidate in the merge candidate list, the motion vector being encoded using a candidate index; and
determining a prediction block for the target block based on the determined motion vector,
wherein the statistical merge candidate group includes one or more statistical merge candidates and a number of statistical merge candidates in the statistical merge candidate group cannot be larger than a predetermined maximum number of the statistical merge candidates,
the statistical merge candidate indicates inter-prediction information of a block that is encoded prior to the target block and the merge candidate list includes one or more statistical merge candidates in the statistical merge candidate group that are not immediately adjacent to the target block,
the statistical merge candidate group is updated after completion of encoding the target block by the following method:
when the inter-prediction information of the target block is not overlapped with any of the statistical merge candidates in the statistical merge candidate group, the statistical merge candidate group is updated by adding inter-prediction information of the target block as the first statistical merge candidate of the statistical merge candidate group and removing the last statistical merge candidate from the statistical merge candidate group and modifying the orders of the remained statistical merge candidates,
when the inter-prediction information of the target block is overlapped with any of the statistical merge candidates in the statistical merge candidate group, the statistical merge candidate group is updated by adding inter-prediction information of the target block as the first statistical merge candidate of the statistical merge candidate group and removing the overlapped statistical merge candidate from the statistical merge candidate group and modifying the orders of the remained statistical merge candidates,
the statistical merge candidate group is initialized when the target block is the first block of a predetermined data unit, and
in the merge candidate list, the statistical merge candidate is included after the spatial merge candidate in order.

5. A method of transmitting a bitstream generated by an image encoding method, the image encoding method comprising:
constructing a merge candidate list of a target block including a statistical merge candidate from a statistical merge candidate group and a spatial merge candidate from a neighboring block of the target block;
determining a motion vector from a selected merge candidate in the merge candidate list, the motion vector being encoded using a candidate index; and determining a prediction block for the target block based on the determined motion vector, wherein the statistical merge candidate group includes one or more statistical merge candidates and a number of statistical merge candidates in the statistical merge candidate group cannot be larger than a predetermined maximum number of the statistical merge candidates, the statistical merge candidate indicates inter-prediction information of a block that is encoded prior to the target block and the merge candidate list includes one or more statistical merge candidates in the statistical merge candidate group that are not immediately adjacent to the target block, the statistical merge candidate group is updated after completion of encoding the target block by the following method:

when the inter-prediction information of the target block is not overlapped with any of the statistical merge candidates in the statistical merge candidate group, the statistical merge candidate group is updated by adding inter-prediction information of the target block as the first statistical merge candidate of the statistical merge candidate group and removing the last statistical merge candidate from the statistical merge candidate group and modifying the orders of the remained statistical merge candidates, when the inter-prediction information of the target block is overlapped with any of the statistical merge candidates in the statistical merge candidate group, the statistical merge candidate group is updated by adding inter-prediction information of the target block as the first statistical merge candidate of the statistical merge candidate group and removing the overlapped statistical merge candidate from the statistical merge candidate group and modifying the orders of the remained statistical merge candidates, the statistical merge candidate group is initialized when the target block is the first block of a predetermined data unit, and in the merge candidate list, the statistical merge candidate is included after the spatial merge candidate in order.

* * * * *